(12) United States Patent
Kawaguchi et al.

(10) Patent No.: US 12,208,512 B2
(45) Date of Patent: Jan. 28, 2025

(54) ROBOT HAND OPERATION DEVICE, ROBOT HAND OPERATION SYSTEM, ROBOT ARM OPERATION SYSTEM, AND ROBOT OPERATION SYSTEM

(71) Applicant: Mitsubishi Electric Corporation, Tokyo (JP)

(72) Inventors: Noboru Kawaguchi, Tokyo (JP); Masaki Hirano, Tokyo (JP); Shota Narasaki, Tokyo (JP); Hayato Hoshino, Tokyo (JP); Shingo Kimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/666,881

(22) Filed: May 17, 2024

(65) Prior Publication Data
US 2024/0300118 A1    Sep. 12, 2024

Related U.S. Application Data

(63) Continuation of application No. 18/268,607, filed as application No. PCT/JP2021/048795 on Dec. 28, 2021.

(30) Foreign Application Priority Data

Dec. 28, 2020    (JP) .................................. 2020-219387

(51) Int. Cl.
B25J 15/10    (2006.01)
B25J 9/00     (2006.01)

(52) U.S. Cl.
CPC ............. B25J 15/10 (2013.01); B25J 9/0087 (2013.01)

(58) Field of Classification Search
CPC ................................ B25J 15/10; B25J 9/0087
See application file for complete search history.

(56) References Cited

U.S. PATENT DOCUMENTS

| 8,936,289 B1 | 1/2015 | Kozlowski et al. |
| 9,314,921 B2 | 4/2016 | Jacobsen et al. |
| (Continued) | | |

FOREIGN PATENT DOCUMENTS

| JP | 2762943 B2 | 3/1998 |
| JP | 2004-025326 A | 1/2004 |
| (Continued) | | |

OTHER PUBLICATIONS

Shubham Patil, "The Complete Anatomy Of Humanoid Robot Design !", Jul. 21, 2016, https://techstory.in/humanoid-robot-design/ (Year: 2016).*

(Continued)

Primary Examiner — Stephen A Vu
(74) Attorney, Agent, or Firm — XSENSUS LLP

(57) ABSTRACT

A robot hand operation device through which an operator inputs an operation instruction to move a robot hand including at least three fingers includes: a main body portion held by the operator; and joysticks each being corresponded with each of the fingers of the robot hand to be operated and provided in the main body portion in a number that is the same as that of the fingers. When the operator operates each of the joysticks, the operation instruction to move the finger corresponded with the each of the joysticks is inputted, and when the operator does not operate each of the joysticks, the operation instruction to move the finger corresponded with the each of the joysticks is not inputted.

30 Claims, 57 Drawing Sheets

(56) References Cited

U.S. PATENT DOCUMENTS

| | | | |
|---|---|---|---|
| 9,533,419 B1* | 1/2017 | Strauss | B25J 15/0009 |
| 9,718,195 B1 | 8/2017 | Youmans | |
| 2009/0285664 A1 | 11/2009 | Kim et al. | |
| 2011/0054682 A1 | 3/2011 | Miyauchi et al. | |
| 2011/0185556 A1 | 8/2011 | Hirano et al. | |
| 2012/0175903 A1 | 7/2012 | Murakami et al. | |
| 2013/0183129 A1* | 7/2013 | Nammoto | B25J 9/00 |
| | | | 901/31 |
| 2014/0103673 A1* | 4/2014 | Nammoto | B25J 11/00 |
| | | | 264/259 |
| 2015/0343634 A1* | 12/2015 | Kiyosawa | B25J 15/10 |
| | | | 901/31 |
| 2019/0381670 A1* | 12/2019 | Correll | B25J 15/10 |
| 2021/0162602 A1 | 6/2021 | Kawaguchi et al. | |

FOREIGN PATENT DOCUMENTS

| | | |
|---|---|---|
| JP | 2005-171510 A | 6/2005 |
| JP | 2009-274204 A | 11/2009 |
| JP | 2010-213873 A | 9/2010 |
| JP | 2012-143835 A | 8/2012 |
| JP | 2013-094892 A | 5/2013 |
| JP | 2017-164831 A | 9/2017 |
| WO | 2019/208652 A1 | 10/2019 |

OTHER PUBLICATIONS

International Search Report issued Mar. 29, 2022, in corresponding International Application No. PCT/JP2021/048795, 2pp.

Decision to Grant issued Jan. 17, 2023, in corresponding Japanese Application No. 2022-568611, 5pp.

Office Action issued Jan. 24, 2023, in corresponding Japanese Application No. 2022-188442, 4pp.

Office Action issued Jan. 24, 2023, in corresponding Japanese Application No. 2022-188443, 5pp.

Notice of Reason for Refusal mailed on Apr. 18, 2023, received for JP Application 2022-188442, 6 pages including English Translation.

Decision to Grant mailed on Jun. 27, 2023, received for JP Application 2022-188442, 5 pages including English Translation.

* cited by examiner (A)　　　　　(B)

(A)　　　(B)

(A)  (B)

(A)        (B)

ROBOT HAND OPERATION DEVICE, ROBOT HAND OPERATION SYSTEM, ROBOT ARM OPERATION SYSTEM, AND ROBOT OPERATION SYSTEM

CROSS-REFERENCE TO RELATED APPLICATIONS

The present application is a continuation of U.S. application Ser. No. 18/268,607, filed Jun. 21, 2023, which is based on PCT filing PCT/JP2021/048795, filed Dec. 28, 2021, which claims priority to JP 2020-219387, filed Dec. 28, 2020, the entire contents of each are incorporated herein by reference.

TECHNICAL FIELD

The present disclosure relates to a robot hand operation device and a robot hand operation system that operate the robot hand, a robot arm operation system that operates the robot arm, and a robot operation system that operates the robot.

BACKGROUND ART

When a robot hand in which finger joints similar to those of a human hand is provided in order to cause the robot hand to perform detailed work as performed by a human, the number of drive mechanisms required to move the robot hand increases (for example, see PTL 1).

There is a method for replacing the robot hand suitable for each work such as holding an object by two fingers, holding an object by five fingers, bending five fingers appropriately to hold an object, and handling a tool such as an electric driver with a lever or a button (for example, see PTL 2). There is a robot hand dedicated to work that holds an object between two fingers (for example, see PTL 3).

There is a glove type hand operation device that is worn on a hand of an operator to operate a robot hand. A sensor that measures a movement of the operator's finger and other parts in real time is provided in the glove type hand operation device. The movement of the operator's finger and other parts measured by the sensor of the glove type hand operation device is controlled so as to be taken directly by a finger of the robot hand or the like.

A robot arm (manipulator) used in a factory or the like is used to perform a predetermined work, and moves and works as determined by a previously-produced program or the like.

CITATION LIST

Patent Literature

PTL 1: Japanese Patent Laid-Open No. 2017-164831
PTL 2: Japanese Patent Laid-Open No. 2013-094892
PTL 3: Japanese Patent Laid-Open No. 2012-143835

SUMMARY OF INVENTION

Technical Problem

In order to cause the robot hand to perform fine work as performed by the human, the robot hand needs to have the same size as a human hand. In order to make the robot hand equipped with a large number of drive mechanisms similar in size to the human hand, an upper limit of force that the drive mechanism can output is required to be limited, and it becomes difficult for the robot hand to output the large force.

In the method for replacing the robot hand suitable for the work, there are many works performed by the robot hand in actual work, and the replacement of the robot hand is troublesome.

When the glove type hand operation device is worn on the hand to perform delicate critical work, the movement of the finger is always required to be controlled appropriately. When operating the robot hand for a long time, the operator cannot always take a rest, and a heavy mental and physical burden is imposed on the operator. Even in a case where the glove type hand operation device has a keep mode maintaining a state of the robot hand at a certain point of time, there is a possibility that the finger is moved in an unexpected direction while not maintaining the state of holding the object and the object is dropped, when the work is resumed.

In the robot arm of the robot used to rescue a human at an actual site, for example, a disaster site, how to move the robot arm cannot be determined previously.

When operating the robot arm, desirably the operator can input easily an operation instruction instructing how to actuate (action) the robot arm with less burden.

An object of the present disclosure is to provide a robot hand operation device that reduces the burden on the operator to operate the robot hand as compared with the conventional one.

Solution to Problem

A robot hand operation device according to the present disclosure is a robot hand operation device through which an operator inputs an operation instruction to move a robot hand including at least three fingers, the robot hand operation device including: a main body portion held by the operator; and joysticks each that is corresponded with each of the fingers of the robot hand to be operated and provided in the main body portion in a number that is the same as that of the fingers, wherein the operation instruction to move the corresponding finger is inputted when the operator operates the joystick, and the operation instruction to move the corresponding finger is not inputted when the operator does not operate the joystick.

Advantageous Effects of Invention

According to the robot hand operation device of the present disclosure, the burden on the operator to operate the robot hand can be reduced as compared with the conventional one.

DESCRIPTION OF EMBODIMENTS

Embodiment

Figure 1:
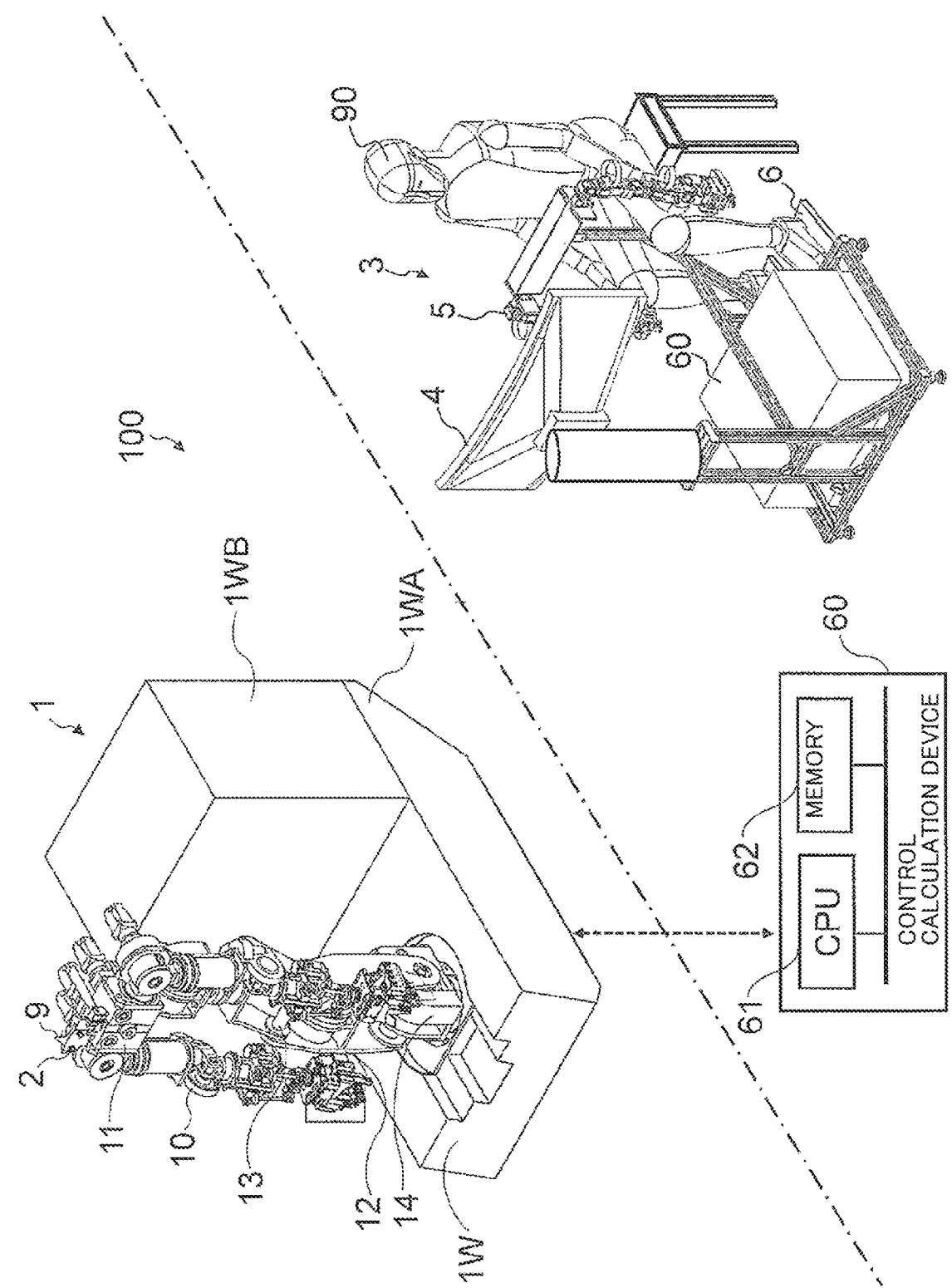
FIG. 1 is a block diagram illustrating a schematic configuration of a robot operation system according to an embodiment.
Figure 2:
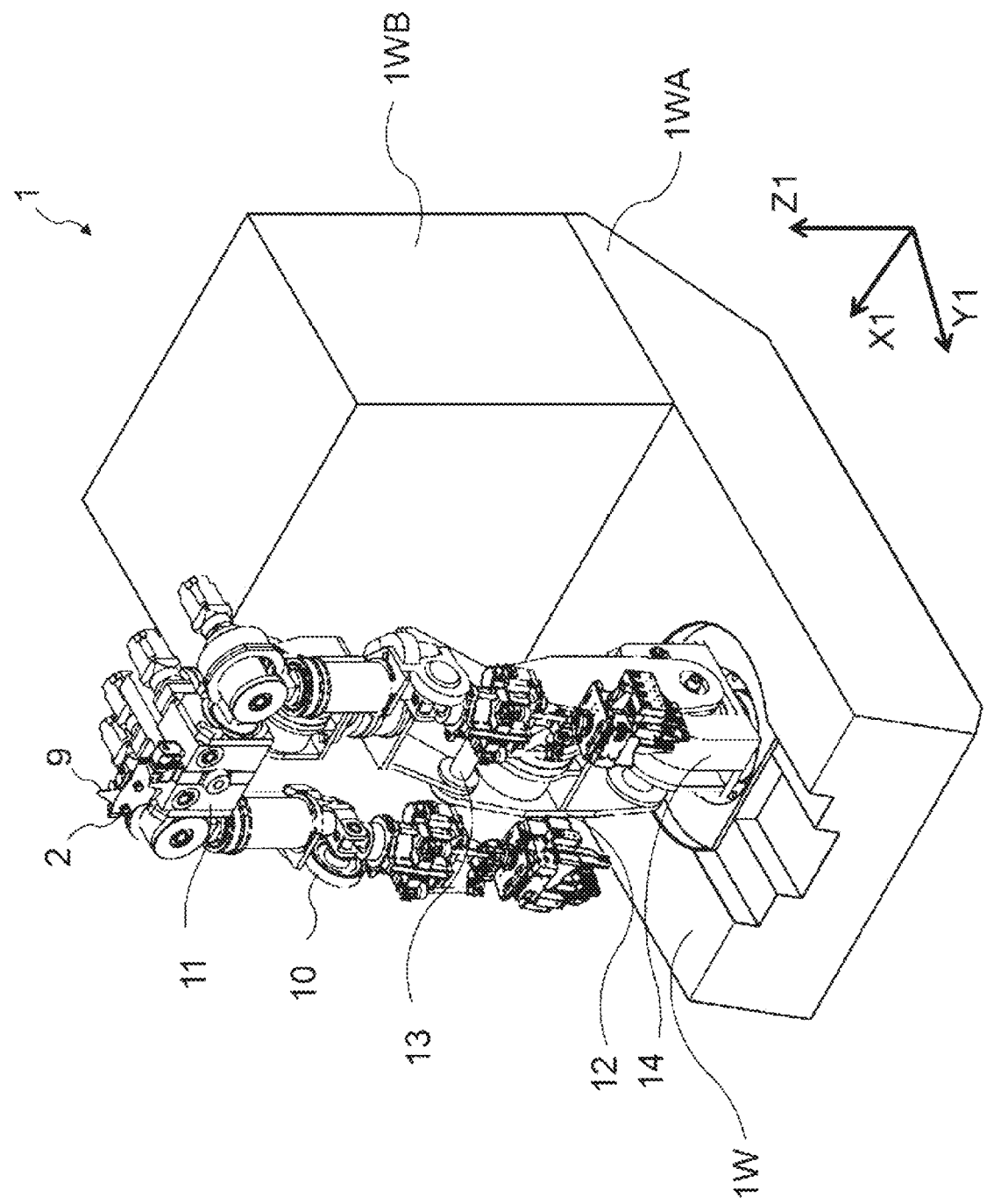
FIG. 2 is a perspective view illustrating a robot operated by the robot operation system of the embodiment.
Figure 3:
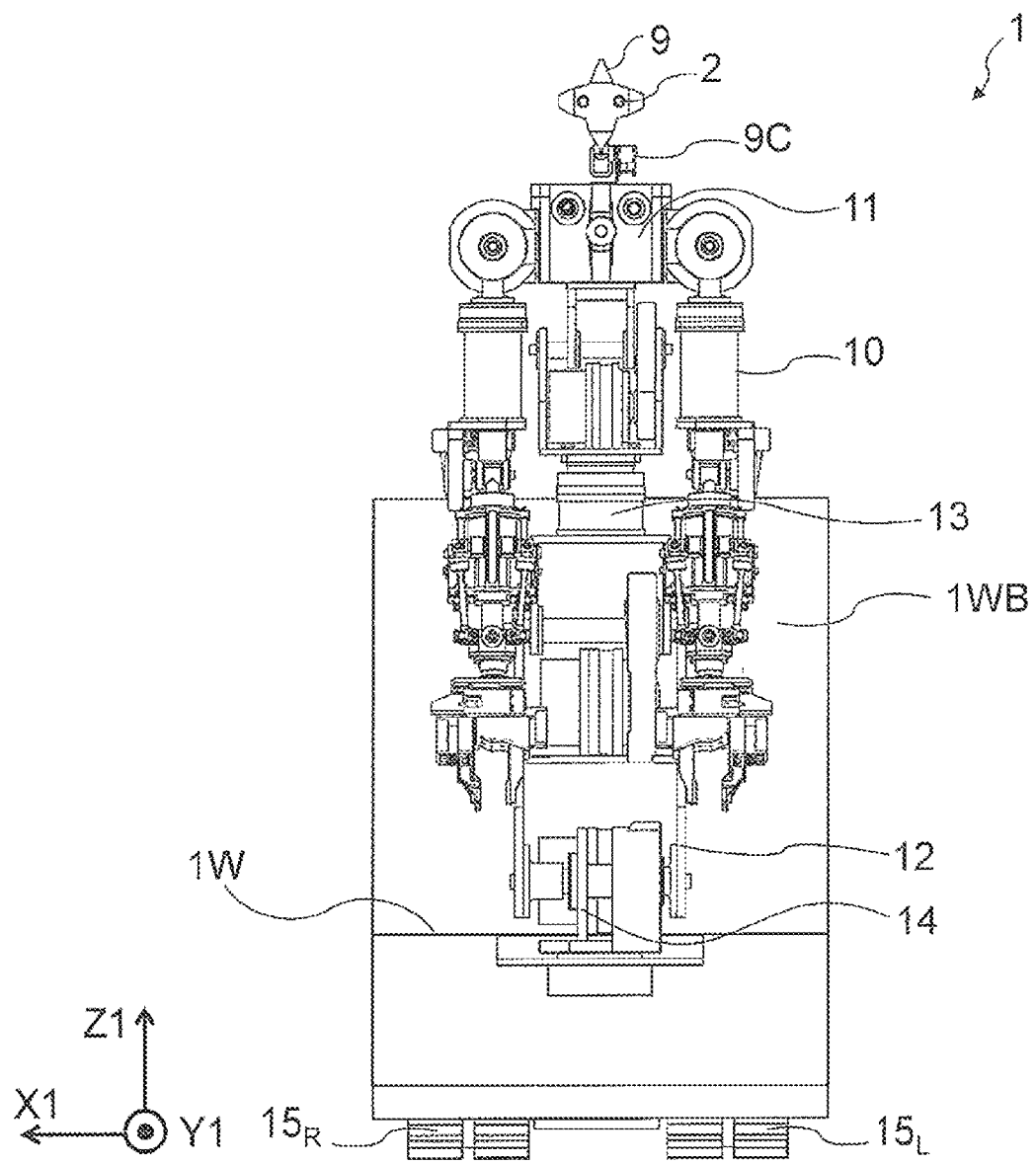
FIG. 3 is a front view illustrating the robot operated by the robot operation system of the embodiment.
Figure 4:
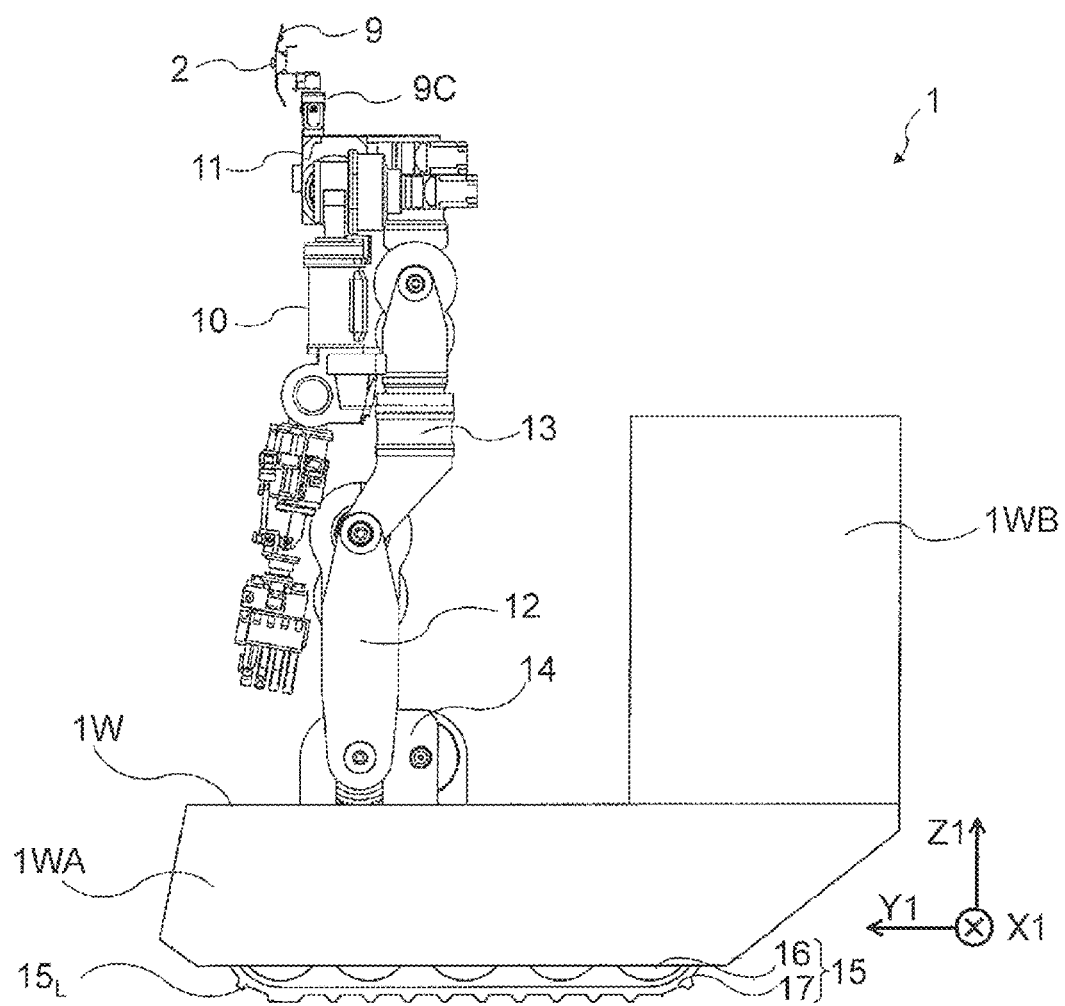
FIG. 4 is a right side view illustrating the robot operated by the robot operation system of the embodiment.
Figure 5:
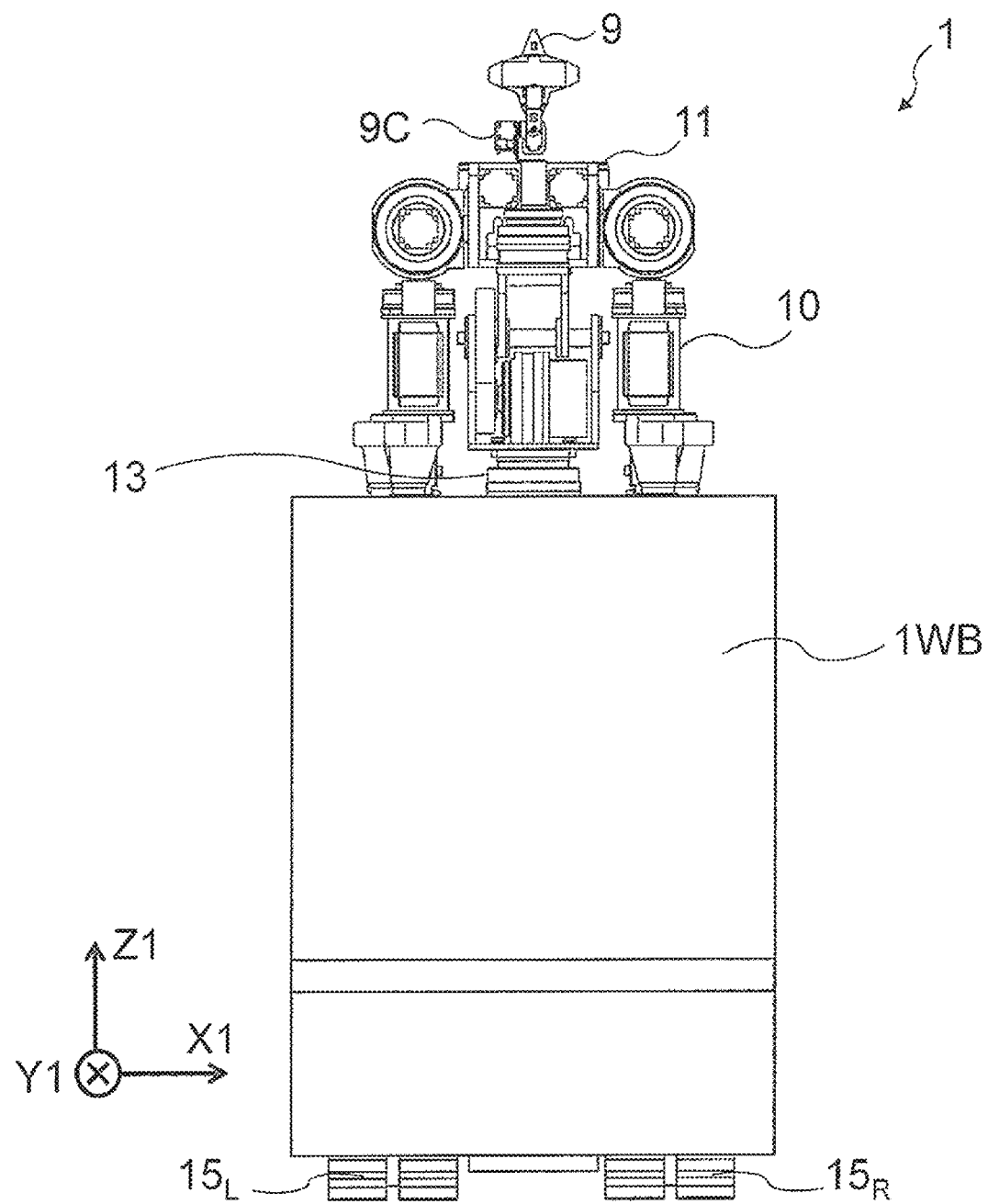
FIG. 5 is a rear view illustrating the robot operated by the robot operation system of the embodiment.
Figure 6:
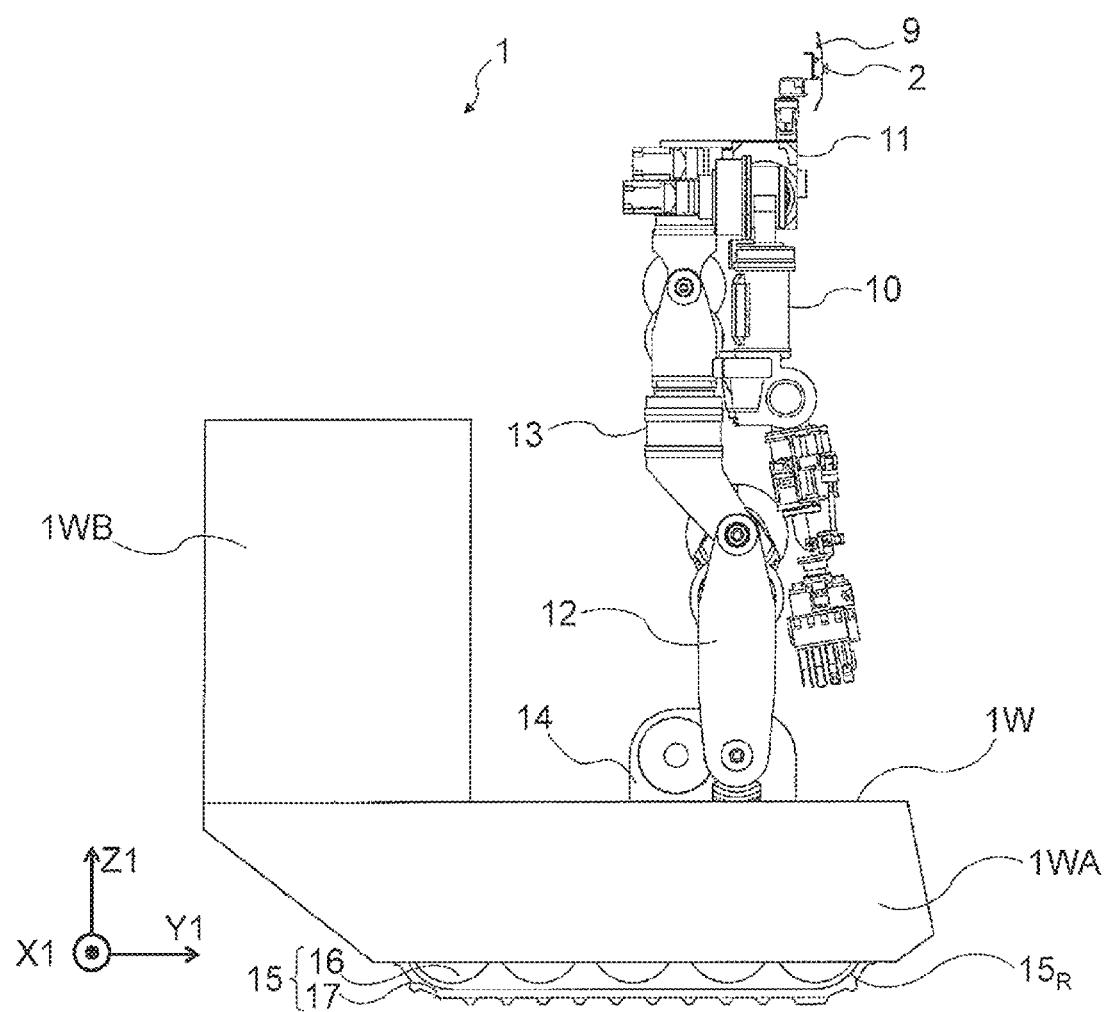
FIG. 6 is a left side view illustrating the robot operated by the robot operation system of the embodiment.
Figure 7:
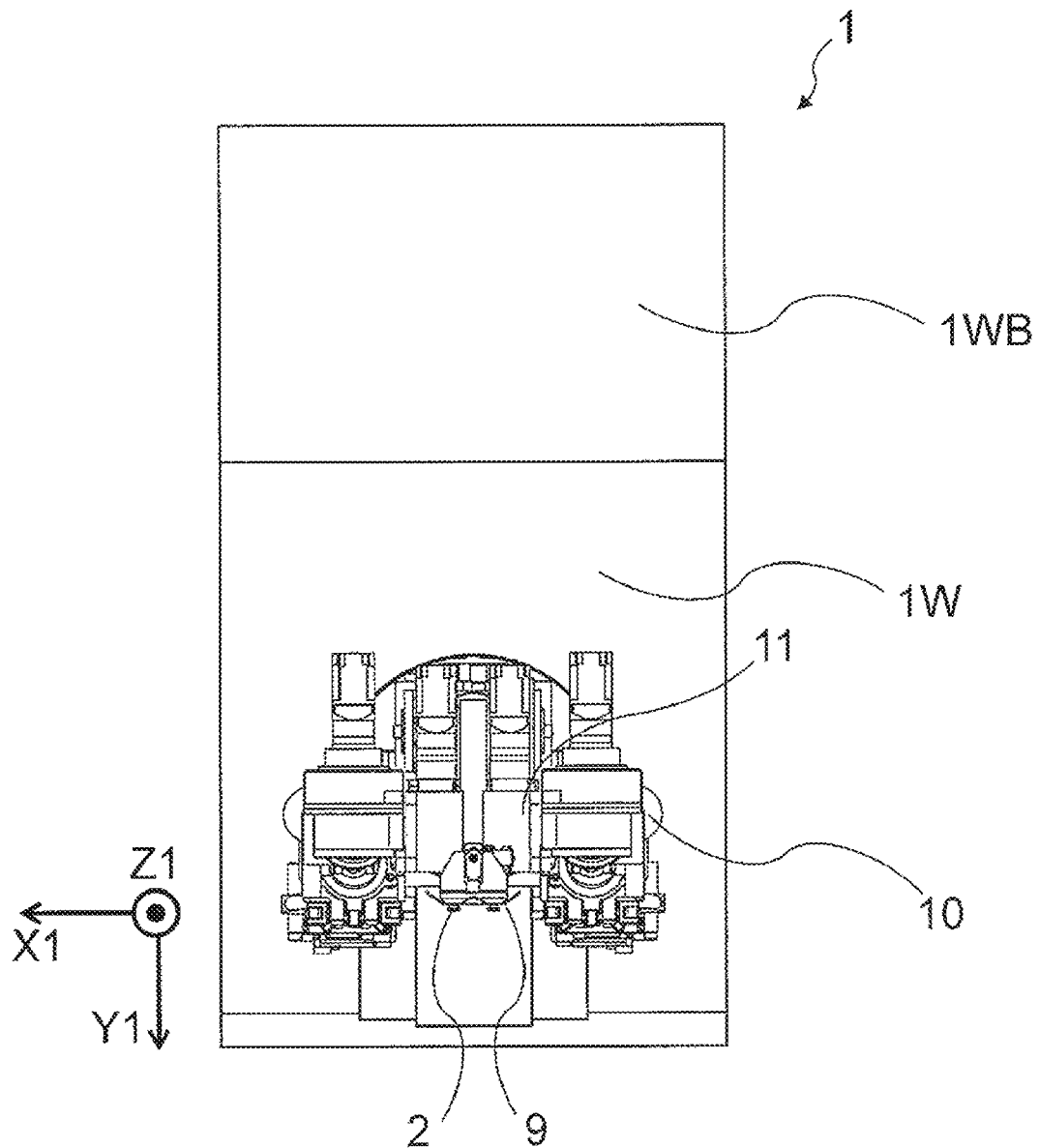
FIG. 7 is a plan view illustrating the robot operated by the robot operation system of the embodiment.
Figure 8:
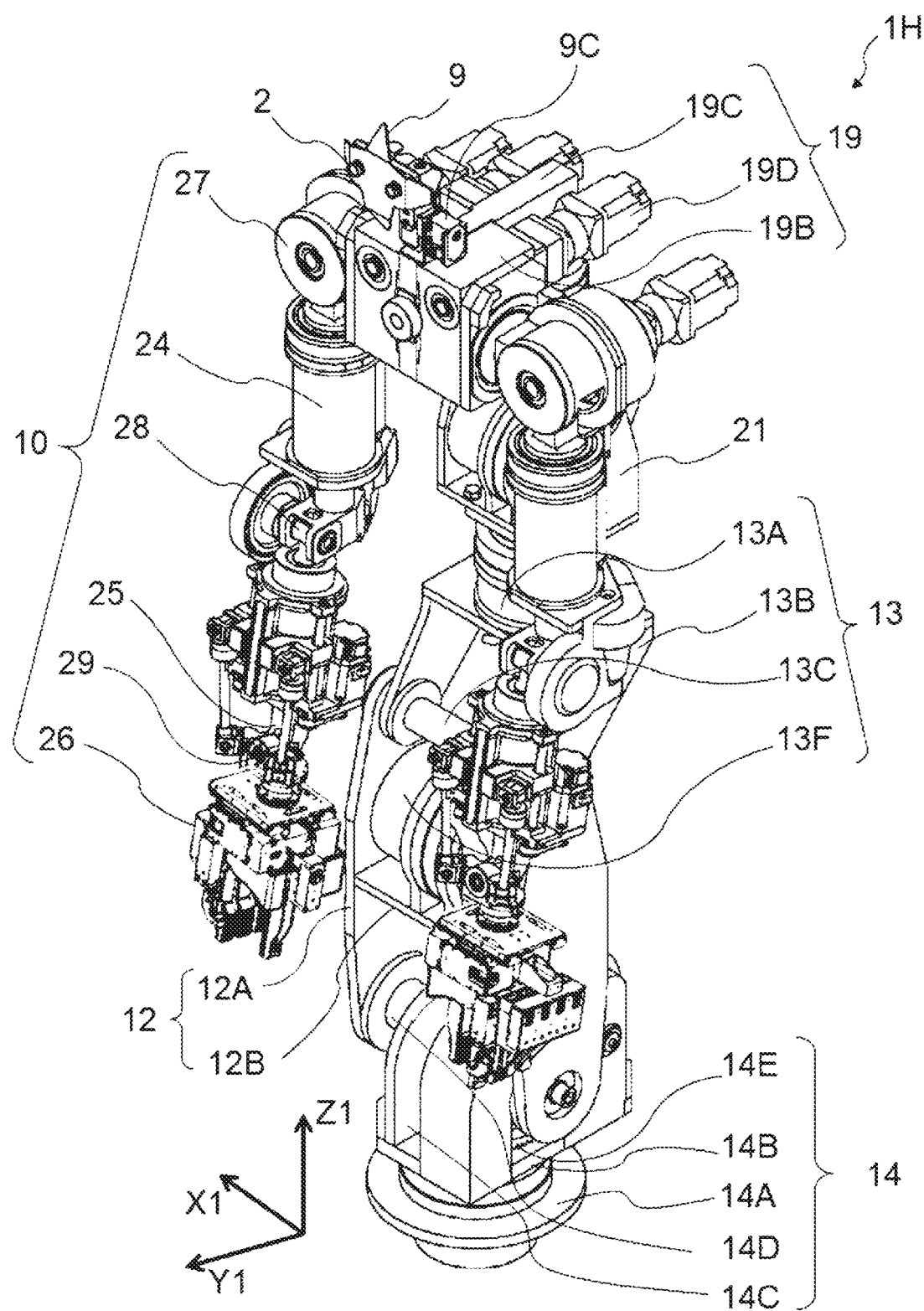
FIG. 8 is a perspective view illustrating a humanoid of the robot operated by the robot operation system of the embodiment.

FIG. 1 is a schematic diagram illustrating a configuration of a robot operation system according to an embodiment. A robot operation system 100 includes mainly a crawler mobile robot (abbreviated as a robot) 1, two on-site cameras 2 mounted on robot 1, an operation device 3, and a display device 4. An operator 90 is an operator who operates robot 1. Robot 1 is a robot that has two arms and moves with a crawler (caterpillar). Robot 1 includes a vehicle portion 1W and a humanoid 1H mounted on a front upper surface of vehicle portion 1W. On-site camera 2 is mounted on a head included in robot 1 and captures an image of a site where robot 1 is used. The image captured by on-site camera 2 is displayed on display device 4.

Operation device 3 includes an input device, which is used by operator 90 to input an operation instruction, and a control calculation device 60. Operator 90 inputs the operation instruction through an input device. The operation instruction is an instruction inputted by operator 90 on a motion of each part included in robot 1. Examples of the operation instruction include raising the right hand and moving forward. A signal that moves robot 1 actually is a control signal generated from the operation instruction. The control signal is a signal that moves robot 1 actually, for example, a length of an actuator is set to 30 cm, or a servomotor of a shoulder joint is rotated by 30 degrees. The actuator, the servo motor of the shoulder joint, and the like are controlled by the control signal. The control signal is generated from the operation instruction. The control calculation device 60 generates the control signal from the operation instruction inputted to the input device by operator 90. The control calculation device 60 controls robot 1 based on the operation instruction.

Operator 90 sits on a chair and operates robot 1 using a foot and a hand. Operation device 3 includes an upper body input device 5, a mode switching pedal 6, and a foot operation input device 7 (not illustrated) as input devices inputting the operation instruction. Upper body input device 5 is operated manually by operator 90 to input the operation instruction to left and right arms of humanoid 1H. Mode switching pedal 6 is operated by the foot of operator 90 to change an input mode of upper body input device 5. Foot operation input device 7 inputs mainly the operation instruction to vehicle portion 1W. Foot operation input device 7 is operated by the foot of operator 90 to input the operation instruction. Foot operation input device 7 is not described herein.

Control calculation device 60 generates the control signal operating robot 1 from the operation instruction inputted by operator 90 using the input device. A place where operator 90 is located is called an operation center.

Control calculation device 60 is constructed with a computer including a CPU 61 and a memory 62. Memory 62 stores a program and data executed by CPU 61.

The data includes data used for processing, data obtained as a result of processing, and the like. Memory 62 is a semiconductor memory such as a flash memory, and a hard disk. Memory 62 includes a volatile storage device and a non-volatile storage device.

With reference to FIGS. 2 to 14, a structure of robot 1 is described. FIGS. 2 to 7 are a perspective view, a front view, a right side view, a rear view, a left side view, and a plan view of entire robot 1. FIGS. 8 to 14 are a perspective view, a front view, a right side view, a rear view, a left side view, a plan view, and a bottom view of humanoid 1H. A state in which robot 1 takes a posture in FIGS. 2 to 14 is referred to as a reference state.

Robot 1 includes vehicle portion 1W and humanoid 1H. Humanoid 1H includes a head 9, two arms 10, a body 11, a body support arm 12, a body connection portion 13, and a support arm connection portion 14. Vehicle portion 1W is a type of vehicle that moves by the crawler. Vehicle portion 1W includes the crawler as included in a small power shovel.

A crawler moving portion 15 is provided on the left and right of vehicle portion 1W. The left side is referred to as a crawler moving portion $15_L$, and the right side is referred to as a crawler moving portion $15_R$. When the left and right are not specified, are denoted as crawler moving portion 15. Similarly, other two left and right components included in vehicle portion 1W are described with or without adding the suffix $_L$ or $_R$. Crawler moving portion 15 includes a driven wheel 16 and a crawler 17 bridged between wheels 16. In wheel 16, for example, five-axis wheels 16 are arranged side by side in a front-rear direction. Crawler 17 has a ring shape in which metal plates are connected. Protrusions are provided in a metal plate constituting crawler 17 in a direction orthogonal to a direction in which the crawler moves by rotation. Two rows of protrusions are provided in crawler 17. A part including no protrusion is provided between the two rows of protrusions provided on crawler 17 such that water or the like flows back and forth easily. When wheel 16 rotates, crawler 17 also rotates. Crawlers 17 contact the ground or the like. As crawlers 17 rotate while contacting the ground or the like, vehicle portion 1W moves. Because the crawlers are in contact with the ground or the like, vehicle portion 1W can move even if there is unevenness on the ground or the like. Left and right crawler moving portions $15_L$, $15_R$ move independently of each other. For example, right crawler moving portion $15_R$ can be moved forward, and left crawler moving portion $15_L$ can be moved backward.

A battery 18 (not illustrated) serving as a power source is mounted on a rear of the upper surface of vehicle portion 1W. Vehicle portion 1W includes a crawler cover 1WA that covers side surfaces and front and rear surfaces of crawler moving portions $15_L$, $15_R$. A battery container 1WB that contains battery 18 is provided on the rear of the upper surface of vehicle portion 1W.

Arm 10 has a shape similar to that of a human arm. A structure of arm 10 is described later. Two arms 10 are connected to the left and right of the upper portion of body 11 rotatably. Body 11 and two arms 10 have the same positional relationship and the same size as those of the human body and arm. Accordingly, robot 1 can perform fine work similar to that performed by a human. Body support arm 12 is connected to the lower side of body 11. When body support arm 12 is moved, the position of body 11 can be changed with respect to vehicle portion 1W.

Body 11 includes an arm connection portion 19, a body upper portion 20, a body lower portion 21, and a body crossing rotation portion 23. The two arms 10 are connected to arm connection portion 19. Body support arm 12 is connected to body lower portion 21. Body upper portion 20 and body crossing rotation portion 23 are provided between arm connection portion 19 and body lower portion 21. Body crossing rotation portion 23 allows body upper portion 20 to be rotated with respect to body lower portion 21. A rotation axis around which body crossing rotation portion 23 rotates body upper portion 20 with respect to body lower portion 21 is referred to as a body crossing rotation axis. Arm connection portion 19 is supported rotatably by body upper portion 20. The rotation axis that allows arm connection portion 19 to be rotated with respect to body upper portion 20 is referred to as an arm connection portion rotation axis.

Body support arm 12 extends from vehicle portion 1W to support body 11. Body support arm 12 supports body 11 such that the position of body support arm 12 with respect to vehicle portion 1W can be changed. Body support arms 12 can dispose body 11 in a position and orientation suitable for work. The length of body support arm 12 is determined in consideration of an assumed maximum height of the position where robot 1 works, an assumed maximum distance from the place where vehicle portion 1W can get close to, and the like.

Body connection portion 13 is connected onto the upper side of body support arm 12. Body connection portion 13 connects body 11 to body support arm 12 rotatably with two rotational degrees of freedom. Body connection portion 13 allows a connection angle of body 11 with body support arm 12 to be rotated. The rotation axis that allows the connection angle between body 11 and body support arm 12 to be changed is referred to as a body inclination rotation axis. Body connection portion 13 allows body 11 to be rotated relative to body support arm 12 around a body rotation axis passing through body 11. The body inclination rotation axis is orthogonal to the body rotation axis and body support arm 12.

Although calculations for control are complex, the body inclination rotation axis may cross at an angle other than a right angle with either or both of the body rotation axis and body support arm 12. Body inclination rotation axis may cross the body rotation axis and body support arm 12. Body connection portion 13 may connect body 11 to body support arm 12 rotatably with at least three rotational degrees of freedom. Body connection portion 13 may connect body 11 to body support arm 12 with at least two rotational degrees of freedom including rotation around the body rotation axis and rotation around the body inclination rotation axis.

Support arm connection portion 14 is connected onto the lower side of body support arm 12. Support arm connection portion 14 connects one end of body support arm 12 to vehicle portion 1W rotatably with two rotational degrees of freedom.

Support arm connection portion 14 has an azimuth rotation axis and an elevation rotation axis. The azimuth rotation axis is a rotation axis that allows an angle formed by a direction obtained by projecting a direction in which body support arm 12 extends on the upper surface of vehicle portion 1W to be changed with respect to a front-rear direction of vehicle portion 1W. The elevation rotation axis is a rotation axis that allows the angle formed by body support arm 12 and the upper surface of vehicle portion 1W to be changed. The azimuth rotation axis and the elevation rotation axis are orthogonal to each other. The elevation rotation axis and the body inclination rotation axis are parallel to each other. The elevation rotation axis is orthogonal to the azimuth rotation axis and body support arm 12.

Although computations for control are complex, the elevation rotation axis may cross either or both of the azimuth rotation axis and body support arm 12 at an angle other than a right angle. The elevation rotation axis may cross the azimuth rotation axis and body support arm 12. Support arm connection portion 14 may connect body support arm 12 to vehicle portion 1W so as to be rotatable with three or more of rotational degrees of freedom. Support arm connection portion 14 may connect body support arm 12 to vehicle portion 1W with at least two rotational degrees of freedom including rotation around the azimuth rotation axis and rotation around the elevation rotation axis.

In robot 1, the height from the lower end of vehicle portion 1W to the upper end of head 9 is about 1.8 m, the length in the front-rear direction of vehicle portion 1W is about 1.4 m, and the minimum width in the right-left direction of arm connection portion 19 and arm 10 is about 0.55 m. The weight is about 150 kg for humanoid 1H alone and about 300 kg for entire robot 1. With arms 10 extended horizontally, an object weighing about 3 kg can be held with one hand and about 6 kg with both hands. With arms 10 extended vertically downward, an object weighing about 10 kg can be held with one hand and about 20 kg with both hands. Body support arm 12 can be moved while holding the object.

Three types of orthogonal coordinate systems are used to express the posture of robot 1. The three types of orthogonal coordinate systems are a first orthogonal coordinate system defined by using vehicle portion 1W as a reference, a second orthogonal coordinate system defined by using on body connection portion 13 as a reference, and a third orthogonal coordinate system defined by using arm connection portion 19 as a reference.

The first orthogonal coordinate system defined by using vehicle portion 1W as a reference is defined as follows. The first orthogonal coordinate system expresses the positions of body support arm 12 and body connection portion 13 with respect to vehicle portion 1W.

X1-axis: an axis parallel to a right-left direction of vehicle portion 1W.

Y1-axis: an axis parallel to the front-rear direction of vehicle portion 1W.

Z1-axis: an axis parallel to the height direction of vehicle portion 1W. azimuth rotation axis.

The X1-axis, the Y1-axis, and the Z1-axis are orthogonal to each other. An intersection of the azimuth rotation axis (Z1-axis) and the elevation rotation axis is set to be an origin of the first orthogonal coordinate system. The right side is defined as the positive direction of the X1-axis, the front side is defined as the positive direction of the Y1-axis, and the upper side is defined as the positive direction of the Z1-axis. The X1-axis and the Y1-axis are parallel to the upper surface of vehicle portion 1W. The Z1-axis is orthogonal to the upper surface of vehicle portion 1W.

The second orthogonal coordinate system defined by using body connection portion 13 as a reference is defined as follows. The second orthogonal coordinate system expresses a position of arm connection portion 19 with respect to body connection portion 13.
- X2-axis: the body inclination rotation axis included in body connection portion 13.
- Y2-axis: an axis orthogonal to the X2-axis and the Z2-axis.
- Z2-axis: a body rotation axis included in body connection portion 13.

The X2-axis, the Y2-axis, and the Z2-axis are orthogonal to each other. The intersection of the body inclination rotation axis (X2-axis) and the body rotation axis (Z2-axis) is set to be the origin of the second orthogonal coordinate system. In the reference state, the X1-axis and the X2-axis, the Y1-axis and the Y2-axis, and the Z1-axis and the Z2-axis are parallel to each other. The right side of vehicle portion 1W in the reference state is defined as the positive direction of the X2-axis, the front side is defined as the positive direction of the Y2-axis, and the upper side is defined as the positive direction of the Z2-axis.

The third orthogonal coordinate system defined by using arm connection portion 19 as a reference is defined as follows. The third orthogonal coordinate system expresses the position of arm 10 with respect to arm connection portion 19.
- X3-axis: a rotation axis passing through two places where two arms are connected to arm connection portion 19.
- Y3-axis: an axis orthogonal to the X3-axis and the Z3-axis.
- Z3-axis: a rotation axis that allows arm connection portion 19 to be rotated. The Z3-axis is referred to as an arm connection portion rotation axis.

The X3-axis, the Y3-axis, and the Z3-axis are orthogonal to each other. The origin of the third orthogonal coordinate system is an intersection of the arm connection portion rotation axis (Z3-axis) and a plane including the X3 axis and perpendicular to the Z3-axis. The right side of arm connection portion 19 in the reference state is defined as the positive direction of the X3-axis, the front side is defined as the positive direction of the Y3-axis, and the upper side is defined as the positive direction of the Z3-axis.

Figure 15:
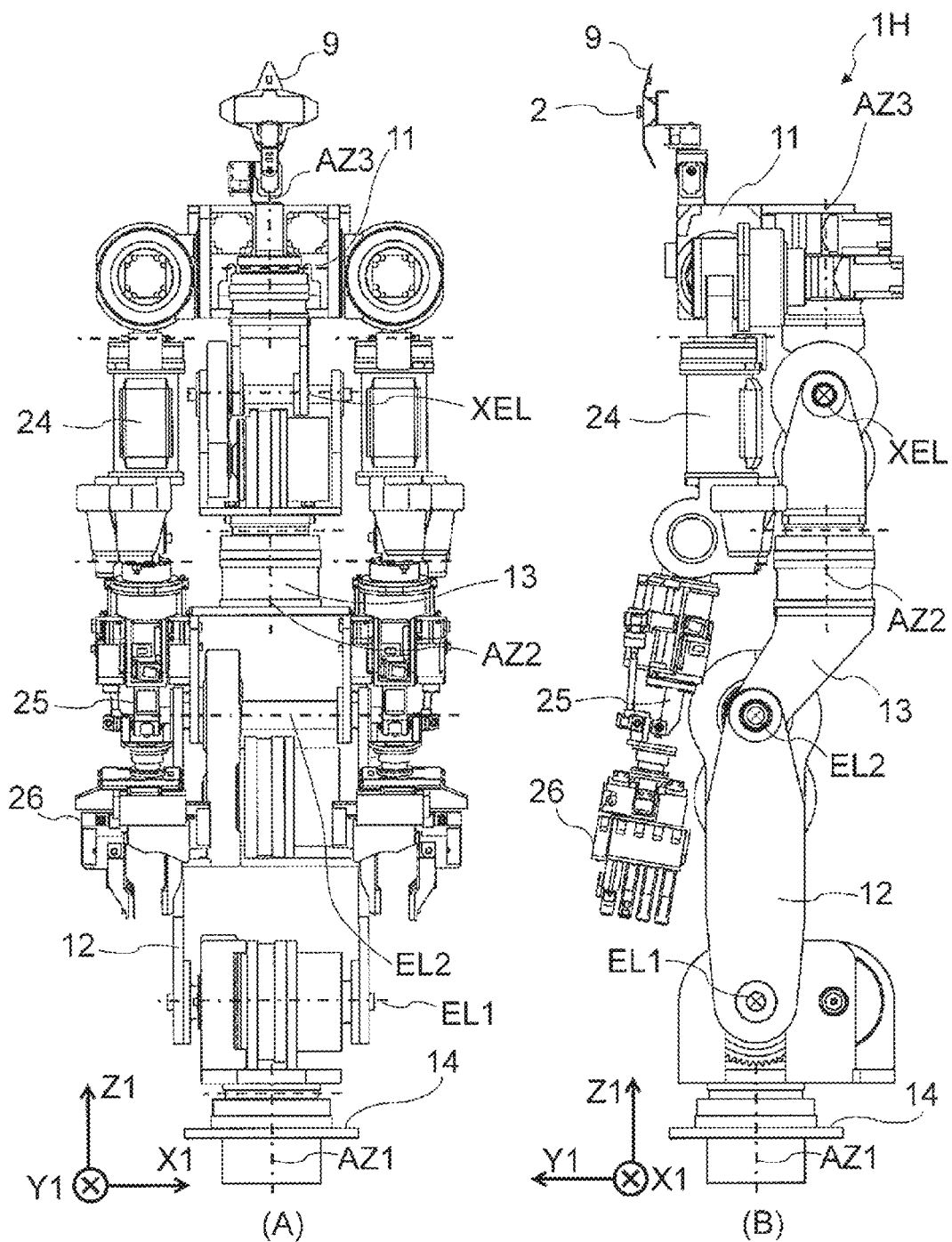
FIG. 15 is a view illustrating a rotation axis included in the robot operated by the robot operation system of the embodiment.

With reference to FIG. 15, the rotation axes included in robot 1 are described. Robot 1 excluding arm 10 has the following six rotation axes. FIG. 15 is a view illustrating the rotation axis included in robot 1.
- AZ1-axis: an azimuth rotation axis at support arm connection portion 14. The AZ1-axis coincides with the Z1-axis.
- EL1-axis: an elevation rotation axis at support arm connection portion 14.
- EL2-axis: the body inclination rotation axis at the body connection portion 13. The EL2-axis coincides with the X2-axis.
- AZ2-axis: the body rotation axis at body connection portion 13. The AZ2-axis coincides with the Z2-axis.
- XEL-axis: the body crossing rotation axis at body crossing rotation portion 23.
- AZ3-axis: a rotation axis that allows arm connection portion 19 to be rotated. The Z3-axis is referred to as an arm connection portion rotation axis. The AZ2-axis coincides with the Z3-axis.

The AZ2-axis and the XEL-axis cross on the same plane, and the AZ3-axis passes through the intersection of the AZ2-axis and the XEL-axis. That is, the AZ2-axis, the XEL-axis, and the AZ3-axis, which are the three rotation axes included in body 11, intersect at one point. In the reference state, body upper portion 20 is present directly above body lower portion 21, and the AZ2-axis and the AZ3-axis are present on the same straight line. The XEL-axis is orthogonal to the plane in which the AZ2-axis exists and is orthogonal to the plane in which the AZ3-axis exists. When it is rotated around the XEL-axis, the AZ2-axis and the AZ3-axis cross each other. The AZ2-axis, the XEL-axis, and the AZ3-axis may not cross at one point.

Because robot 1 has the AZ3-axis, the orientation of the XEL-axis can be changed with respect to arm connection portion 19 in robot 1. In the reference state, when the XEL-axis is rotated, arm connection portion 19 is rotated in the front-rear direction. In the state where the AZ3-axis is rotated by 90 degrees, when the XEL-axis is rotated, arm connection portion 19 is rotated such that either the left or the right of arm connection portion 19 becomes higher. In the state where the AZ3-axis is rotated by 45 degrees, when the XEL-axis is rotated, arm connection portion 19 is rotated such that either the left or the right of arm connection portion 19 becomes higher and also is rotated in the front-rear direction. When the AZ1-axis and the AZ3-axis are rotated by the same angle in opposite directions, in body 11, the direction in which arm connection portion 19 is directed is not changed, and the direction in which arm connection portion 19 is rotated by the rotation of the XEL-axis can be changed.

The disposition of the six rotation axes in support arm connection portion 14 and body connection portion 13 is the same as the disposition of the rotation axes of a general industrial robot including one arm. Support arm connection portion 14 and body connection portion 13 can be controlled in a similar manner to a general industrial robot.

Figure 9:
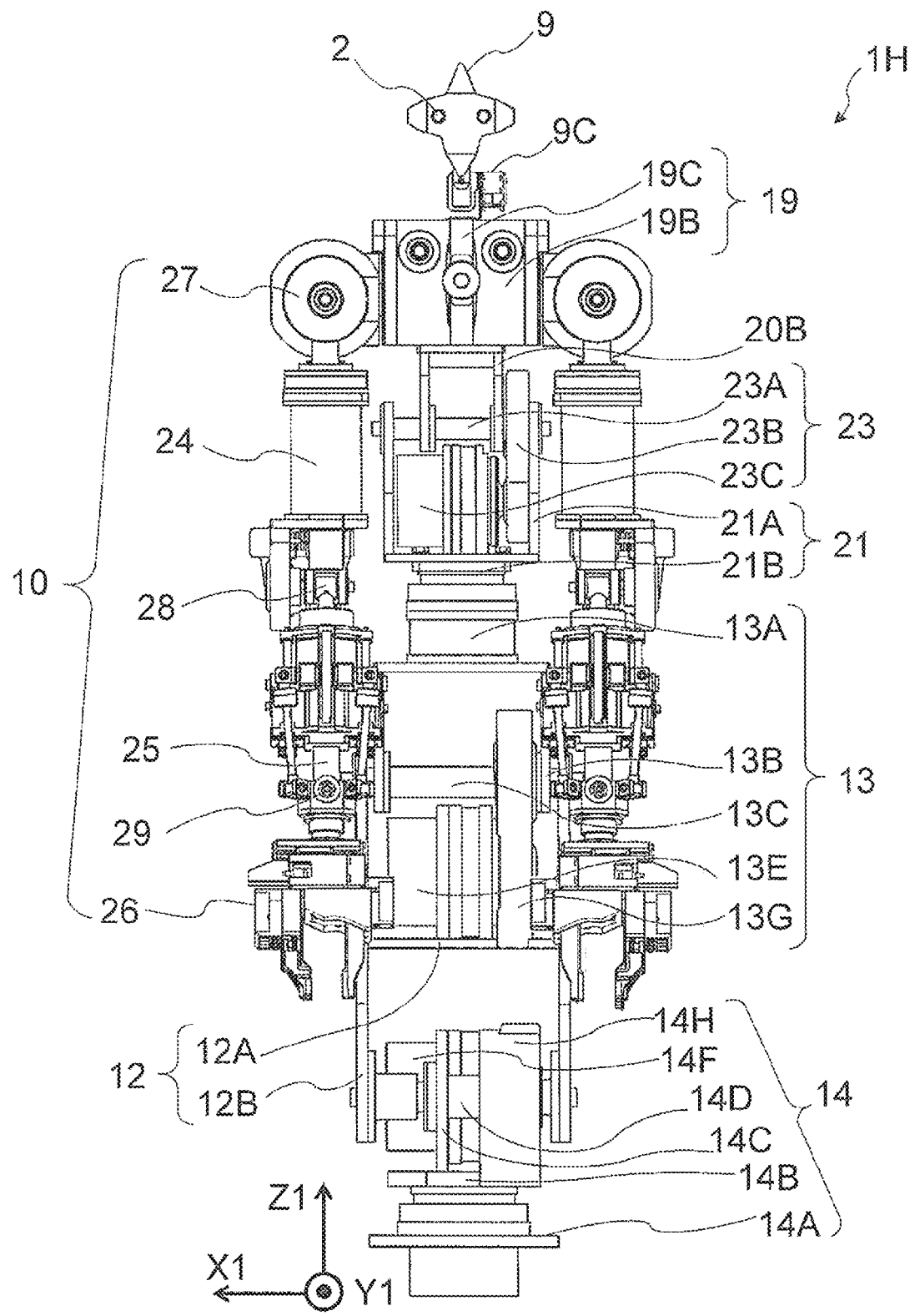
FIG. 9 is a front view illustrating the humanoid of the robot operated by the robot operation system of the embodiment.
Figure 10:
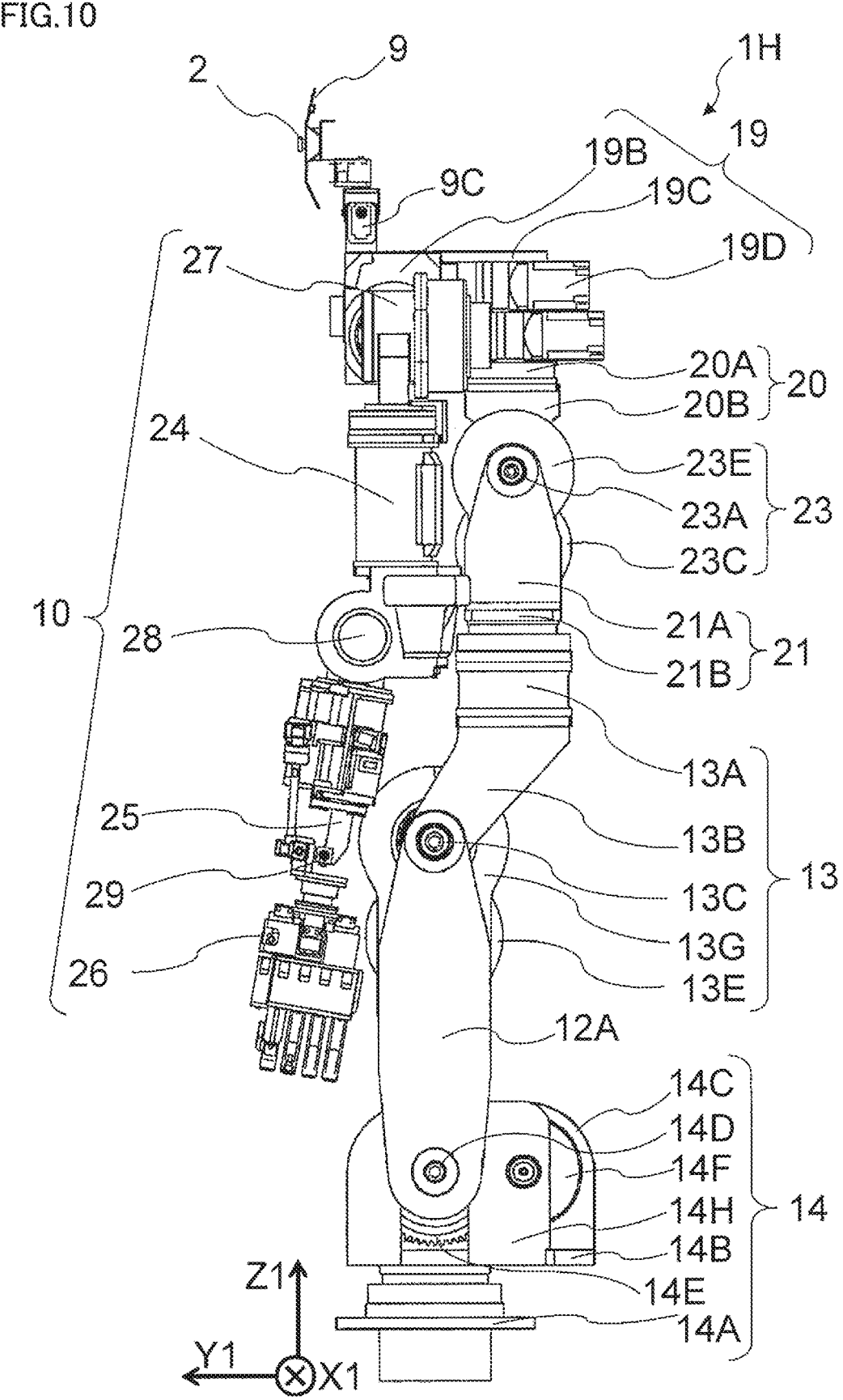
FIG. 10 is a right side view illustrating the humanoid of the robot operated by the robot operation system of the embodiment.
Figure 11:
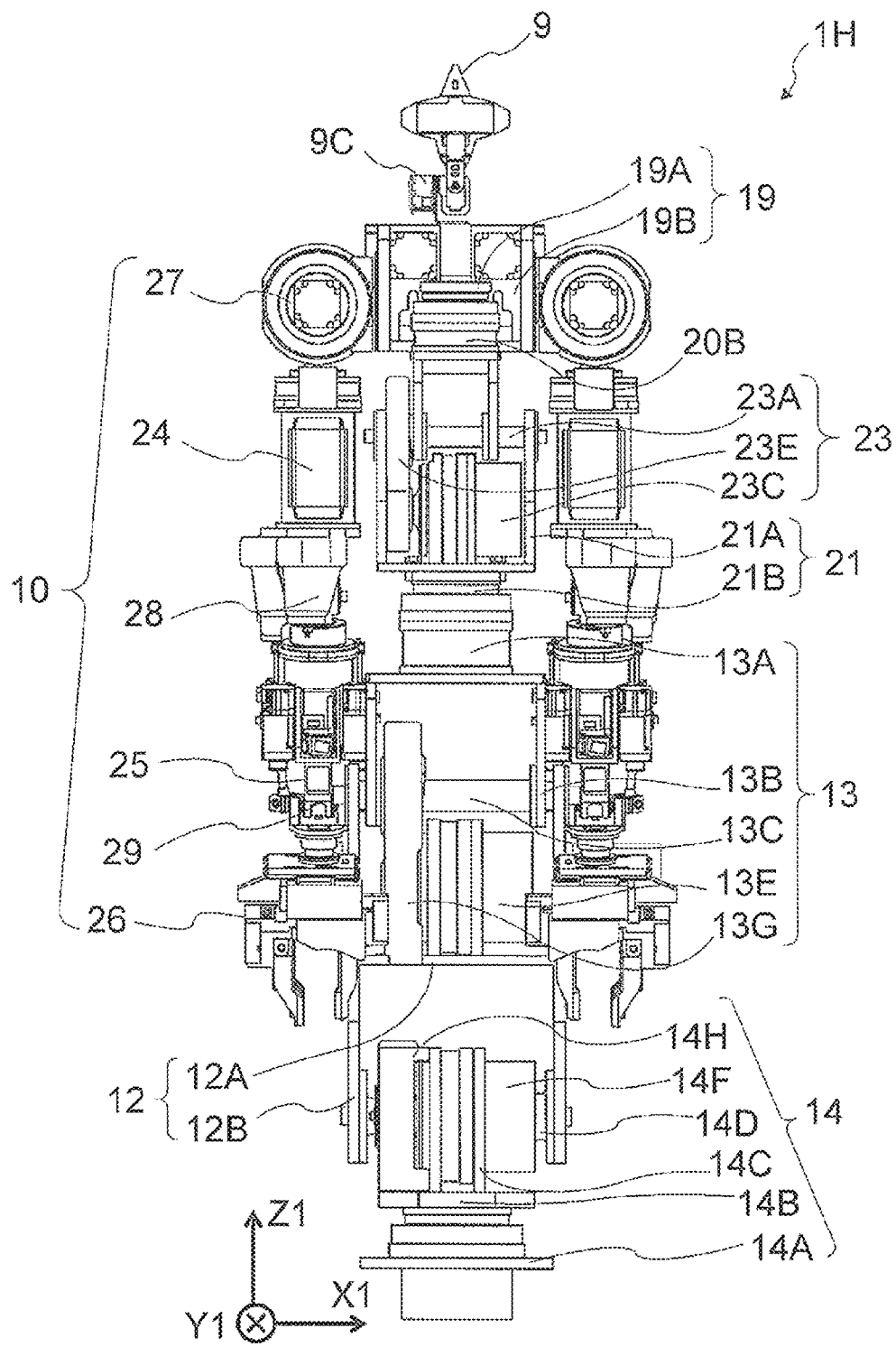
FIG. 11 is a rear view illustrating the humanoid of the robot operated by the robot operation system of the embodiment.
Figure 12:
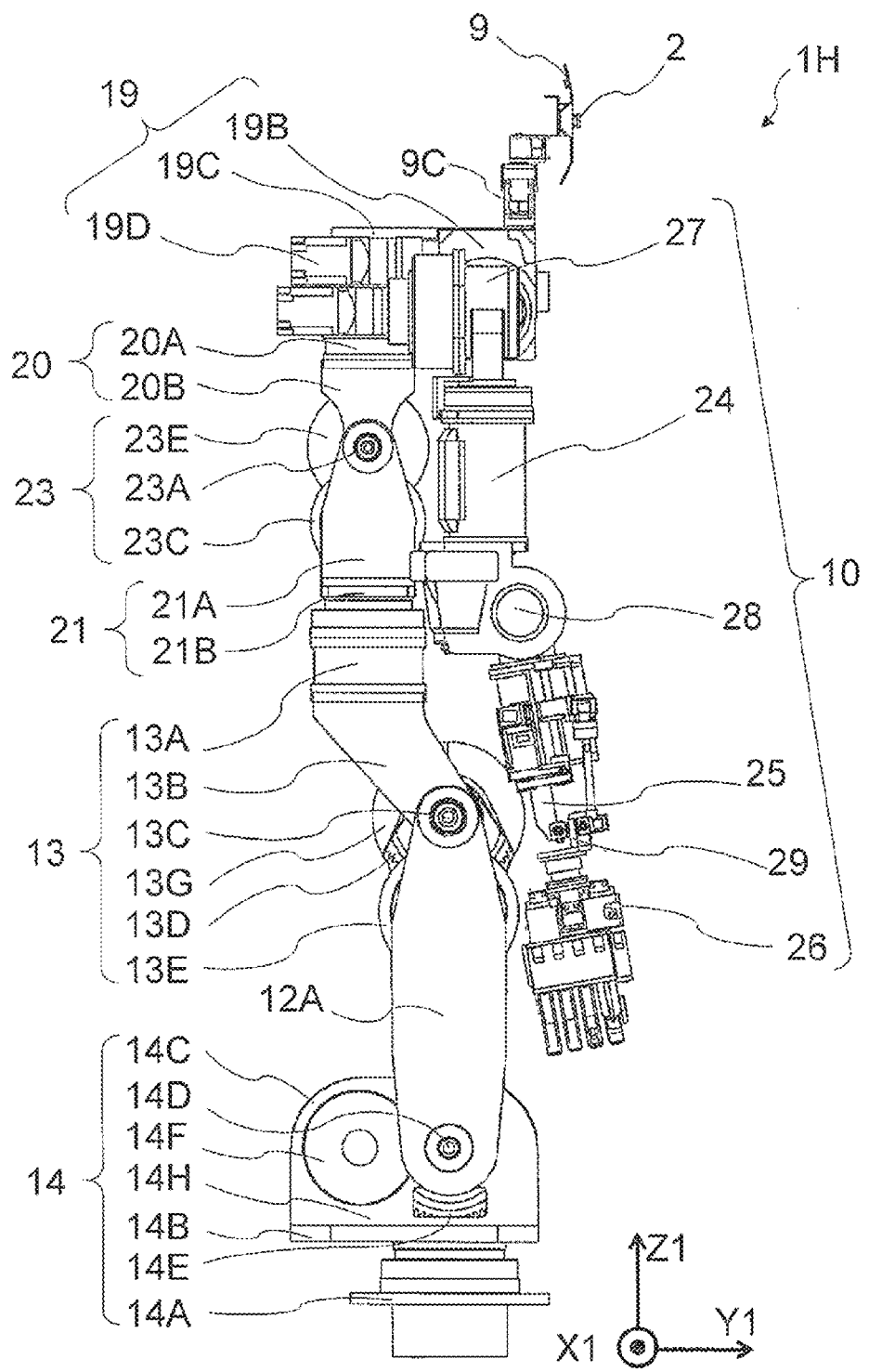
FIG. 12 is a left side view illustrating the humanoid of the robot operated by the robot operation system of the embodiment.
Figure 13:
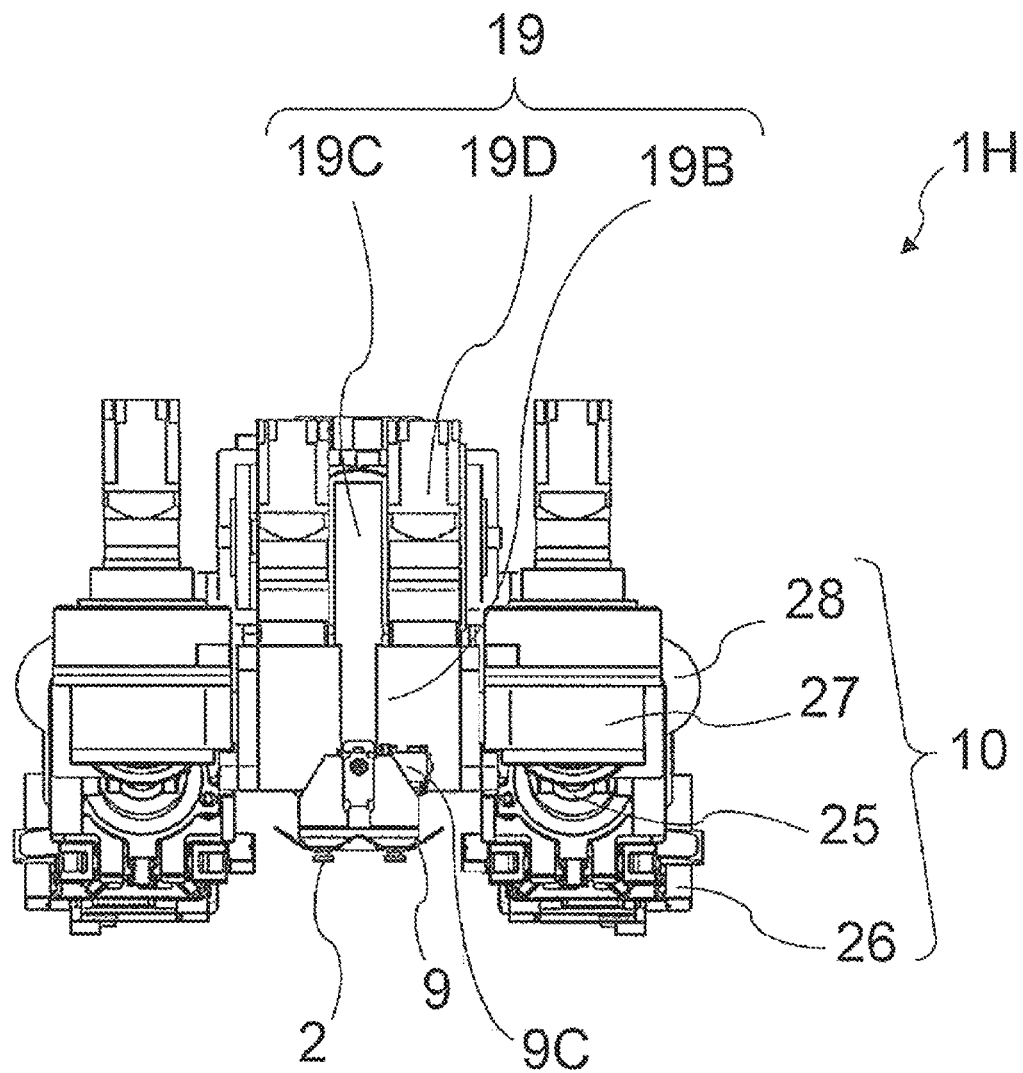
FIG. 13 is a plan view illustrating the humanoid of the robot operated by the robot operation system of the embodiment.
Figure 14:
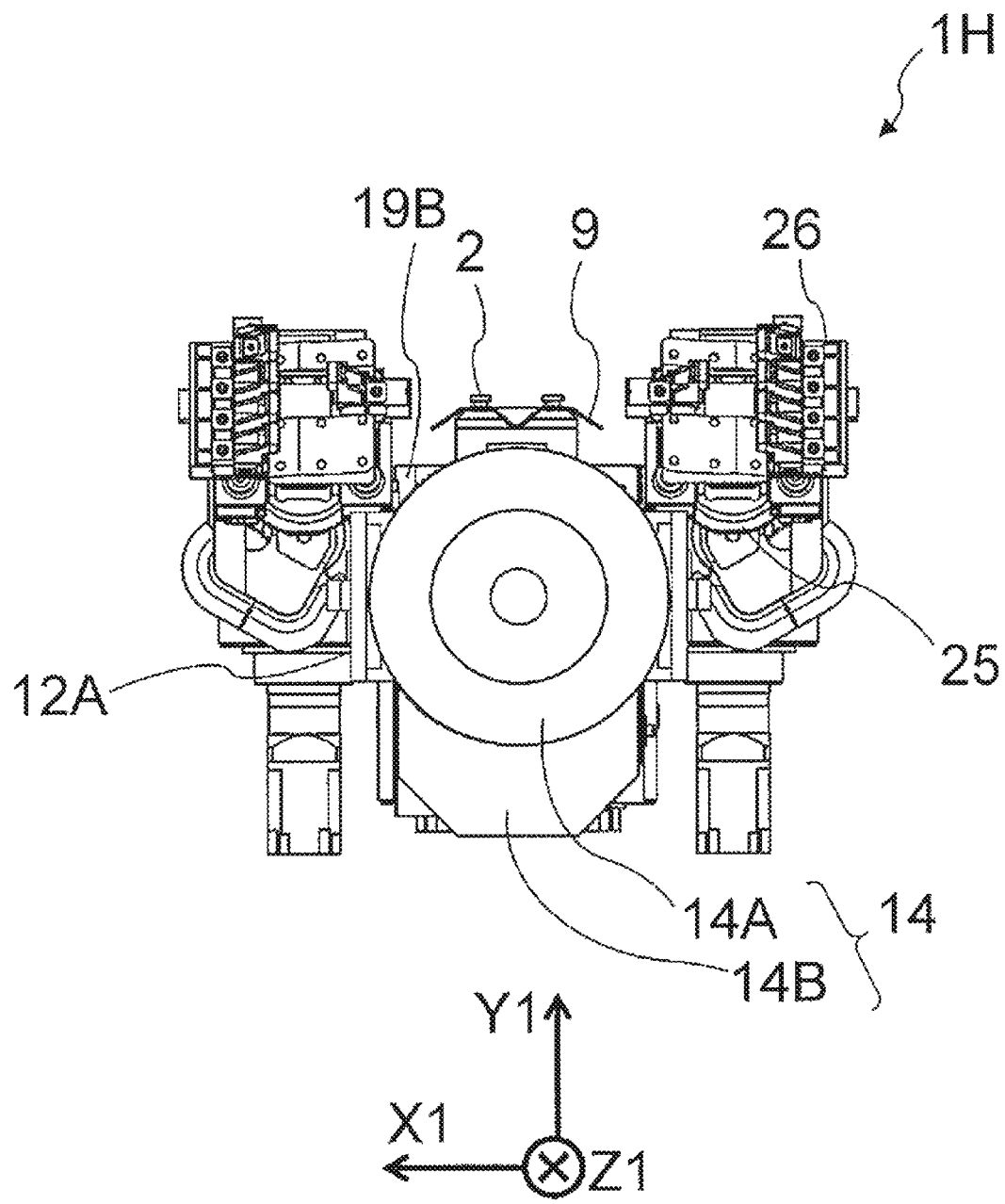
FIG. 14 is a bottom view illustrating the humanoid of the robot operated by the robot operation system of the embodiment.

The description returns to the structure of humanoid 1H. As illustrated in FIG. 9 and the like, head 9 is connected to the upper side of arm connection portion 19. A head connection portion 9C connects head 9 to arm connection portion 19 rotatably with three rotational degrees of freedom. Head 9 has a plate shape. Two on-site cameras 2 are mounted at an approximately middle position in the height direction on the front side of head 9 with a distance of about several cm. The distance to the object or the like can be recognized by calculating the parallax of the two on-site cameras 2. In the reference state, head 9 is directed to the direction of the Z3-axis. On-site camera 2 is directed to the direction of the Y3-axis. Head connection portion 9C connects head 9 to body 11 such that the angle with respect to body 11 can be changed.

For example, head connection portion 9C can rotate head 9 around the X3-axis by −90 degrees to 90 degrees, rotate head 9 around the Y3-axis by −30 degrees to 30 degrees, and rotate head 9 around the Z3-axis by −90 degrees to 90 degrees. In the reference state, the rotation angles around the X3-axis, the Y3 axis, and the Z3-axis are all zero degrees. When head 9 is directed upward, the angle of the X3-axis is positive. When head 9 is inclined to the left, the angle of the Y3-axis is positive. When viewed from above, the rotation angle around the Z3-axis is positive in the case of clockwise rotation around the Z3-axis. The rotation angle around an axis is an angle of rotation around the axis.

Arm connection portion 19 includes a disk-shaped torso connection portion 19A (illustrated in FIG. 11), two arm rotation portions 19B having a rectangular parallelepiped outer shape, and a thick plate-like arm connection structure 19C. Torso connection portion 19A is supported rotatably by body upper portion 20. Arm connection structure 19C is connected vertically to the upper side of torso connection portion 19A. Principal surfaces on both sides of arm connection structure 19C are oriented to the right-left direction. Arm rotation portions 19B each having a rectangular parallelepiped shape are connected to front parts of the principal surfaces on both sides of arm connection structure 19C. Arm rotation portion 19B contains a mechanism rotating arm 10. The disk-shaped torso connection portion 19A is connected to a rear part of the side surface facing down of arm connection structure 19C.

Two arms 10 are provided in front of the AZ3-axis that allows arm connection portion 19 to be rotated. For this reason, when arm connection portion 19 is rotated, arm 10 does not prevent the rotation.

Body upper portion 20 includes an arm connection-portion rotation portion 20A and a rotation shaft connection yoke 20B. The yokes are members facing each other, and holes or protrusions holding other members rotatably are provided in the yokes. A member, which is held in the hole or the protrusion provided in the yoke and can rotate another member, is referred to as a shaft member. Arm connection-portion rotation portion 20A is provided below torso connection portion 19A and supports torso connection portion 19A rotatably. Arm connection-portion rotation portion 20A has a cylindrical shape. Arm connection-portion rotation portion 20A allows torso connection portion 19A to be rotated around the AZ3-axis. The AZ3-axis is an axis crossing the X3-axis. The X3-axis is a rotation axis connecting two places where two arms 10 are connected to arm connection portion 19. Arm connection-portion rotation portion 20A allows arm connection portion 19 to be rotated around the AZ3-axis with respect to body upper portion 20.

Rotation shaft connection yoke 20B is a member that connects arm connection-portion rotation portion 20A to rotation shaft member 23A of the body crossing rotation portion 23. Rotation shaft connection yoke 20B has a configuration including two plate-like parts that face each other and to which rotation shaft member 23A is connected and penetrates, and a plate-like part connecting upper portions of the two plates. Arm connection-portion rotation portion 20A is connected to the upper side of the plate-like part in an upper portion of rotation shaft connection yoke 20B. Rotation shaft connection yoke 20B is rotated together with rotation shaft member 23A when rotation shaft member 23A is rotated.

Body lower portion 21 includes a rotation shaft holding yoke 21A and a vertical columnar portion 21B. Rotation shaft holding yoke 21A holds rotation shaft member 23A rotatably. Rotation shaft holding yoke 21A has a shape having two plate-like parts facing each other and a plate-like part connecting lower portions of the two plates. Two plate-like parts facing each other support rotation shaft member 23A rotatably. Vertical columnar portion 21B is a columnar member connected onto the lower side of rotation shaft holding yoke 21A.

Body crossing rotation portion 23 includes a rotation shaft member 23A, a rotation axis gear 23B, a motor 23C, a drive gear 23D, and a gear cover 23E. Rotation shaft member 23A is a shaft member constituting the XEL-axis. In the reference state, the XEL-axis is parallel to the X1-axis. Rotation shaft member 23A is held by rotation shaft holding yoke 21A rotatably. Rotation shaft connection yoke 20B of body upper portion 20 is connected to rotation shaft member 23A. When rotation shaft member 23A is rotated, body upper portion 20 also is rotated. Rotation axis gear 23B is a gear fixed to rotation shaft member 23A. Rotation axis gear 23B is provided on the side where right arm 10 exists in rotation shaft member 23A. Motor 23C generates power rotating rotation axis gear 23B. Motor 23C is located on the place where being inside of rotation shaft holding yoke 21A. Drive gear 23D is a gear that is rotated when motor 23C rotates. Drive gear 23D meshes with rotation axis gear 23B. When drive gear 23D is rotated, rotation axis gear 23B, rotation shaft member 23A, and body upper portion 20 are also rotated. Gear cover 23E is a cover that covers rotation axis gear 23B and drive gear 23D.

Body support arm 12 includes two side plates 12A and a coupling plate 12B that couples side plates 12A. The upper ends of two side plates 12A hold a rotation shaft member 13C of body connection portion 13 rotatably. Rotation shaft member 13C is a member that is the rotation shaft of EL2-axis that allows body connection portion 13 to be rotated with respect to body support arm 12. A rotation shaft member 14C of support arm connection portion 14 is connected to the lower ends of two side plates 12A. Body support arm 12 disposes body 11 at a fixed position with respect to vehicle portion 1W. Body support arm 12 corresponds to a leg in a human.

Body connection portion 13 connects body 11 to body support arm 12 rotatably with two rotational degrees of freedom. Body connection portion 13 connects body 11 to body support arm 12 so as to be rotatable around the AZ2-axis and the EL2-axis. Body connection portion 13 allows the angle of body 11 to be changed with respect to body support arm 12. Body connection portion 13 corresponds to a waist in a human.

Body connection portion 13 includes a body rotation portion 13A, a rotation shaft connection yoke 13B, a rotation shaft member 13C, a rotation axis gear 13D, a motor 13E, a drive gear 13F, and a gear cover 13G. Body rotation portion 13A has a cylindrical outer shape. Body rotation portion 13A supports vertical columnar portion 21B so as to be rotatable around the AZ2-axis. Vertical columnar portion 21B is a columnar portion located at the lowest position of body lower portion 21. A motor and a gear that rotate vertical columnar portion 21B are provided inside body rotation portion 13A. A lower portion of rotation shaft connection yoke 13B protrudes forward. In the reference state, body rotation portion 13A is located on the rear side of body support arm 12.

Rotation shaft connection yoke 13B is connected to the lower side of body rotation portion 13A. Rotation shaft connection yoke 13B has a shape having two plate-like parts facing each other and a plate-like part connecting the upper portions of the two plates. Body rotation portion 13A is connected onto the upper side of the plate-like part of rotation shaft connection yoke 13B. Two plate-like parts facing each other and included in rotation shaft connection yoke 13B are sandwiched between two side plates 12A, and rotation shaft member 13C is connected to the inside surfaces of two plate-like parts facing each other. When rotation shaft member 13C is rotated, rotation shaft connection yoke 13B and body rotation portion 13A are rotated together. Rotation axis gear 13D is connected to rotation shaft member 13C. Rotation axis gear 13D is provided on the side where right arm 10 exists in rotation shaft member 13C. Motor 13E generates power rotating rotation axis gear 13D. Motor 13E is placed on the upper side of coupling plate 12B of body support arm 12. Drive gear 13F is a gear driven by motor 13E. Drive gear 13F meshes with rotation axis gear 13D. When drive gear 13F is rotated, rotation axis gear 13D is rotated. When rotation axis gear 13D is rotated, the member on the side of body 11 of body connection portion 13 including rotation shaft member 13C is rotated.

Support arm connection portion 14 connects body support arm 12 to vehicle portion 1W so as to be rotatable with two rotational degrees of freedom. Support arm connection portion 14 connects body support arm 12 to vehicle portion 1W so as to be rotatable around the AZ1-axis and the EL1-axis. The AZ1-axis is a rotation axis parallel to the height direction of vehicle portion 1W. The EL1-axis is a rotation axis that allows the angle formed by body support arm 12 and the AZ1-axis to be changed. Support arm connection portion 14 includes a support arm rotation portion 14A, a support arm base 14B, a rotation shaft holding yoke 14C, a rotation shaft member 14D, a rotation axis gear 14E, a motor 14F, a drive gear 14G (not illustrated), and a gear cover 14H. Support arm rotation portion 14A has a cylindrical outer shape with a flange. Support arm rotation portion 14A is installed in a recess provided in the upper surface of vehicle portion 1W. A cylindrical portion of support arm rotation portion 14A exists in vehicle portion 1W. The flange of support arm rotation portion 14A comes out on the bottom surface of the recessed part of vehicle portion 1W. Support arm rotation portion 14A supports support arm base 14B existing thereon rotatably around the AZ1-axis. Support arm rotation portion 14A contains the motor and the gear that rotate support arm base 14B. Support arm base 14B is a member in which a substantially rectangular plate material is connected onto a disk-shaped member. The disk-shaped member of support arm base 14B is supported by support arm rotation portion 14A rotatably.

Rotation shaft holding yoke 14C is two plate members facing each other and connected onto the upper side of support arm base 14B. Rotation shaft holding yoke 14C holds rotation shaft member 14D rotatably. Rotation shaft member 14D is a member that is the rotation shaft of the EL1-axis that allows body support arm 12 to be rotated with respect to vehicle portion 1W. Rotation axis gear 14E is connected to rotation shaft member 14D. In rotation shaft member 14D, rotation axis gear 14E is provided on the side where right arm 10 exists with respect to rotation shaft holding yoke 14C. Motor 14F generates power rotating rotation axis gear 14E. Motor 14F is installed in a through-hole made in rotation shaft holding yoke 14C and is supported by rotation shaft holding yoke 14C. Drive gear 14G is driven by the rotation of motor 14F. Drive gear 14G meshes with rotation axis gear 14E. When drive gear 14G is rotated, rotation axis gear 14E and rotation shaft member 14D are rotated. Gear cover 14H is a cover that covers rotation axis gear 14E and drive gear 14.

Support arm connection portion 14 is rotatable around the AZ1-axis in a range of, for example, −160 degrees to 180 degrees. Support arm connection portion 14 is rotatable around the EL1-axis in the range of, for example, −70 degrees to 95 degrees. Here, the rotation angle around the AZ1-axis is set to zero degree when the direction in which humanoid 1H is directed is parallel to the direction in which vehicle portion 1W is directed. The angle of the AZ1-axis is set to be positive in the case of clockwise rotation when viewed from above. When body support arm 12 is orthogonal to the upper surface of vehicle portion 1W, the rotation angle around the EL1-axis is set to zero degrees. When body support arm 12 is inclined forward, the angle of the EL1-axis is positive.

Body connection portion 13 is rotatable around the EL2-axis in a range of, for example, −105 degrees to 150 degrees. Body connection portion 13 is rotatable around the AZ2-axis is in a range of, for example, −95 degrees to 95 degrees.

Here, the rotation angle around the EL2-axis is set to zero degree when the direction in which body support arm 12 extends and the direction of the AZ2-axis are parallel. When body lower portion 21 is inclined forward with respect to body support arm 12, the angle of the EL2-axis is positive. The rotation angle around the AZ2-axis is set to zero degrees when the direction in which body 11 is directed is parallel to the direction in which body support arm 12 is directed. When body 11 is rotated clockwise as viewed from above, the angle of the AZ2-axis is set to be positive.

For example, body crossing rotation portion 23 is rotatable around the XEL-axis in a range of −95 degrees to 95 degrees. Here, the rotation angle around the XEL-axis is set to zero degrees when the AZ3-axis is parallel to the AZ2-axis. In the reference state, the angle of the XEL-axis is zero degrees. In the reference state, when body upper portion 20 is moved onto the front side of body lower portion 21, the angle of the XEL-axis is set to be positive.

For example, arm connection-portion rotation portion 20A is rotatable around the AZ3-axis in a range of −185 degrees to 185 degrees. When the direction in which arm connection portion 19 is directed is the same as the direction in which body upper portion 20 is directed, the rotation angle around the AZ3-axis is set to zero degrees. When arm connection portion 19 is rotated clockwise as viewed from above, the angle of the AZ3-axis is set to be positive.

In robot 1, two arms 10 can be moved largely with respect to vehicle portion 1W, and two arms 10 can be directed in the direction suitable for the work. When the obstacle or the like exists, robot 1 can take the posture to avoid the obstacle or the like. That is, even in the case where the degree of freedom of moving toward the object to be held or operated is high and the work difficulty level is high due to the obstacle or the like, robot 1 can cope with the case flexibly. In addition, the driving range for moving can be expanded, and the work can be performed in a wider space. With body support arm 12, the position of arm connection portion 19 can be disposed at an arbitrary position in a three-dimensional space having the determined range. Furthermore, the positions of two arm 10 can be disposed at any position in a three-dimensional space determined with respect to arm connection portion 19 and having a determined range.

By controlling head connection portion 9C according to the posture of robot 1, the on-site camera 2 can be directed in the direction in which hand 26 is present.

Figure 16:
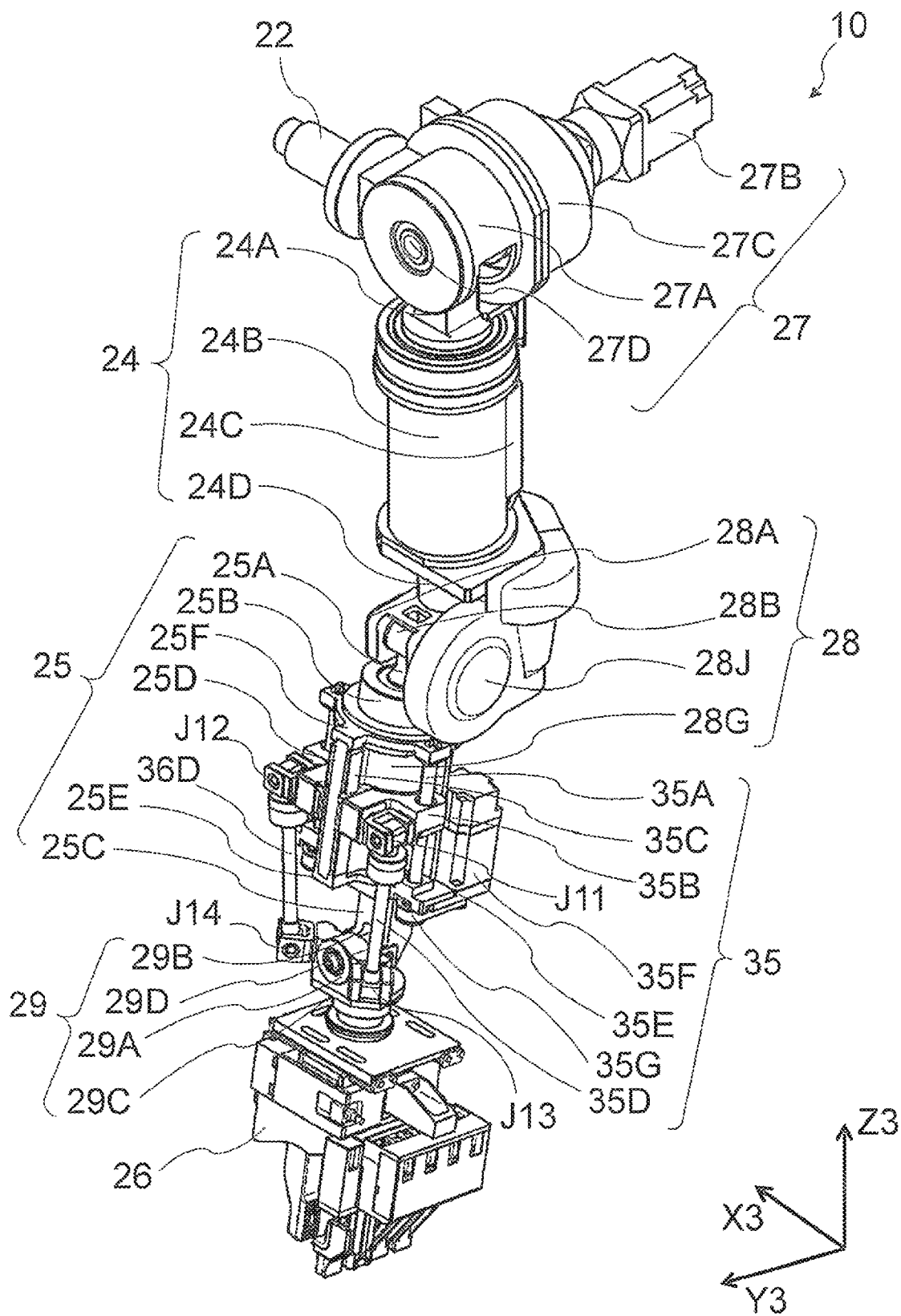
FIG. 16 is a perspective view illustrating an arm included in the robot operated by the robot operation system of the embodiment.
Figure 17:
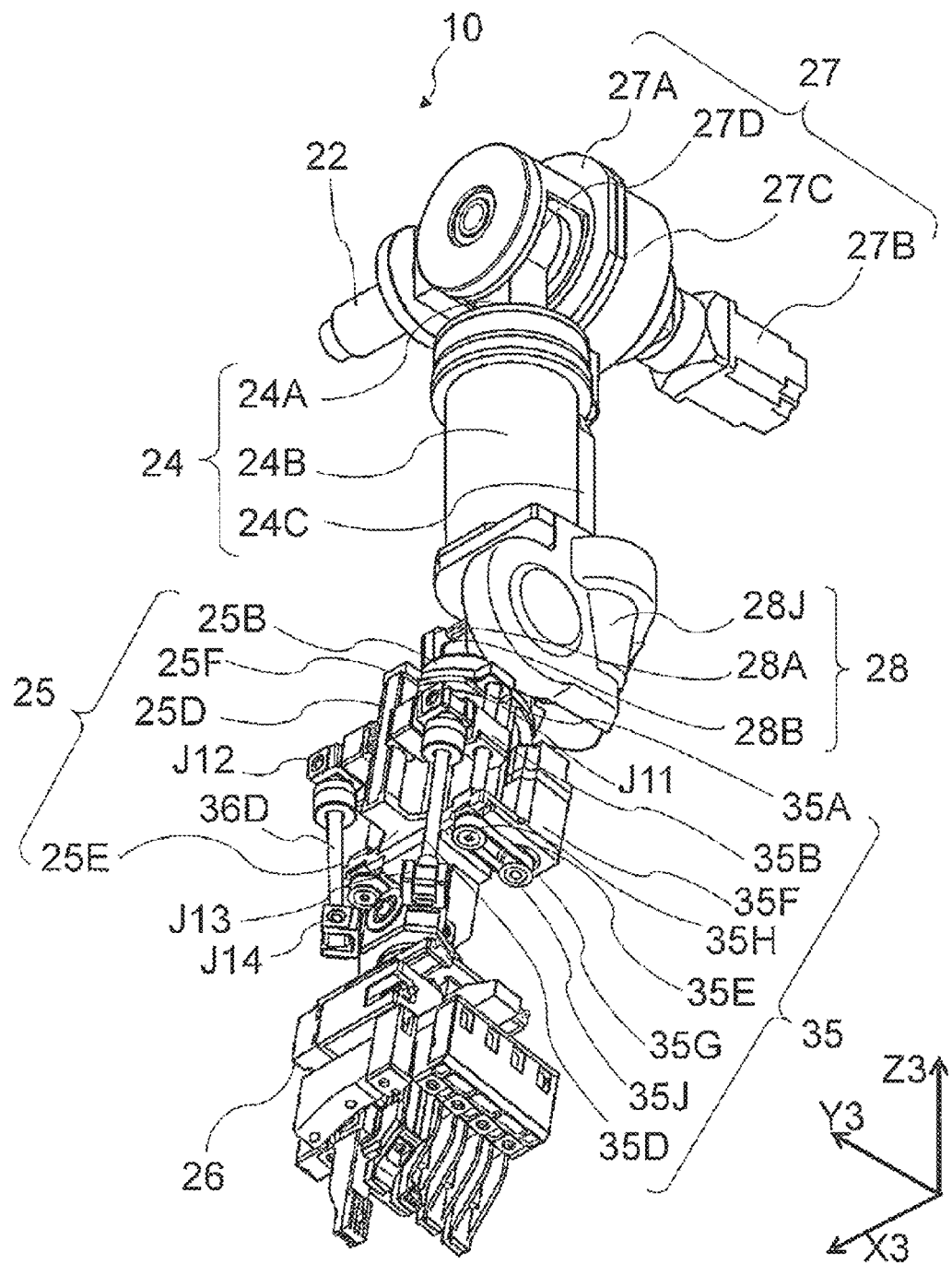
FIG. 17 is another perspective view illustrating the arm included in the robot operated by the robot operation system of the embodiment.
Figure 18:
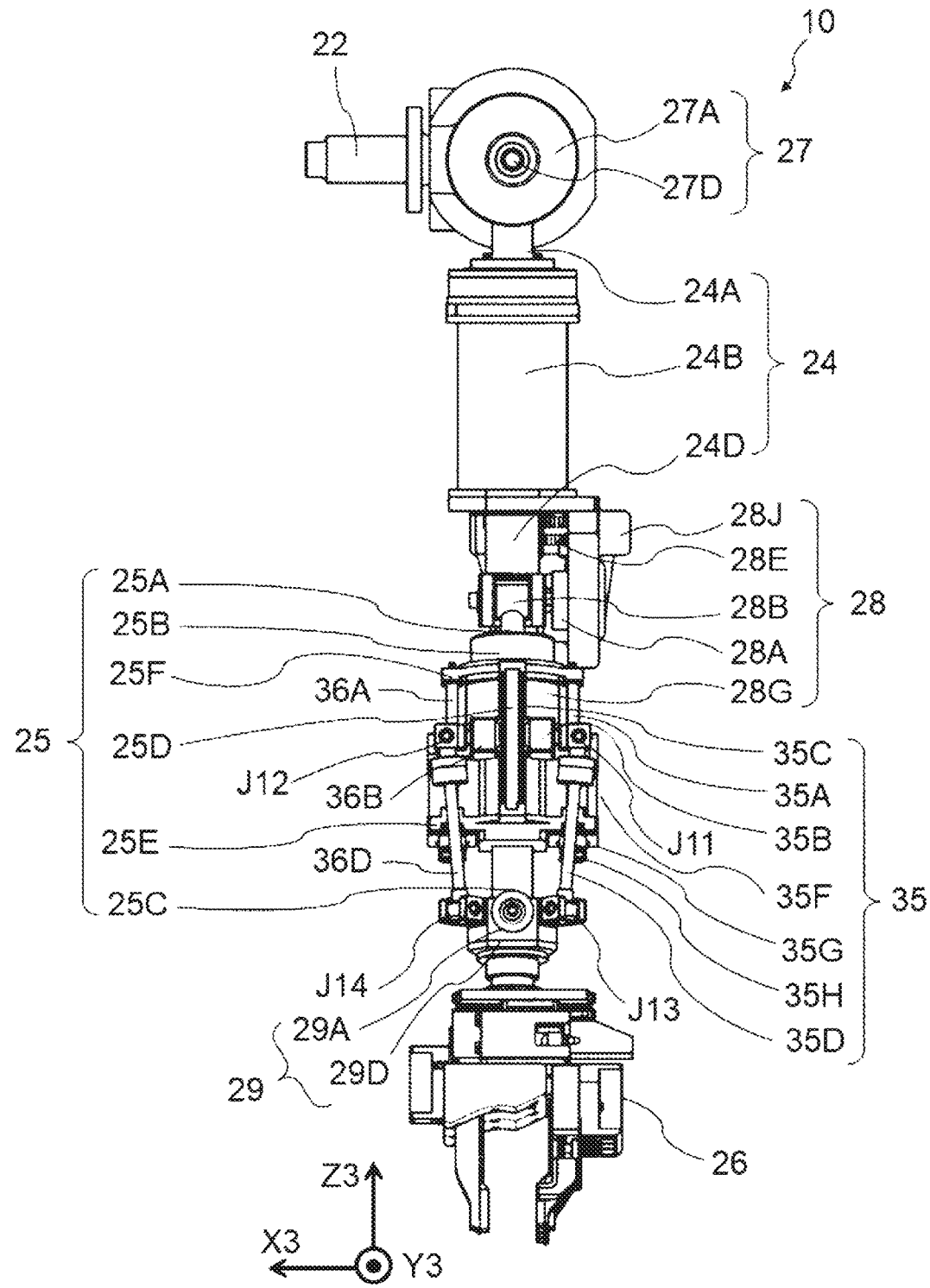
FIG. 18 is a front view illustrating the arm included in the robot operated by the robot operation system of the embodiment.
Figure 19:
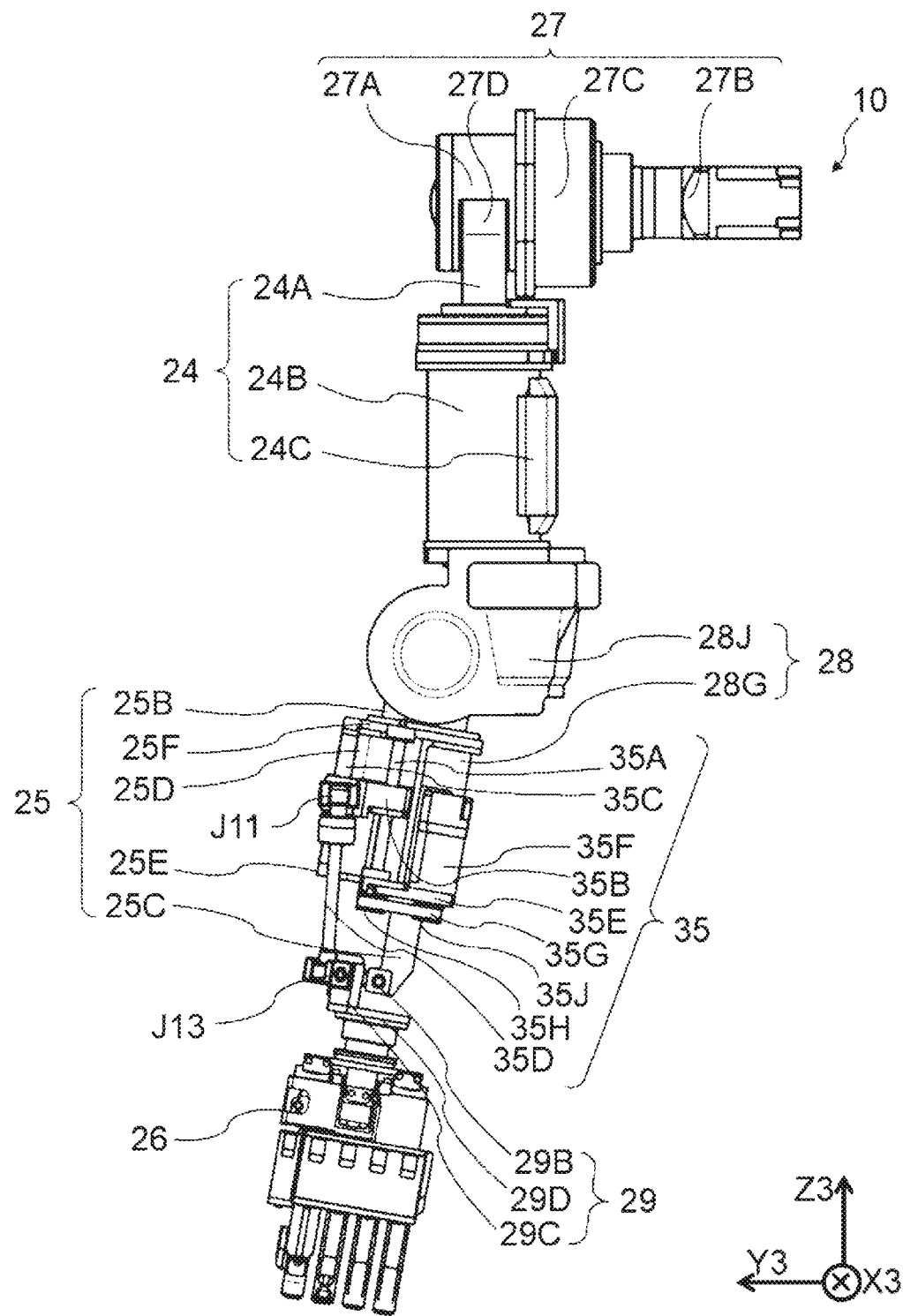
FIG. 19 is a right side view illustrating the arm included in the robot operated by the robot operation system of the embodiment.

With reference to FIGS. 16 to 23, the structure of arm 10 is described. FIG. 16 is a perspective view of arm 10. FIG. 17 is another perspective view of arm 10. FIGS. 18 to 23 are a front view, a right side view, a rear view, a left side view, a plan view, and a bottom view of arm 10.

In arm 10, an arm base 22, an upper arm 24, a forearm 25, and a hand 26 are connected in series. Arm base 22 is supported rotatably by arm connection portion 19. Upper arm 24 is connected to arm base 22 by a shoulder joint 27 rotatably with two rotational degrees of freedom. Forearm 25 is connected to upper arm 24 rotatably with two rotational degrees of freedom by an elbow joint 28. Hand 26 is connected to forearm 25 rotatably with two rotational degrees of freedom by a wrist joint 29.

Figure 24:
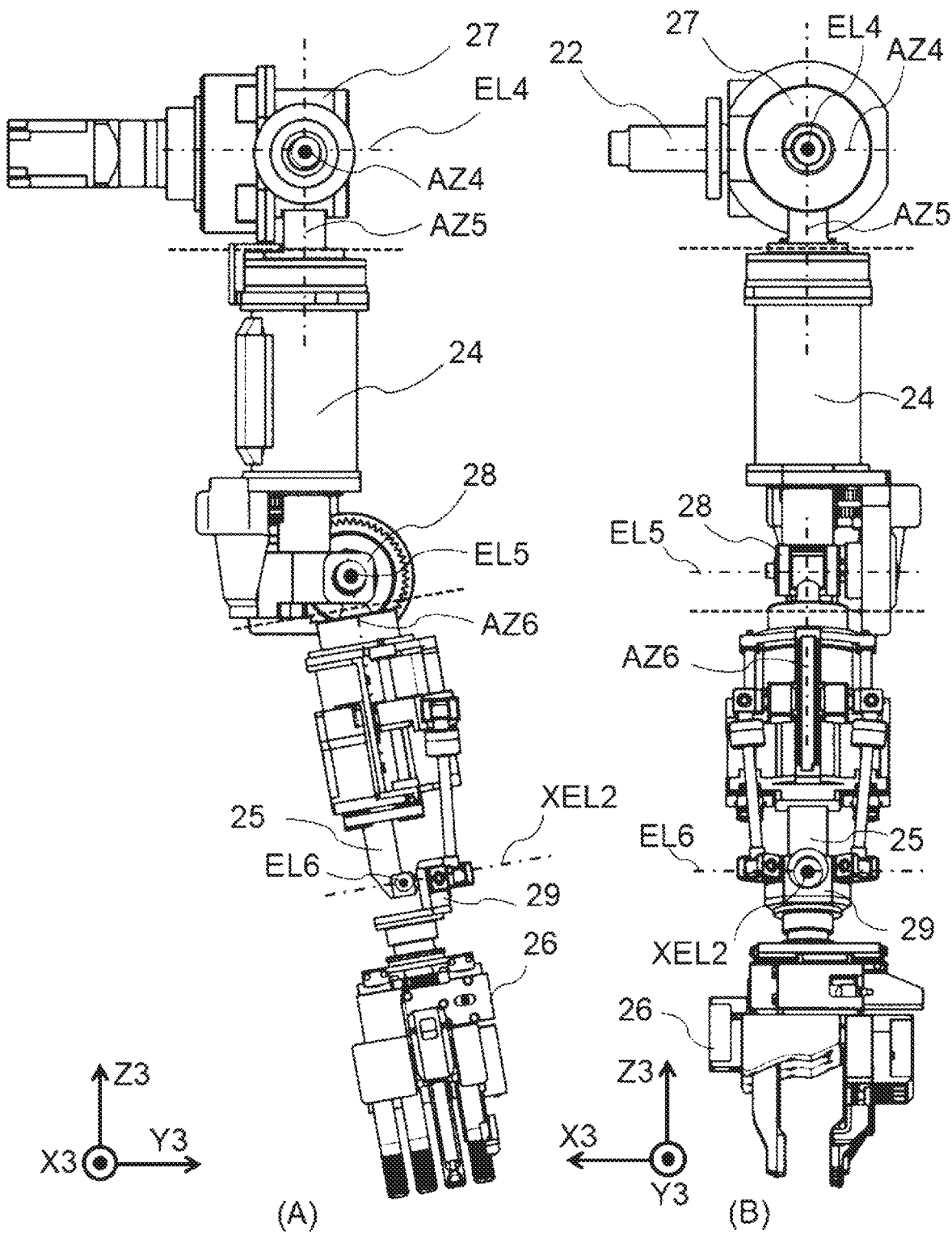
FIG. 24 is a view illustrating the rotation axes included in the arm of the robot operated by the robot operation system of the embodiment.

With reference to FIG. 24, the rotation axes included in arm 10 are described. FIG. 24 is a view illustrating the rotation axis included in arm 10. FIG. 24(A) is a left side view of left arm 10, and FIG. 24(B) is a front view of left arm 10.

Arm 10 has the following seven rotation axes.

AZ4-axis: A rotation axis that allows arm 10 to be rotated with respect to arm connection portion 19. A rotation axis that passes through arm base 22 to rotate arm base 22. The AZ4-axis is referred to as an arm base rotation axis. The rotation angle around the AZ4-axis is referred to as an arm base rotation angle. The arm base rotation angle is represented by a variable $\theta_{AZ4}$.

EL4-axis: A rotation axis that allows an angle formed by upper arm 24 and arm base 22 to be changed. The EL4-axis is orthogonal to the AZ4-axis. The rotation angle around the EL4-axis is referred to as an upper arm inclination angle. The upper arm inclination angle is represented by a variable $\delta_{EL4}$.

AZ5-axis: A rotation axis that passes through upper arm 24 and allows upper arm 24 to be rotated. The AZ5-axis is orthogonal to the EL4-axis. The AZ5-axis is referred to as an upper arm rotation axis. The rotation angle around the AZ5-axis is referred to as an upper arm rotation angle. The upper arm rotation angle is represented by a variable $\theta_{AZ5}$.

EL5-axis: A rotation axis that allows an angle formed by forearm 25 and upper arm 24 to be changed. The EL5-axis is orthogonal to the AZ5-axis. The rotation angle around the EL5-axis is referred to as a forearm inclination angle. The forearm inclination angle is represented by a variable $\delta_{EL5}$.

AZ6-axis: A rotation axis that passes through forearm 25 and allows forearm 25 to be rotated. The AZ6-axis is orthogonal to the EL5-axis. The AZ6-axis is referred to as a forearm rotation axis. The rotation angle around the AZ6-axis is referred to as a forearm rotation angle. The forearm rotation angle is represented by a variable $\theta_{AZ6}$.

EL6-axis: a rotation axis that allows the angle formed by hand 26 and forearm 25 (AZ6-axis) to be rotated on a plane including the AZ6-axis and the XEL2-axis (front-rear direction rotation plane). The EL6-axis is orthogonal to the AZ6-axis and the XEL2-axis. The rotation angle around the EL6-axis is referred to as a hand first inclination angle. The hand first inclination angle is represented by a variable $\delta_{EL6}$.

XEL2-axis: A rotation axis that allows the angle formed by hand 26 and forearm 25 (AZ6-axis) to be rotated on a plane including the AZ6-axis and the EL6-axis (left-right rotation plane). The XEL2-axis is orthogonal to the AZ6-axis and the EL6-axis. The rotation angle around the XEL2-axis is referred to as a hand second inclination angle. The hand second inclination angle is represented by a variable $\delta_{XEL2}$.

The front-rear direction rotation plane is a first plane including the AZ6-axis. The right-left direction rotation plane is a second plane that intersects with the front-rear direction rotation plane and includes the AZ6-axis. Although the calculation becomes complicated, the first plane and the second plane may not be orthogonal to each other. The first plane and the second plane may include the AZ6-axis and intersect with each other.

The AZ4-axis is a rotation axis that allows arm base 22 to be rotated with respect to arm connection portion 19. The EL4-axis and the AZ5-axis are rotation axes that change the connection angle between arm base 22 and upper arm 24 in shoulder joint 27. The EL5-axis and the AZ6-axis are rotation axes that change the connection angle between upper arm 24 and forearm 25 in elbow joint 28. The EL6-axis and the XEL2-axis are rotation axes that change the connection angle between forearm 25 and hand 26 at wrist joint 29. The front-rear direction rotation plane and the right-left direction rotation plane are two planes that pass through forearm 25 and are orthogonal to each other.

The AZ4-axis is perpendicular to arm connection portion 19. The AZ4 shaft may cross arm connection portion 19. The AZ4-axis is also referred to as a shoulder rotation axis. The shoulder rotation axis is a rotation axis that crosses arm connection portion 19. The rotation angle around the AZ4-axis is referred to as an arm base rotation angle or a shoulder rotation angle.

Arm base 22 has a columnar shape. Arm base 22 is inserted rotatably into a hole made in arm rotation portion 19B included in arm connection portion 19. Motor 19D is inserted into arm rotation portion 19B from the rear side. Inside arm rotation portion 19B, a worm gear mechanism that allows arm base 22 to be rotated by rotational torque outputted from motor 19D is contained. A worm wheel (not illustrated) is provided at the end of arm base 22. The worm wheel meshes with a worm (not illustrated) that is rotated by the rotation of motor 19D. When motor 19D and the worm rotate, the worm wheel, arm base 22, and arm 10 are rotated around the AZ4-axis. In the reference state, Arm 10 is rotated in the front-rear direction of humanoid 1H. A flange is provided at an end of arm base 22 on the side of shoulder joint 27. Shoulder joint 27 is connected to the flange of arm base 22. Arm base 22 is rotated around the AZ4-axis. The AZ4-axis passes through the center of arm base 22 having the columnar shape. The hole made in arm rotation portion 19B and to which arm base 22 is inserted rotatably is an arm base joint 22A (reference numeral is not illustrated) that connects arm base 22 to body 11 rotatably with at least one rotational degree of freedom.

For example, the rotatable range of arm base 22 is the range of −35 degrees to 180 degrees. Here, the angle (arm base rotation angle) at which arm base 22 is rotated around the AZ4-axis is set such that the arm base rotation angle is zero degrees when upper arm 24 is directed downward and such that the arm base rotation angle is positive when upper arm 24 is rotated forward. Upper arm 24 can be directed right above by the rotation of arm base 22. Upper arm 24 can be rotated from the direction directly downward to behind by 35 degrees. For example, an arm base rotation angle $\theta_{AZ4}$ can take any value within the range of −35 degrees≤$\theta_{AZ4}$≤180 degrees.

Shoulder joint 27 may be considered to include a mechanism that allows intermediate cylindrical portion 24B to be rotated with respect to joint connected portion 24A. In this case, shoulder joint 27 connects upper arm 24 to arm base 22 rotatably with two rotational degrees of freedom. Shoulder joint 27 enables the rotation around the upper arm rotation axis (AZ5-axis) passing through upper arm 24 and the rotation around the rotation axis (EL4-axis) that allows the angle formed by upper arm 24 and arm base 22 to be changed. The rotation of shoulder joint 27 around axis AZ5 rotates upper arm 24 and forearm 25. When upper arm 24 is rotated around the AZ5-axis, the structure is simpler than when forearm 25 is rotated around the AZ5-axis by elbow joint 28.

Shoulder joint 27 may be considered to connect arm 24 to upper arm base 22 rotatably with one rotational degree of freedom around the EL4-axis. The mechanism that enables upper arm 24 to be rotated around the upper arm rotation axis (AZ5-axis) may be considered to be provided in upper arm 24 rather than in shoulder joint 27. In this case, shoulder joint 27 connects upper arm 24 to arm base 22 rotatably with at least one rotational degree of freedom. Upper arm 24 is rotatable around the upper arm rotation axis passing through upper arm 24.

In addition to considering that the shoulder joint includes the mechanism to rotate intermediate cylindrical portion 24B with respect to joint connected portion 24A, arm base 22 and arm base joint 22A may be considered as a part of the shoulder joint. In this case, the shoulder joint connects upper arm 24 to arm rotation portion 19B so as to be rotatable with three rotational degrees of freedom. The three rotational degrees of freedom of the shoulder joint are rotational degrees of freedom around the AZ4-axis, the EL4-axis, and the AZ5-axis. Because arm rotation portion 19B is included in arm connection portion 19, the shoulder joint connects upper arm 24 to arm connection portion 19 so as to be rotatable with three rotational degrees of freedom. Because arm connection portion 19 is included in body 11, the shoulder joint connects upper arm 24 to body 11 so as to be rotatable with three rotational degrees of freedom. The shoulder joint connects arm 10 to body 11 rotatably with two rotational degrees of freedom.

In shoulder joint 27, for example, the rotatable range around the EL4-axis is −10 degrees to 75 degrees. Here, the rotation angle (upper arm inclination angle) of the EL4-axis in shoulder joint 27 is set to zero degree when upper arm 24 is orthogonal to arm base 22. When the angle formed by upper arm 24 and arm base 22 becomes small, namely, when upper arm 24 is rotated so as to be separated from body 11, the angle of the EL4-axis is set to be positive. In shoulder joint 24, upper arm 24 can be raised up to 75 degrees outward in the right-left direction in the reference state, and can be rotated up to 10 degrees in the direction in which upper arm 24 is moved closer to body 11. For example, upper arm inclination angle $\delta_{EL4}$ can take any value within the range of −10 degrees≤$\delta_{EL4}$≤75 degrees.

In shoulder joint 27, for example, the rotatable range around the AZ5-axis is −90 degrees to 20 degrees. Here, the rotation angle (upper arm rotation angle) around the AZ5-axis is zero degrees in the reference state, and the angle is negative when upper arm 24 is rotated toward body 11. In the state where upper arm 24 is directed downward and elbow joint 28 is bent to 90 degrees, by the rotation around the A5-axis passing through upper arm 24, forearm 25 can be rotated inward until it becomes parallel to the front surface of arm connection portion 19, and can be rotated outward up to 20 degrees. For example, upper arm rotation angle $\theta_{AZ5}$ can take any value within the range of −90 degrees≤$\theta_{AZ5}$≤20 degrees.

Elbow joint 28 may be considered to include a mechanism to rotate a forearm base 25B with respect to a rotation shaft connected portion 25A. In this case, elbow joint 28 connects forearm 25 to upper arm 24 so as to be rotatable with two rotational degrees of freedom. Elbow joint 28 enables the rotation around the forearm rotation axis (AZ6-axis) passing through forearm 25 and the rotation around the rotation axis (EL5-axis) that allows the angle formed by forearm 25 and upper arm 24 to be changed. By the rotation around the AZ6-axis, forearm 25 and hand 26 are rotated. When forearm 25 is rotated around the AZ6-axis, the structure becomes simpler than when hand 26 can be rotated around the AZ6-axis by wrist joint 29.

Elbow joint 28 may be considered to connect forearm 25 to upper arm 24 rotatably with one rotational degree of freedom around the EL5-axis. The mechanism that enables forearm 25 to be rotated around the forearm rotation axis (AZ6-axis) may be considered to be provided in forearm 25 rather than in elbow joint 28. In this case, elbow joint 28 connects forearm 25 to upper arm 24 rotatably with at least one rotational degree of freedom. Forearm 25 is rotatable around the forearm rotation axis passing through forearm 25.

In elbow joint 28, for example, the rotatable range around the EL5-axis is 10 degrees to 125 degrees. Here, the rotation angle (forearm inclination angle) around the EL5-axis is zero degrees when forearm 25 and upper arm 24 are present on the same straight line. That is, the rotation angle around the EL5-axis is the angle formed by forearm 25 and the straight line obtained by extending upper arm 24 from elbow joint 28 to the side where forearm 25 is provided. In the case that forearm 25 is present in front of upper arm 24, the rotation angle around the EL5-axis is set to be positive. When the forearm inclination angle is zero degrees, the angle formed by forearm 25 and upper arm 24 is 180 degrees. Accordingly, elbow joint 28 can be bent and stretched within the range in which the angle formed by forearm 25 and upper arm 24 is about 170 degrees to about 55 degrees. For example, a forearm inclination angle $\delta_{EL5}$ can take any value within the range of 10 degrees≤$\delta_{EL5}$≤125 degrees.

In elbow joint 28, for example, the rotatable range around the forearm rotation axis (AZ6-axis) is from −100 degrees to 100 degrees. In the reference state, the front-rear direction rotation plane becomes parallel to the front direction of forearm 25. The rotation angle (forearm rotation angle) around the AZ6-axis is set such that the angle of the AZ6-axis is zero degrees in the reference state. When the front-rear rotation plane is inclined outward, the angle of the AZ6-axis is positive. For example, forearm rotation angle $\theta_{AZ6}$ can take any value within the range of −100 degrees≤$\theta_{AZ6}$≤100 degrees.

Wrist joint 29 connects hand 26 to forearm 25 rotatably with two rotational degrees of freedom. Wrist joint 29 is a biaxial gimbal. Wrist joint 29 can be changed the angle formed between forearm 25 and hand 26 on each of the front-rear direction rotation plane and the right-left direction rotation plane. Both the front-rear direction rotation plane and the right-left direction rotation plane are planes including forearm 25 and are orthogonal to each other. The EL6-axis is orthogonal to the front-rear direction rotation plane. The EL6-axis is the rotation axis that enables hand 26 to be rotated in the front-rear direction rotation plane. The XEL2-axis is orthogonal to the right-left direction rotation plane. The XEL2-axis is the rotation axis that enables hand 26 to be rotated on the right-left direction rotation plane. The front-rear direction rotation plane is a first forearm plane including the forearm rotation axis (AZ6-axis). The right-left direction rotation plane is a second forearm plane that includes the AZ6-axis and is orthogonal to the front-rear direction rotation plane. The front-rear direction rotation plane and the right-left direction rotation plane may not be orthogonal to each other, but may cross each other. The front-rear rotation plane, which is the first forearm plane, may not include the AZ6-axis. The right-left direction rotation plane, which is the second forearm plane, may not include the AZ6-axis. The front-rear direction rotation plane and the right-left direction rotation plane may cross each other.

In wrist joint 29, for example, the rotation angle on the front-rear direction rotation plane by the rotation around the EL6-axis can rotate hand 26 from −45 degrees to 60 degrees. For example, the rotation angle on the right-left direction rotation plane by the rotation around the XEL2-axis can rotate hand 26 from −60 degrees to 60 degrees. When hand 26 and forearm 25 are present on the same straight line, the rotation angle around the EL6-axis and the XEL2-axis is set to zero degree. When hand 26 is present on the front side in the front-rear direction rotation plane, the rotation angle around the EL6-axis (hand first inclination angle) is positive.

When hand 26 is present on the outside in the right-left direction rotation plane, the rotation angle (hand second inclination angle) around the XEL2 axis is positive. For example, a hand first inclination angle $\delta_{EL6}$ can take any value within the range of $-45$ degrees$\leq\delta_{EL6}\leq 60$ degrees. For example, a hand second inclination angle $\delta_{XEL2}$ can take any value within the range of $-60$ degrees$\leq\delta_{XEL2}\leq 60$ degrees.

Forearm 25 is rotated around the forearm rotation axis (AZ6-axis) at elbow joint 28, so that hand 26 can change the direction largely with respect to forearm 25. In wrist joint 29, the connection angle between forearm 25 and hand 26 can be changed by the front-rear direction rotation plane and the right-left direction rotation plane that are orthogonal to each other, so that hand 26 can be directed in an intended direction with respect to forearm 25. When the wrist joint is a joint in which hand 26 is rotated with respect to forearm 25 and the angle formed by hand 26 and forearm 25 is changed, in the case where the angle formed by hand 26 and forearm 25 is close to 180 degrees (in the case where hand 26 is present in the direction in which forearm 25 extends), hand 26 is required to be rotated around the forearm rotation axis largely, and it becomes difficult to direct hand 26 in the intended direction with respect to forearm 25.

The wrist joint may change only the angle formed by hand 26 and forearm 25. In this case, the rotational degree of freedom at the wrist joint may be one rotational degree of freedom, and the wrist joint can be simplified. Forearm 25 is rotated around the forearm rotation axis (AZ6-axis) at elbow joint 28, so that the rotatable range of hand 26 with respect to the forearm rotation axis can be determined to the range required for the wrist joint. However, when the angle formed by hand 26 and forearm 25 is close to 180 degrees, it is difficult to direct hand 26 in the intended direction with respect to the forearm rotation axis.

The arm base joint may have two rotational degrees of freedom. Shoulder joint 27 may have one rotational degree of freedom or three rotational degrees of freedom. Elbow joint 28 may have one rotational degree of freedom or three rotational degrees of freedom. Wrist joint 29 may have one rotational degree of freedom or three rotational degrees of freedom. The sum of the rotational degrees of freedom of the arm base joint, the rotational degrees of freedom of shoulder joint 27, the rotational degrees of freedom of elbow joint 28, and the rotational degrees of freedom of wrist joint 29 may be six rotational degrees of freedom or eight rotational degrees of freedom.

Shoulder joint 27 includes a shoulder joint structure 27A, a motor 27B, a motor installation portion 27C, and a rotation shaft member 27D. Rotation shaft member 27D is a rod-like member parallel to the EL4-axis. Upper arm 24 is connected to rotation shaft member 27D. When rotation shaft member 27D is rotated, upper arm 24 is rotated around the EL4-axis. The mechanism to rotate upper arm 24 around the AZ5-axis is provided in upper arm 24.

Shoulder joint structure 27A and motor installation portion 27C are members that hold rotation shaft member 27D rotatably. Rotation shaft member 27D is perpendicular to shoulder joint structure 27A. In the reference state, shoulder joint structure 27A extends horizontally in the front-rear direction, and rotation shaft member 27D extends downward. Shoulder joint structure 27A has a shape including a cylinder with a flange and a rectangular parallelepiped connected to the side of arm connection portion 19. When the cylinder of shoulder joint structure 27A is viewed from the front, the part of the flange has a shape in which left and right parts of the circle are cut out by straight lines facing each other. Motor installation portion 27C also has a cylindrical shape with a flange. The flange has the same shape in shoulder joint structure 27A and motor installation portion 27C. The flange of the cylinder of shoulder joint structure 27A and the flange of motor installation portion 27C are joined to each other. Motor 27B is installed inside motor installation portion 27C. Motor 27B generates power rotating rotation shaft member 27D. Inside motor installation portion 27C, a gear that transmits rotational torque of motor 27B to rotation shaft member 27D is also contained.

Upper arm 24 includes joint connected portion 24A, intermediate cylindrical portion 24B, a lid 24C, and a lower column 24D. Joint connected portion 24A is a member having a rectangular rod-shaped portion connected to rotation shaft member 27D of shoulder joint 27. Rotation shaft member 27D and joint connected portion 24A are integrally formed. Joint connected portion 24A includes a columnar portion on the lower side of the rectangular rod-shaped portion. The columnar portion is inserted rotatably into intermediate cylindrical portion 24B. When intermediate cylindrical portion 24B is rotated with respect to joint connected portion 24A, upper arm 24 is rotated around the AZ5-axis.

Joint connected portion 24A passes through an opening provided in shoulder joint structure 27A. The opening provided in shoulder joint structure 27A is directed downward in the reference state. Through the rectangular rod-shaped portion of joint connected portion 24A coming into contact with a member having the opening, the rotation angle in the right-left direction is limited in shoulder joint 27. When shoulder joint 27 is rotated outward in the right-left direction from the state where upper arm 24 is directed downward, upper arm 24 can be rotated until upper arm 24 becomes the angle close to horizontal.

In intermediate cylindrical portion 24B, an opening is provided on the rear side. The opening on the rear side is provided for maintenance or the like of a motor or the like inside intermediate cylindrical portion 24B. Lid 24C closes the opening of intermediate cylindrical portion 24B. Inside the upper side of intermediate cylindrical portion 24B, the motor and the gear that rotate intermediate cylindrical portion 24B with respect to joint connected portion 24A are contained. Motor 24E (not illustrated) used in elbow joint 28 is also contained in the lower part of intermediate cylindrical portion 24B. The rotation shaft of motor 24E goes out from the lower side of intermediate cylindrical portion 24B.

Lower column 24D is connected onto the lower side of intermediate cylindrical portion 24B. Lower column 24D is a cylinder having a diameter smaller than that of intermediate cylindrical portion 24B. Joint connected portion 24A, intermediate cylindrical portion 24B, and the lower column 24D are provided on one straight line. Lower column 24D is connected to a rotation shaft holding yoke 28A of elbow joint 28.

Elbow joint 28 connects forearm 25 to upper arm 24 with two rotational degrees of freedom. Elbow joint 28 enables the rotation around the forearm rotation axis (AZ6-axis) passing through forearm 25 and the rotation changing the angle formed by upper arm 24 and forearm 25. Elbow joint 28 includes rotation shaft holding yoke 28A, a rotation shaft member 28B, a worm wheel 28C, a worm 28D, a gear portion 28E, a motor 28F, a gear portion 28G, a motor container 28H, and a gear cover 28J. The worm gear mechanism is used, so that the angle formed by forearm 25 and upper arm 24 at elbow joint 28 can be maintained even when the power supply is interrupted.

Rotation shaft member 28B is a shaft member constituting a rotation shaft (EL5-axis) that allows the angle formed by forearm 25 and upper arm 24 to be changed. Forearm 25 is connected to rotation shaft member 28B. Rotation shaft member 28B extends in the direction orthogonal to upper arm 24. Rotation shaft holding yoke 28A holds rotation shaft member 28B rotatably. Rotation shaft holding yoke 28A has a shape including two plate-like parts facing each other and through which rotation shaft member 28B passes and a plate-like portion connecting upper parts of the two plates. Rotation shaft holding yoke 28A is connected to lower column 24D at an upper plate-like part.

Figure 21:
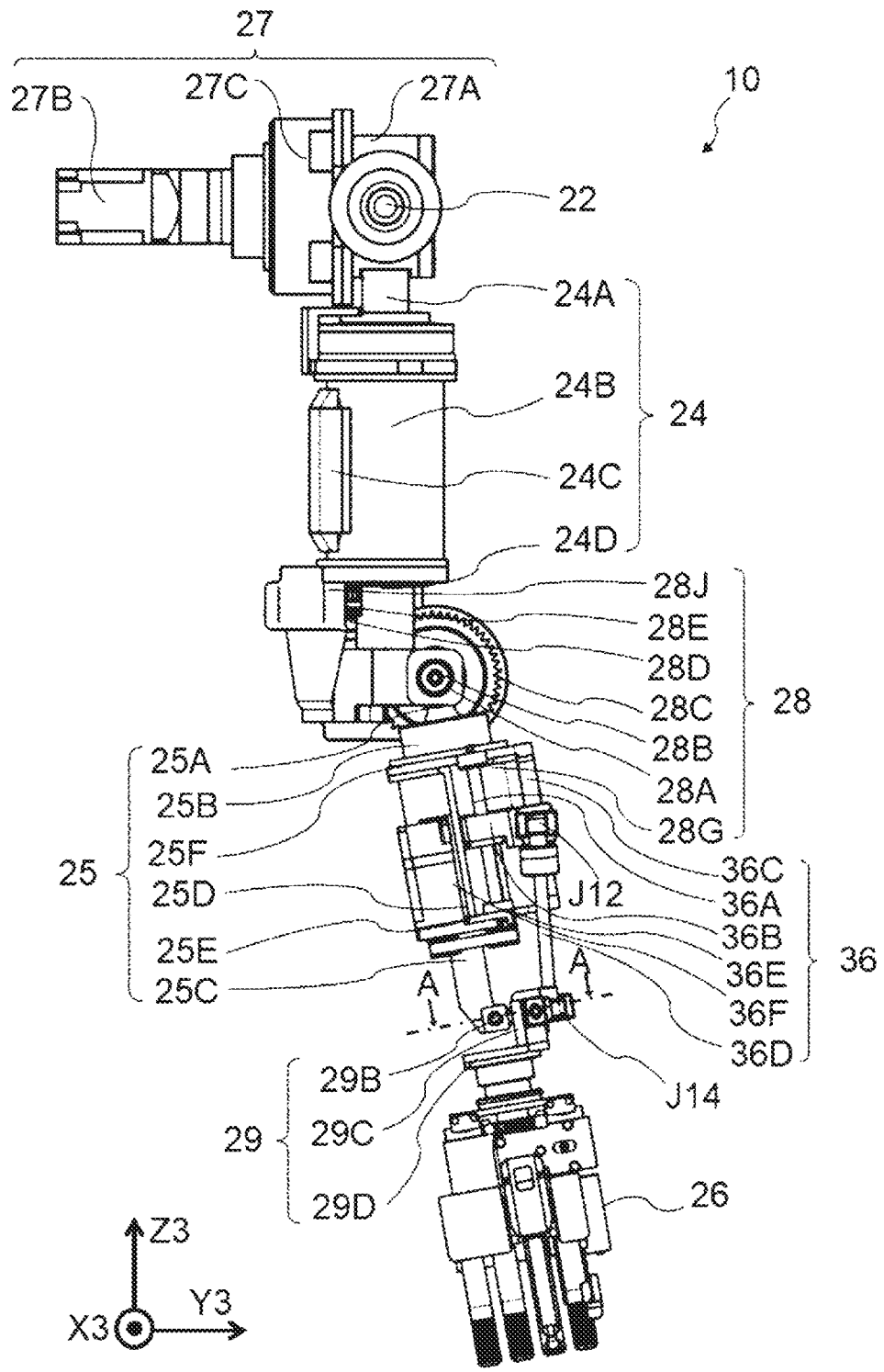
FIG. 21 is a left side view illustrating the arm included in the robot operated by the robot operation system of the embodiment.
Figure 22:
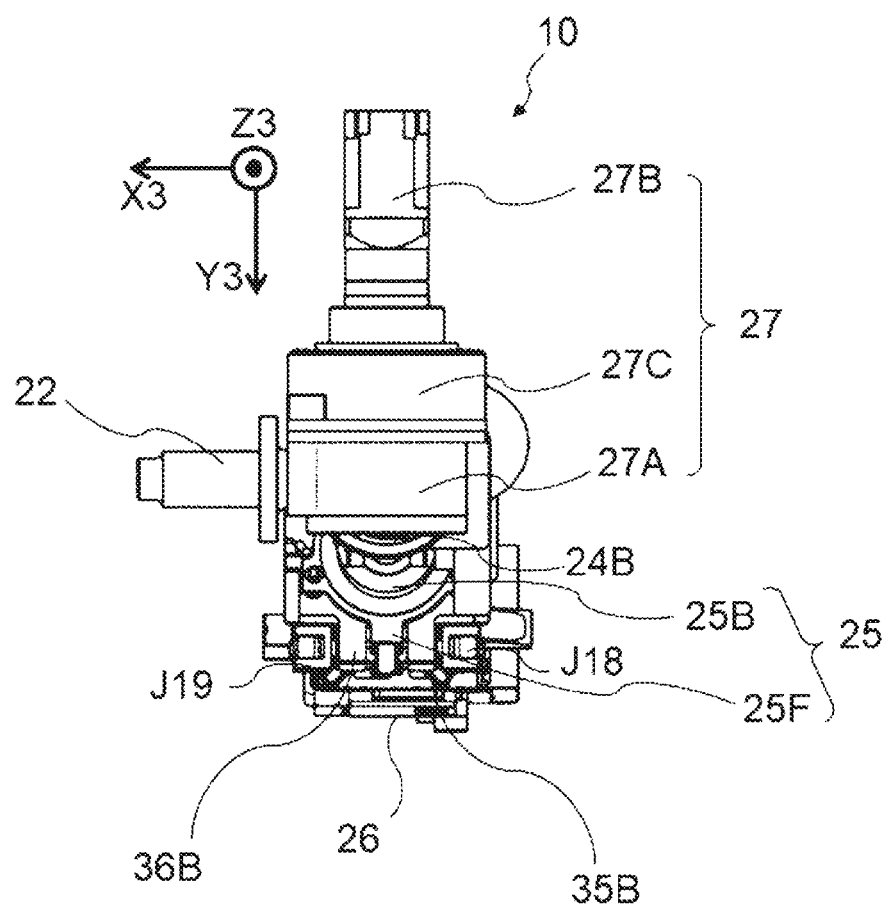
FIG. 22 is a plan view illustrating the arm included in the robot operated by the robot operation system of the embodiment.
Figure 23:
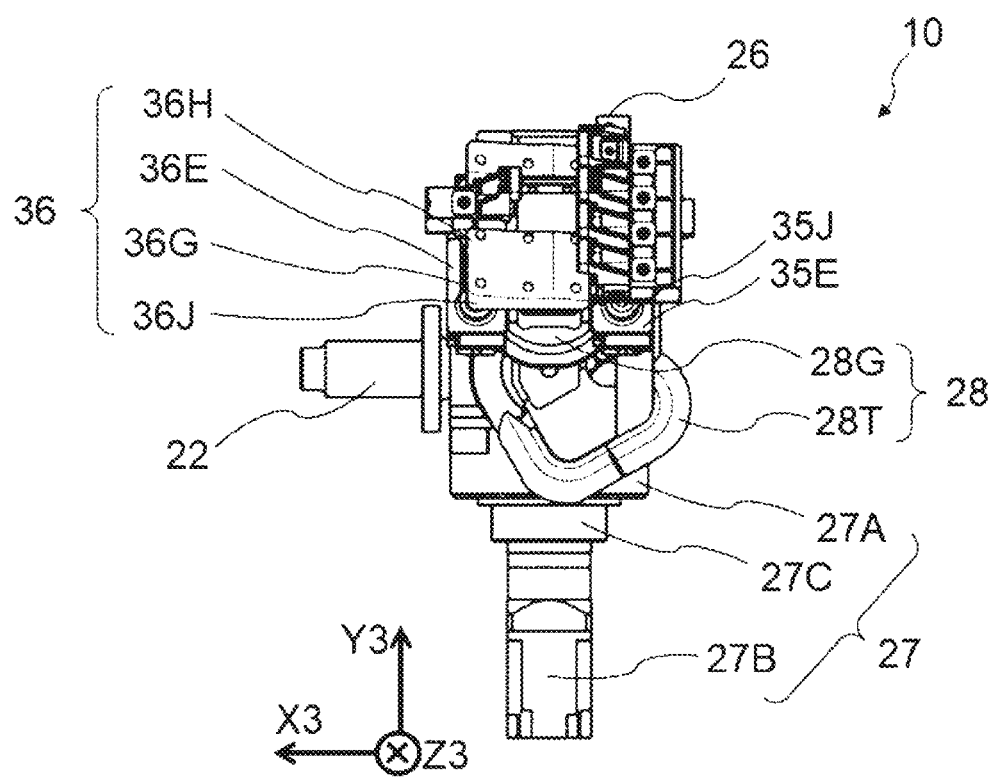
FIG. 23 is a bottom view illustrating the arm included in the robot operated by the robot operation system of the embodiment.

As illustrated in FIG. 21, worm wheel 28C, worm 28D, and gear portion 28E constitute a mechanism to rotate rotation shaft member 28B by motor 24E contained in upper arm 24. Worm wheel 28C is attached to rotation shaft member 28B. When worm wheel 28C is rotated, rotation shaft member 28B is rotated. Worm wheel 28C is provided outside in the right-left direction of elbow joint 28. Gear portion 28E is rotated by the rotation of motor 24E. Gear portion 28E is installed to be parallel to the lower surface of intermediate cylindrical portion 24B. Gear portion 28E includes a gear that meshes with the rotation shaft of motor 24E and a gear that meshes with worm 28D. Worm 28D is provided in the direction in which intermediate cylindrical portion 24B extends. Worm 28D meshes with gear portion 28E on the side close to intermediate cylindrical portion 24B. Worm 28D meshes with worm wheel 28C on the side far from intermediate cylindrical portion 24B. Gear cover 28J is a cover that covers worm wheel 28C, worm 28D, and gear portion 28E.

When motor 24E is rotated, the rotation of motor 24E is transmitted to worm 28D by gear portion 28E, and worm 28D is rotated. When worm 28D is rotated, worm wheel 28C and rotation shaft member 28B are rotated, and the angle formed by forearm 25 and upper arm 24 is changed.

Figure 20:
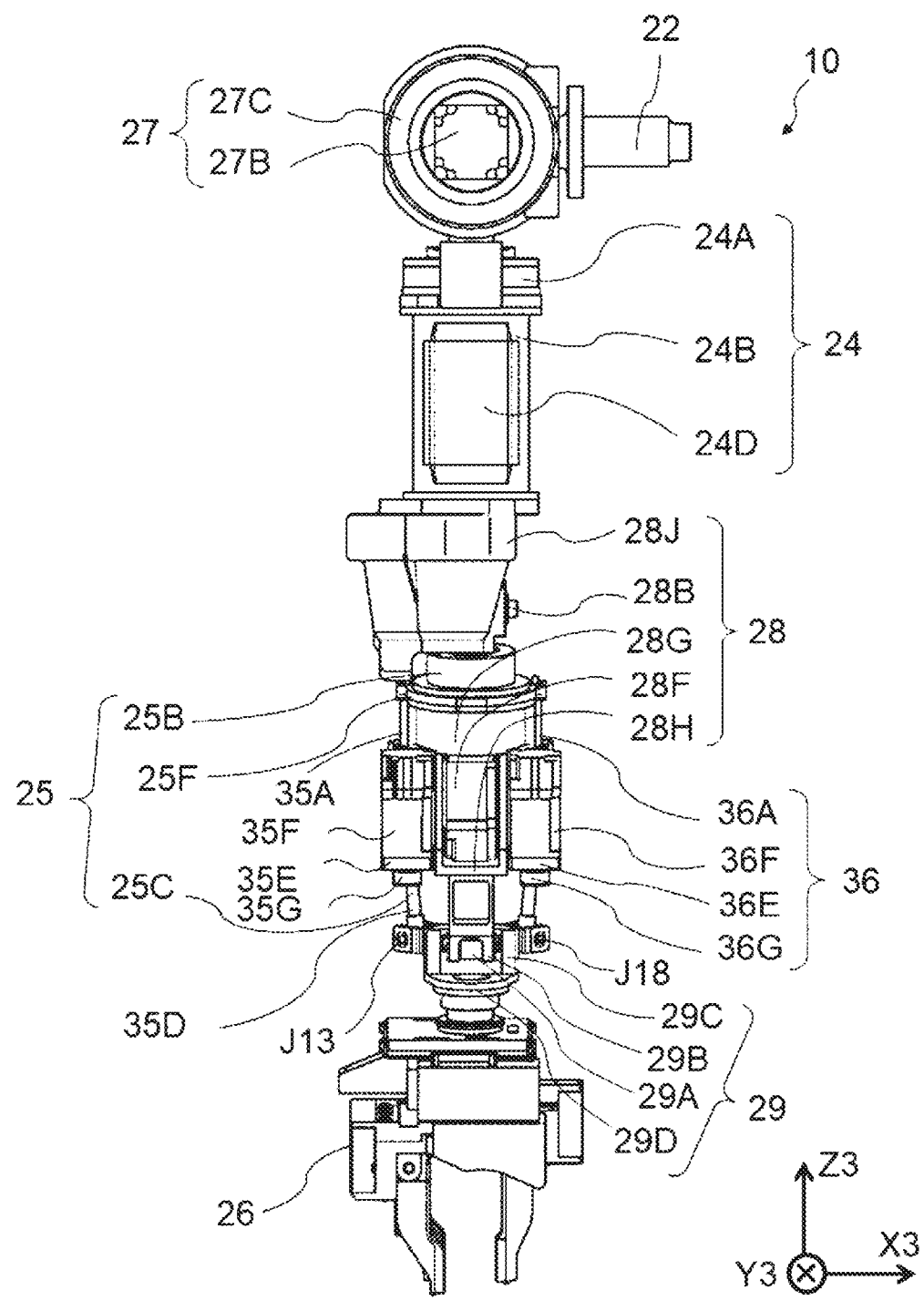
FIG. 20 is a rear view illustrating the arm included in the robot operated by the robot operation system of the embodiment.

As illustrated in FIG. 20, motor 28F, gear portion 28G, and motor container 28H are provided on forearm 25. Motor 28F, gear portion 28G, and motor container 28H constitute a mechanism to rotate forearm 25 around the forearm rotation axis passing through forearm 25 at elbow joint 28. Motor 28F generates the power rotating forearm 25. Gear portion 28G is a gear that rotates forearm 25 by the rotation of motor 28F. Motor container 28H contains motor 28F. The outer shape of gear portion 28G is a cylindrical shape with a flange. Motor container 28H is connected to the wrist side of gear portion 28G. Motor container 28H is a member having two side surfaces sandwiching motor 28F and a bottom surface connecting the side surfaces.

Gear portion 28G is provided between motor 28F and forearm base 25B (described later). Rotation shaft connected portion 25A (described later), a gear mechanism, and a rotation shaft of motor 28F are provided inside gear portion 28G. The gear mechanism is a mechanism to rotate forearm base 25B with respect to rotation shaft connected portion 25A by the rotation of motor 28F.

Forearm 25 includes rotation shaft connected portion 25A, forearm base 25B, a forearm bone 25C, an actuator structure 25D, a screw rod holder 25E, and a screw rod holder 25F. Rotation shaft connected portion 25A is a member that is rotated together with rotation shaft member 28B. Rotation shaft connected portion 25A and rotation shaft member 28B are integrally formed. Rotation shaft connected portion 25A has a shape similar to that of joint connected portion 24A. Rotation shaft connected portion 25A has a columnar portion connected to rotation shaft member 28B of elbow joint 28 and a cylindrical portion connected to a lower side of the columnar portion. Forearm base 25B has a cylindrical shape with a flange. The cylindrical portion of rotation shaft connected portion 25A is inserted rotatably into the circular opening on the upper surface of forearm base 25B. Gear portion 28G with the flange to which the flange of forearm base 25B are joined is provided on the side where hand 26 is provided with respect to forearm base 25B. When motor 28F is rotated, forearm base 25B is rotated with respect to rotation shaft connected portion 25A by a gear mechanism provided inside gear portion 28G.

Forearm bone 25C is a prismatic member connected onto the side of forearm base 25B where hand 26 exists. Wrist joint 29 is provided at a tip of forearm bone 25C. Gear portion 28G having a cylindrical outer shape is connected to the lower side of forearm base 25B. Forearm bone 25C penetrates gear portion 28G and extends to the wrist side.

Actuator structure 25D is a structural member on which two actuators that change the connection angle at wrist joint 29 are installed. Actuator structure 25D is fixed to forearm bone 25C. The surface to which actuator structure 25D is fixed is a surface facing the front side of forearm bone 25C in the reference state. Actuator structure 25D is a member having a shape in which a half on the side of wrist joint 29 has a T-shape section and a half on the side of elbow joint 28 has only a T vertical rod section of the T-shape. A portion (vertical plate portion) of only the T vertical rod is connected to the outside of gear portion 28G having a cylindrical outer shape and the flange. Screw rod holder 25E is attached to an end of actuator structure 25D on the side of hand 26 having a T-shaped section. Screw rod holder 25F is connected to the end of the vertical plate portion of actuator structure 25D and the flange of the forearm base 25B. Two screw rods are held rotatably between screw rod holder 25E and screw rod holder 25F.

Figure 25:
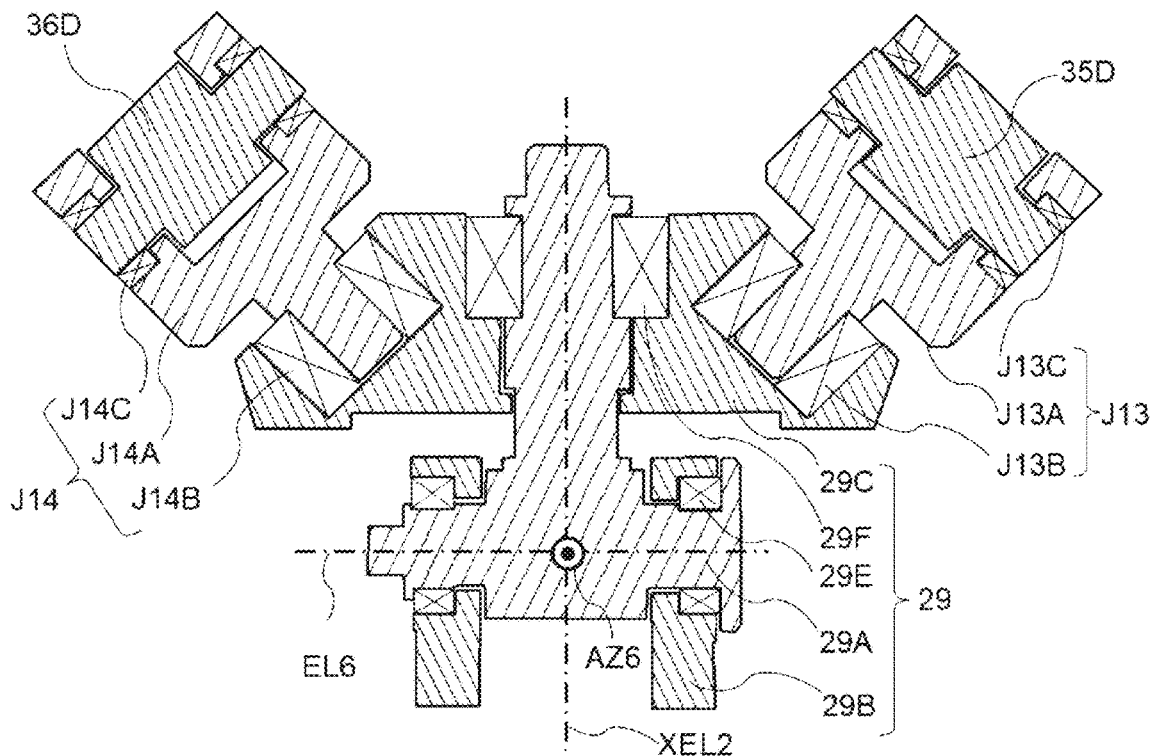
FIG. 25 is a sectional view illustrating a structure of a wrist joint included in the robot operated by the robot operation system of the embodiment.

Wrist joint 29 connects hand 26 to forearm 25 with two rotational degrees of freedom. Wrist joint 29 changes the angle formed by hand 26 and forearm 25 on each of two planes orthogonal to each other where the line intersection of the two planes passes through forearm 25. The front-rear direction rotation plane and the right-left direction rotation plane are two planes orthogonal to each other where the line intersection passes through forearm 25. The front-rear direction rotation plane and the right-left direction rotation plane form the angle of 45 degrees with respect to the plane determined by the actuator structure 25D. FIG. 25 illustrates a sectional view of wrist joint 29. FIG. 25 is a sectional view taken along a line A-A in FIG. 21.

Wrist joint 29 includes a T-shaped member 29A, a T-shaped member holding yoke 29B, a T-shaped member holder 29C, and a wrist base 29D. T-shaped member 29A is a T-shaped member that enables connection with two rotational degrees of freedom. T-shaped member 29A connects forearm bone 25C and wrist base 29D with two rotational degrees of freedom. T-shaped member holding yoke 29B is provided at the tip of forearm bone 25C. T-shaped member holder 29C is provided on wrist base 29D. The EL6-axis passes through the portion of the T horizontal rod of T-shaped member 29A, and the XEL2-axis passes through the portion of the T vertical rod. The portion of the T horizontal rod of T-shaped member 29A has a columnar shape, and the center of the column of the portion of the T horizontal rod is the EL6-axis. The portion of the T vertical rod of T-shaped member 29A has a cylindrical shape, and the center of the column of the portion of the T vertical rod is the XEL2-axis. In T-shaped member 29A, the EL6-axis and the XEL2-axis are provided on the same plane.

T-shaped member holding yoke 29B is a member including two plate members facing each other and a plate member connecting the two plate members on the side of forearm bone 25C. T-shaped member holding yoke 29B holds both ends of the T horizontal rod of T-shaped member 29A rotatably. Bearing 29E (illustrated in FIG. 25) is provided between T-shaped member holding yoke 29B and T-shaped member 29A to make them rotatable. T-shaped member holder 29C is a member that holds the T vertical rod of T-shaped member 29A rotatably. Bearing 29F (illustrated in FIG. 25) is provided between T-shaped member holder 29C and T-shaped member 29A to make them rotatable relative to each other. T-shaped member holder 29C is a member having a section shaped like an isosceles trapezoid. The portion of the T vertical rod of T-shaped member 29A is inserted into a side surface on the lower bottom side of the trapezoid of T-shaped member holder 29C. Wrist base 29D is a disk-shaped member. T-shaped member holder 29C is connected vertically to the surface of wrist base 29D on the side opposite to the side where hand 26 exists. The portion where the XEL2-axis included in T-shaped member 29A extends (the portion of the T vertical rod) is held by T-shaped member holder 29C rotatably. The XEL2-axis and the EL6-axis are parallel to disk-shaped wrist base 29D. The forearm rotation axis (AZ6-axis) passes through the intersection of the XEL2-axis and the EL6-axis.

The other ends of fixed-length links of a forearm outside actuator 35 and a forearm inside actuator 36 are connected to T-shaped member holder 29C rotatably.

Forearm outside actuator 35 and forearm inside actuator 36 change the rotation angle at wrist joint 29. Forearm outside actuator 35 and forearm inside actuator 36 have similar shapes. Each of forearm outside actuator 35 and forearm inside actuator 36 includes a moving member and the fixed-length link having one end connected to the moving member. The other ends of the two fixed-length links are connected to wrist joint 29. Wrist joint 29 is driven by two fixed-length links in each of which one end is moved by the moving member. Forearm outside actuator 35 and forearm inside actuator 36 are provided in forearm 25.

The structure of forearm outside actuator 35 is described. Forearm outside actuator 35 includes a screw rod 35A, a moving member 35B, a rail 35C, a link 35D, a motor installation plate 35E, a motor 35F, a belt 35G, a pulley 35H, and a pulley 35J. Both ends of screw rod 35A are held rotatably by screw rod holder 25E and screw rod holder 25F. In screw rod holder 25E and screw rod holder 25F, a rectangular parallelepiped member is provided at a portion for holding screw rod 35A. Moving member 35B includes a through-hole in which a female screw that meshes with a male screw of screw rod 35A is provided. Rail 35C is provided on the side surface of the vertical plate portion of actuator structure 25D in parallel with screw rod 35A. Moving member 35B includes a portion for sandwiching rail 35C. Because moving member 35B sandwiches rail 35C, when screw rod 35A is rotated, moving member 35B is moved along screw rod 35A without rotation.

Motor installation plate 35E is provided on screw rod holder 25E existing on the side of hand 26. Motor installation plate 35E is provided substantially perpendicular to the direction in which forearm 25 extends. Motor 35F is attached to motor installation plate 35 while being perpendicular to motor installation plate 35E and parallel to screw rod 35A. The rotation axes of screw rod 35A and motor 35F pass through an opening provided in motor installation plate 35. Belt 35G, pulley 35H, and pulley 35J transmit the rotation of motor 35F to screw rod 35A. Pulley 35H is attached to screw rod 35A. Pulley 35J is attached to a rotation shaft of motor 35F. Belt 35G is stretched over pulley 35H and pulley 35J. Pulley 35H, pulley 35J, and belt 35G are provided on the side of motor installation plate 35 where motor 35F is not provided. Because pulley 35H and pulley 35J are coupled by belt 35G, screw rod 35A is rotated when the rotation shaft of motor 35F is rotated.

When viewed from the direction in which screw rod 35A extends, moving member 35B has a shape in which two rectangles, which are orthogonal to each other while sharing one corner, are combined and a shared corner of the two rectangles is removed to form a recessed arc surface. The thicknesses of the two rectangular parts of moving member 35B are the same. In other words, moving member 35B is a member having a shape in which two rectangular parallelepipeds are connected by a coupling member. The coupling member is a member having a shape including a recessed arc-shaped side surface and two planes orthogonal to each other. Screw rod 35A penetrates one rectangular parallelepiped of moving member 35B. The other rectangular parallelepiped sandwiches rail 35C. One end of link 35D is connected to a rectangular parallelepiped part on the side sandwiching rail 35C rotatably with two rotational degrees of freedom. The length of link 35D is constant and does not change. Link 35D has one rotational degree of freedom that enables twisting.

A place where one end of link 35D is connected to moving member 35B rotatably is referred to as a forearm outside link attaching unit J11. Forearm outside link attaching unit J11 is a biaxial gimbal. In forearm outside link attaching unit J11, a yoke provided rotatably in moving member 35B holds a shaft member provided at one end of link 35D rotatably. The yoke of forearm outside link attaching unit J11 is provided to be perpendicular to the vertical plate portion of actuator structure 25D.

The other end of link 35D is connected to hand 26 (strictly speaking, T-shaped member holder 29C) rotatably with two rotational degrees of freedom. A place where one end of link 35D is connected to hand 26 is referred to as a hand outside link attaching unit J13. Hand outside link attaching unit J13 and forearm outside link attaching unit J11 have the same structure.

Forearm inside actuator 36 includes a screw rod 36A, a moving member 36B, a rail 36C, a link 36D, a motor installation plate 36E, a motor 36F, a belt 36G, a pulley 36H, and a pulley 36J. One end of link 36D is connected to moving member 36D rotatably with two rotational degrees of freedom by forearm inside link attaching unit J12. Forearm inside link attaching unit J12 is a biaxial gimbal. Forearm inside link attaching unit J12 has the structure similar to that of forearm outside link attaching unit J11. The other end of link 36D is connected to moving member 36B rotatably with two rotational degrees of freedom by a hand inside link attaching unit J14.

Forearm inside actuator 36 has a structure similar to that of forearm outside actuator 35. Detailed description of the structure of forearm inside actuator 36 is omitted.

Motor 35F, motor 28F, and motor 36F are arranged in parallel on the rear side of forearm 25. By doing so, the width and thickness of forearm 25 can be reduced.

Arm 10 adopts a hybrid driving system in which the joint by gear drive and the joint by link drive are combined. The shoulder joint have two rotational degrees of freedom, including one rotational degree of freedom around the axis passing through the upper arm and rotating the upper arm. The elbow joint have two rotational degrees of freedom, including one rotational degree of freedom around the axis passing through the forearm and rotating the forearm. Consequently, arm 10 can be made compact, and the drive range can be made greater than or equal to the drive range of a human. In the hybrid drive system, arm 10 can output the required power and is quiet. In addition, in the hybrid drive system, each joint included in arm 10 can be driven with high accuracy.

Figure 26:
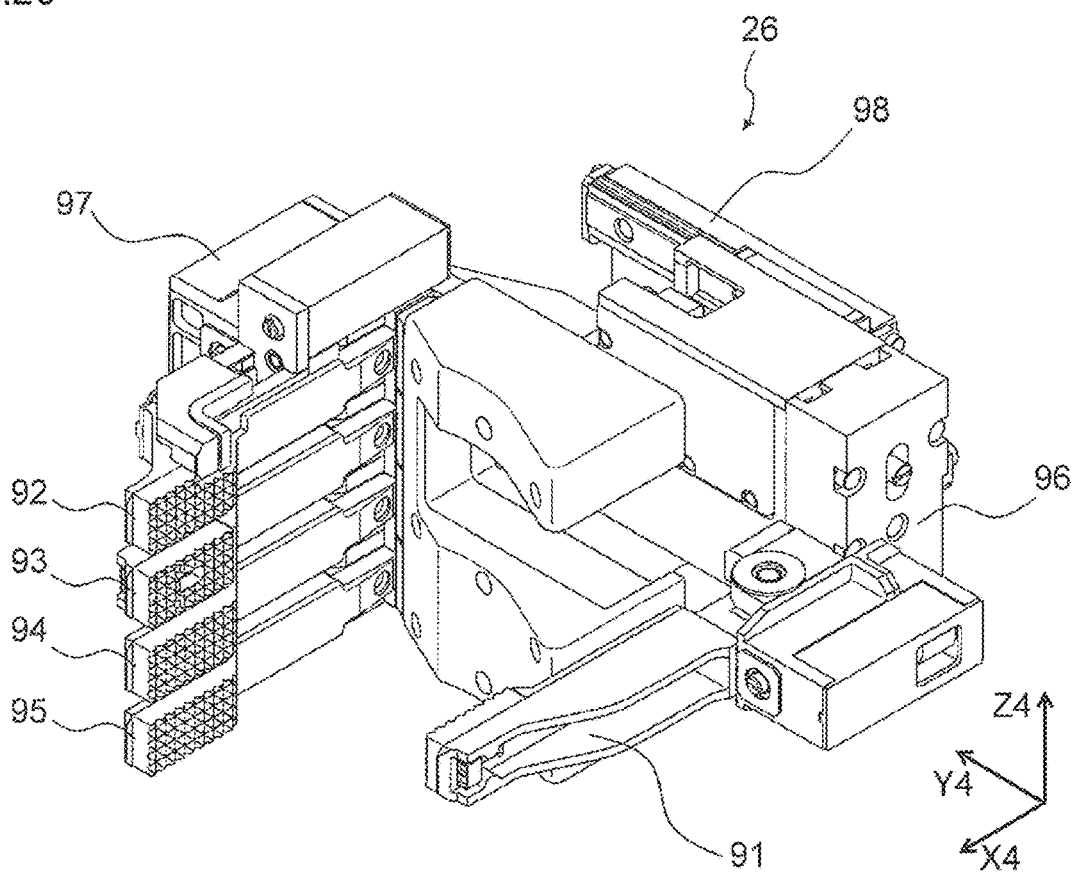
FIG. 26 is a perspective view illustrating a hand included in the robot operated by the robot operation system of the embodiment.
Figure 27:
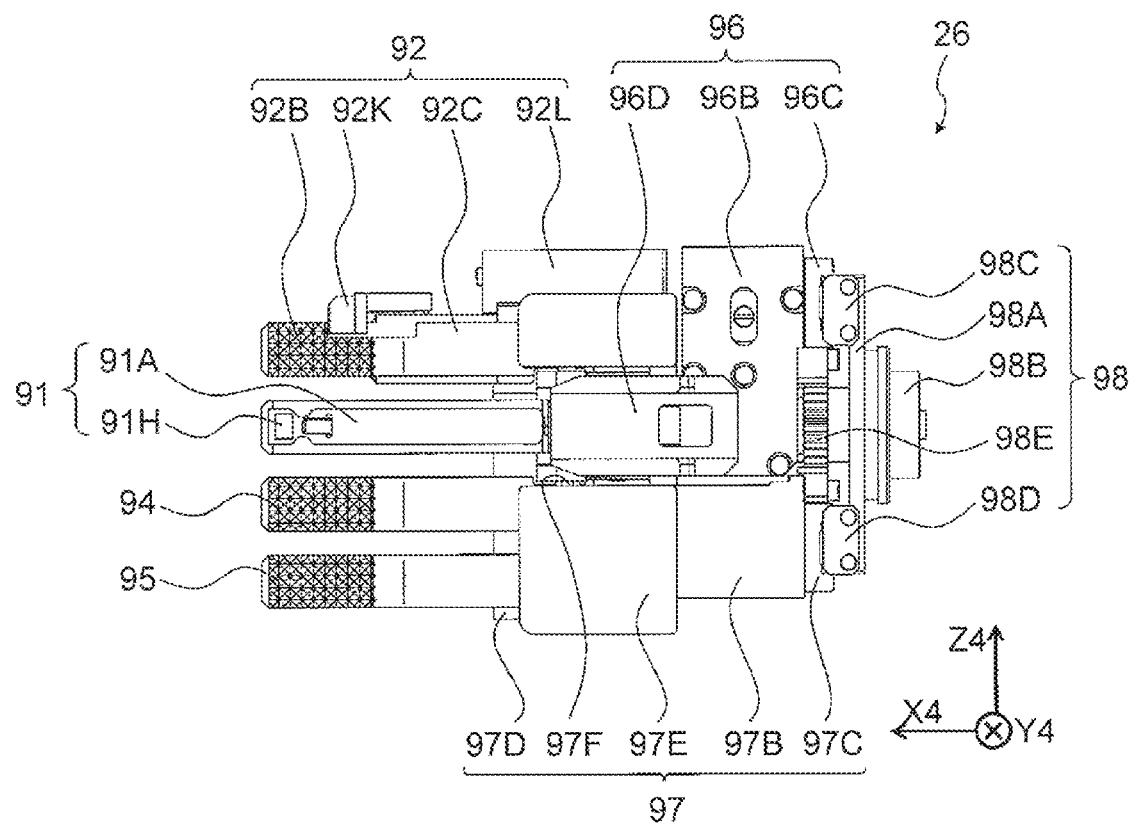
FIG. 27 is a front view illustrating the hand included in the robot operated by the robot operation system of the embodiment.
Figure 28:
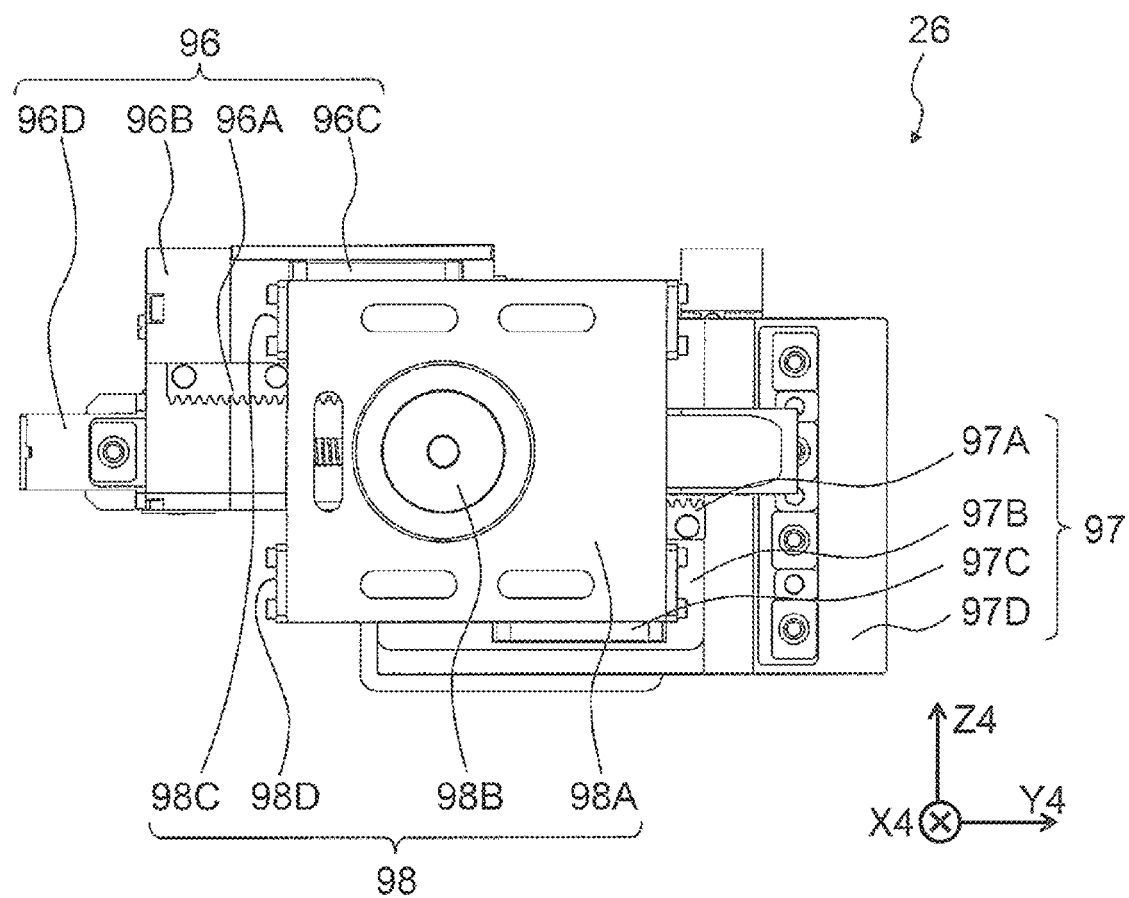
FIG. 28 is a right side view illustrating the hand included in the robot operated by the robot operation system of the embodiment.
Figure 29:
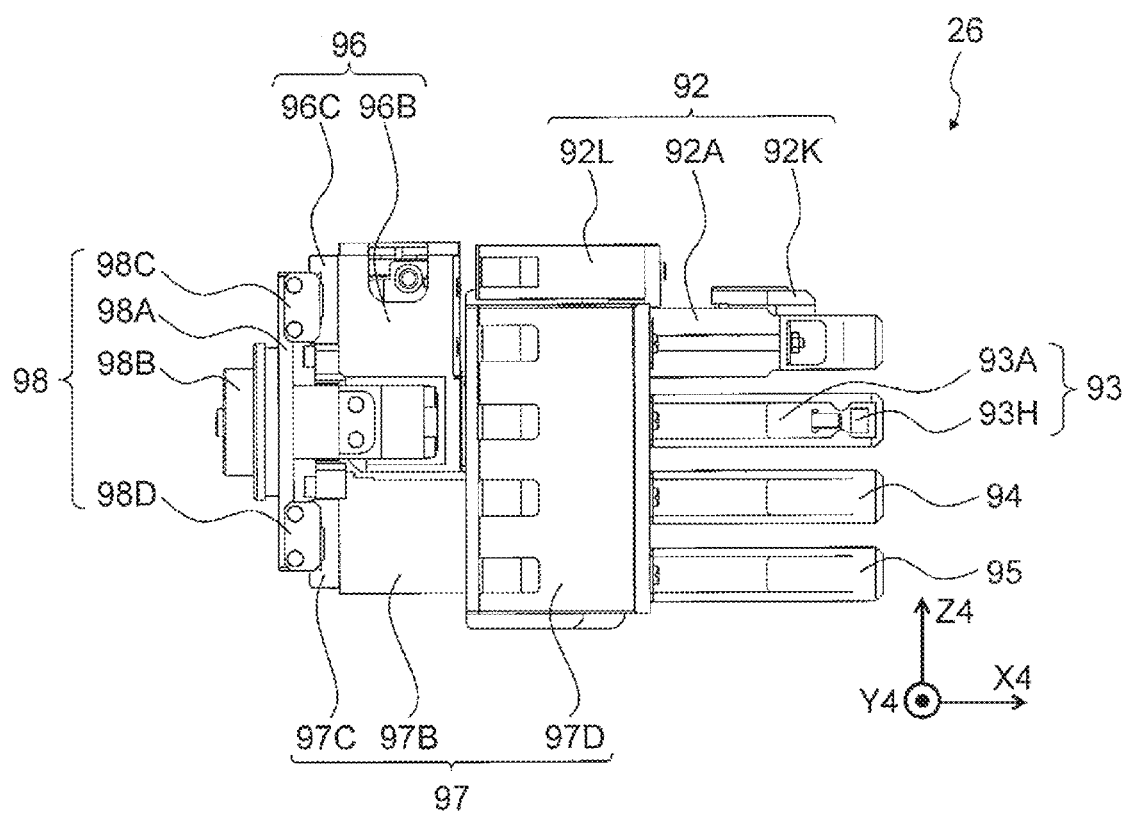
FIG. 29 is a rear view illustrating the hand included in the robot operated by the robot operation system of the embodiment.
Figure 30:
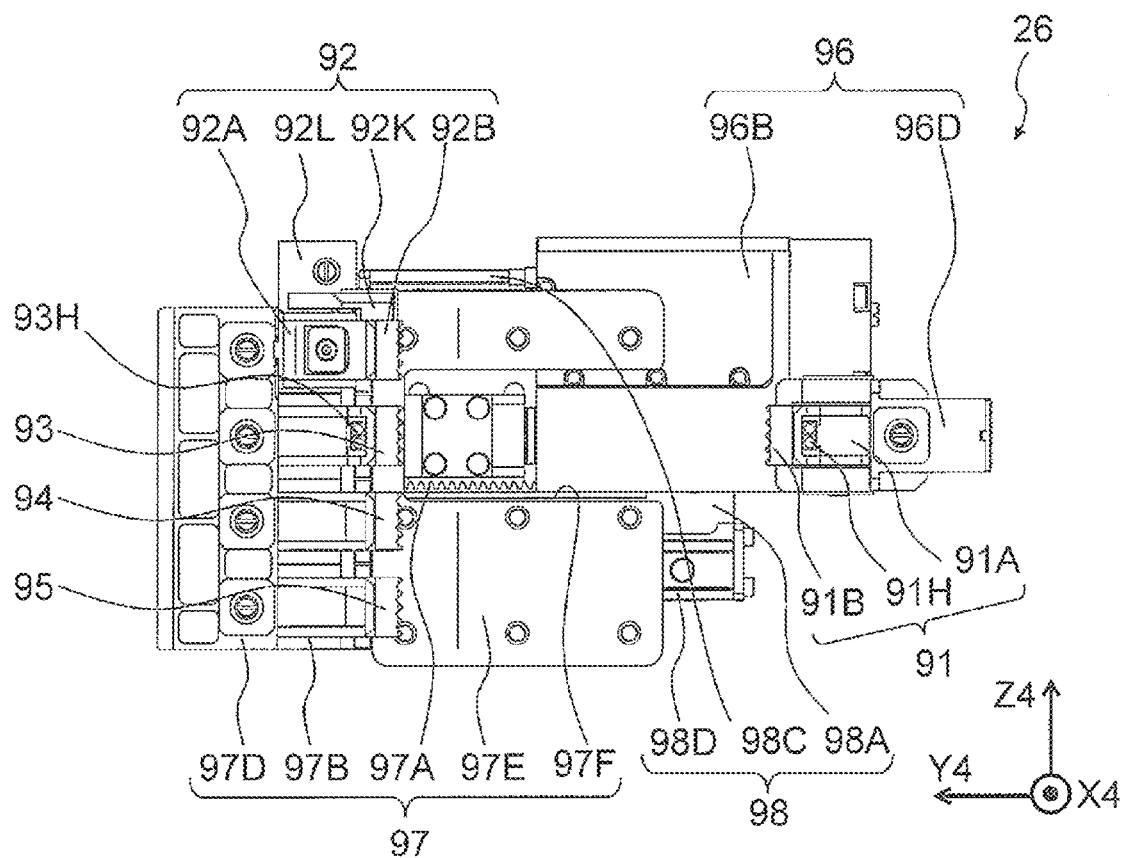
FIG. 30 is a left side view illustrating the hand included in the robot operated by the robot operation system of the embodiment.
Figure 31:
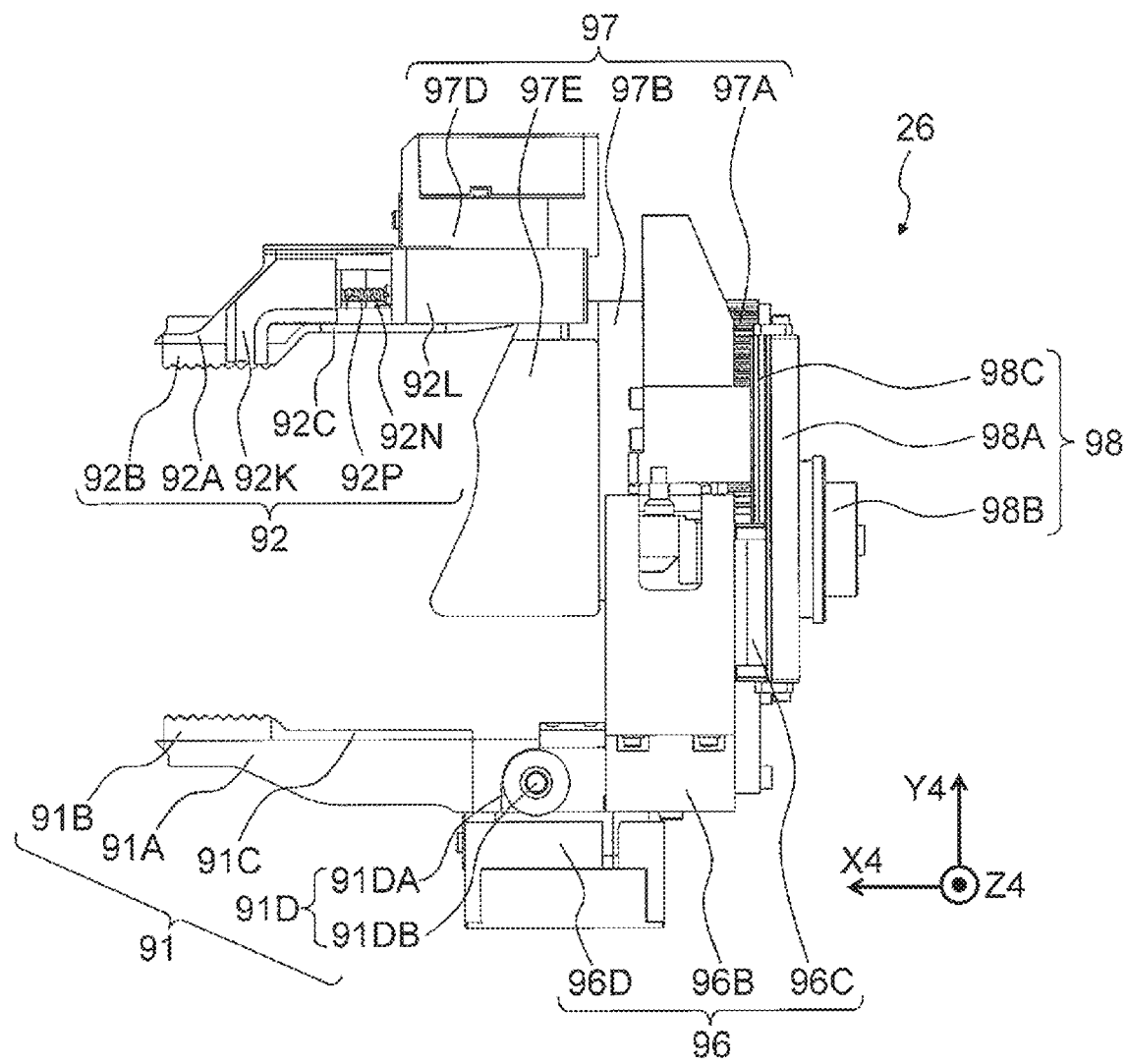
FIG. 31 is a plan view illustrating the hand included in the robot operated by the robot operation system of the embodiment.
Figure 32:
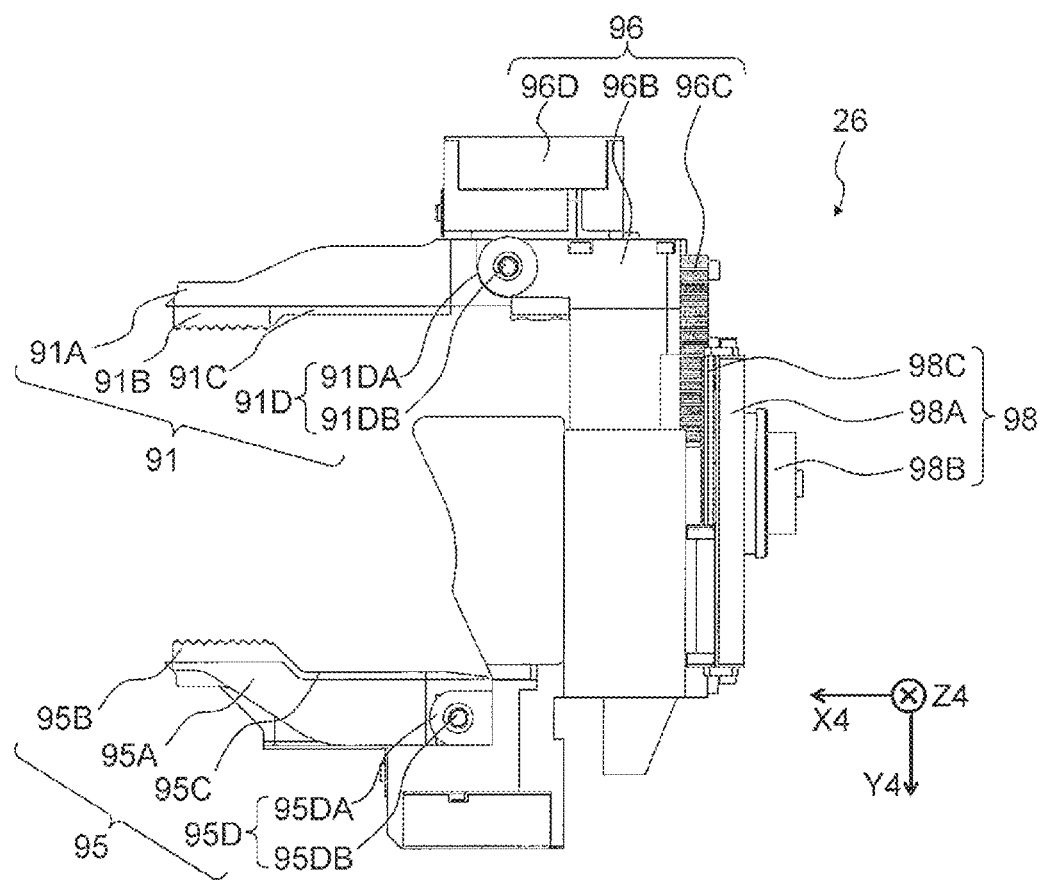
FIG. 32 is a bottom view illustrating the hand included in the robot operated by the robot operation system of the embodiment.

Referring to FIGS. 26 to 39, the structure of hand 26 is described. FIG. 26 is a perspective view of hand 26. FIGS. 27 to 32 are a front view, a right side view, a rear view, a left side view, a plan view, and a bottom view of hand 26. When hand 26 is used, the fingers are often directed to horizontal direction. Here, the front direction of hand 26 is determined to the direction orthogonal to the direction in which the fingers extend while the fingers are directed to horizontal direction. Hand 26 has five fingers. Hand 26 is disposed such that four fingers being disposed side by side and one finger face each other. One finger and four fingers move linearly such that the distance therebetween increases or decreases. In each of the five fingers, the entire finger is rotatable from its base. FIGS. 33 to 37 are perspective views illustrating states 1 to 5 in which hand 26 be changed. FIG. 38 is a perspective view in which an electric driver is operated in the changed state 5.

Hand 26 includes a first finger 91, four fingers being disposed side bay side, that are, second finger 92, third finger 93, fourth finger 94, and fifth finger 95, a first finger connection portion 96, a second finger connection portion 97, and a wrist connection portion 98. First finger 91 is disposed to face third finger 93. Second finger 92 is disposed side by side with third finger 93. Fourth finger 94 is disposed side by side with third finger 93 on the side opposite to the side where second finger 92 is disposed. Fifth finger 95 is disposed side by side with fourth finger 94 on the side opposite to the side where third finger 93 is disposed. First finger 91 is connected to first finger connection portion 96. Second finger 92, third finger 93, fourth finger 94, and fifth finger 95, which are four fingers, are connected to second finger connection portion 97 independently rotatably. Wrist connection portion 98 is connected to wrist joint 29. It can be considered that first finger 91 corresponds to a thumb of a human hand, second finger 92 corresponds to an index finger, third finger 93 corresponds to a middle finger, fourth finger 94 corresponds to a ring finger, and fifth finger 95 corresponds to a little finger.

In order to describe the structure of hand 26, a fourth orthogonal coordinate system is defined as follows.
  X4-axis: an axis perpendicular to wrist connection portion 98.
  Y4-axis: an axis parallel to the direction in which the finger is moved linearly.
  Z4-axis: an axis parallel to the direction in which the four fingers are disposed.

The direction of the fingertip in the reference state is defined as the positive direction of the X4-axis, the direction from first finger 91 toward third finger 93 is defined as the positive direction of the Y4-axis, and the direction from fifth finger 95 toward second finger 92 is defined as the positive direction of the Z4-axis. The direction parallel to the X4-axis is referred to as a fingertip direction. The side where an X4-coordinate value is large is referred to as a fingertip side, and the side where the X4-coordinate value is small is referred to as a finger base side. The direction parallel to the Z4-axis is referred to as a hand width direction. The side where a Z4-coordinate value is large is referred to as a second finger side, and the side where the Z4-coordinate value is small is referred to as a fifth finger side. The direction parallel to the Y4-axis is referred to as a sliding direction. The side where a Y4-coordinate value is large is referred to as a third finger side, and the side where the Y4-coordinate value is small is referred to as a first finger side.

First finger connection portion 96 is movable in the sliding direction with respect to wrist connection portion 98. First finger 91 is connected to first finger connection portion 96 rotatably. Second finger connection portion 97 is movable in the sliding direction with respect to wrist connection portion 98. Second finger 92, third finger 93, fourth finger 94, and fifth finger 95 are connected to second finger connection portion 97 rotatably. Both first finger connection portion 96 and second finger connection portion 97 move in linkage when they move in the sliding direction. The distance of movement with respect to wrist connection portion 98 is the same at first finger connection portion 96 and second finger connection portion 97, and the moving directions are opposite to each other.

Wrist connection portion 98 includes a hand base 98A, a connection columnar portion 98B, a first rail 98C, a second rail 98D, a pinion 98E (illustrated in FIG. 27), and a motor 98F (not illustrated). Hand base 98A is a plate-like member parallel to a Y4Z4-plane. First finger connection portion 96 and second finger connection portion 97 are connected to hand base 98A. When viewed from the direction parallel to the X4-axis, hand base 98A has a rectangular shape in which a ratio of a length in the Z4-axis direction to a length in the Y4-axis direction is about 10:11. Connection columnar portion 98B is a member connected to wrist joint 29. Connection columnar portion 98B is connected to the principal surface on the finger base side of hand base 98A. In connection columnar portion 98B, the outer shape is columnar, the diameter is large on the fingertip side, and the diameter decreases stepwise on the side where wrist joint 29 exists. Connection columnar portion 98B is fixed to wrist base 29D of wrist joint 29. The center axis of connection columnar portion 98B is defined as the X4-axis. The center axis of connection columnar portion 98B is located at the center in the Z4-axis direction of hand base 98A and at the position slightly on the side where first finger 91 exists in the Y4-axis direction. The intersection of the X4-axis and the principal surface of hand base 98A on which first rail 98C and the like are provided is set to be an origin of the fourth orthogonal coordinate system.

The center axis (X4-axis) of connection columnar portion 98B passes through the intersection of the EL6-axis and the XEL2-axis that are the two rotation axes of wrist joint 29. The forearm rotation axis (AZ6-axis) also passes through the intersection of the EL6-axis and the XEL2-axis. Consequently, wrist joint 29 can connect hand 26 to forearm 25 while the X4-axis coincides with the AZ6-axis (the state where the X4-axis exists on the same straight line as the AZ6-axis). When forearm 25 and hand 26 are rotated around the forearm rotation axis (AZ6-axis) while the X4-axis coincides with the AZ6-axis, hand 26 is rotated around the X4-axis.

First rail 98C is a rail on which first finger connection portion 96 is slid and is moved in the direction parallel to the Y4-axis. Second rail 98D is a rail on which second finger connection portion 97 is slid and is moved in the direction parallel to the Y4-axis. First rail 98C and second rail 98D are provided on the principal surface on the fingertip side of hand base 98A. First rail 98C is provided along a side on the second finger side of the principal surface of hand base 98A. Second rail 98D is provided along a side on the fifth finger side of the principal surface of hand base 98A. Pinion 98E is a gear that is rotated around the X4-axis. Pinion 98E is engaged with a first rack 96A provided on first finger connection portion 96 and a second rack 97A provided on second finger connection portion 97. When pinion 98E is rotated, first rack 96A, namely, first finger connection portion 96 and second rack 97A, namely, second finger connection portion 97 move in opposite directions by the same distance.

Motor 98F generates the power that moves first rack 96A and second rack 97A with respect to pinion 98E.

Hand 26 may include the moving mechanism that moves only one of first finger connection portion 96 and second finger connection portion 97 instead of the moving mechanism that moves first finger connection portion 96 and second finger connection portion 97. Hand 26 may include the moving mechanism that moves at least one of first finger connection portion 96 and second finger connection portion 97.

First finger connection portion 96 includes first rack 96A, first frame 96B, a first holder 96C, and a first finger connection frame 96D. First frame 96B is a frame having a rectangular parallelepiped outer shape including the principal surface parallel to the Y4Z4-plane. First rack 96A is provided along a side (parallel to the Y4-axis) on the finger base side of the side surface on the fifth finger side of first frame 96B. First holder 96C is a member that holds first rail 98C. When first holder 96C holds first rail 98C, first finger connection portion 96 can be moved along first rail 98C without being separated from hand base 98A. First holder 96C is provided along the side (parallel to the Y4-axis) on the second finger side of the principal surface on the finger base side of first frame 96B. First finger connection frame 96D is a member to which first finger 91 is connected rotatably. First finger connection frame 96D is connected to the side surface on the first finger side of first frame 96B.

Second finger connection portion 97 includes second rack 97A, a second frame 97B, a second holder 97C, a second finger connection frame 97D, and a palm flesh portion 97E. Second frame 97B is a frame having a rectangular parallelepiped outer shape including the principal surface parallel to the Y4Z4-plane. The length in the X4-axis direction of second frame 97B is slightly shorter than that of first frame 96B. Second rack 97A is provided along the side (parallel to the Y4-axis) on the finger base side of the side surface on the second finger side of second frame 97B. The distance between second rack 97A and hand base 98A is the same as the distance between first rack 96A and hand base 98A. Second holder 97C is a member that holds second rail 98D. When second holder 97C holds second rail 98D, second finger connection portion 97 can be moved along second rail 98D without being separated from hand base 98A. Second holder 97C is provided along the side (parallel to the Y4-axis) on the fifth finger side of the principal surface on the finger base side of second frame 97B. Second finger connection frame 97D is a member to which second finger 92, third finger 93, and fourth finger 95 are connected rotatably. Second finger connection frame 97D is connected to the side surface on the third finger side of second frame 97B.

A finger moving portion is composed of first rail 98C, first holder 96C, second rail 98D, second holder 97C, first rack 96A, second rack 97A, pinion 98E, and motor 98F. The finger moving portion is a moving mechanism that moves at least one of first finger connection portion 96 and second finger connection portion 97 with respect to hand base 98 such that the distance between first finger 91 and third finger 93 increases or decreases.

The finger moving portion included in hand 26 moves first finger connection portion 96 and second finger connection portion 97. As the finger moving portion, a finger moving portion that moves only one of the first finger connection portion and the second finger connection portion with respect to the hand base may be used.

Palm flesh portion 97E is connected to the side surface on the first finger side of second finger connection frame 97D at the position closer to the fingertip side than second frame 97B. Palm flesh portion 97E has a rectangular parallelepiped notch 97F in the sliding direction at a part facing to first finger 91 in the hand width direction. First finger 91 rotated with respect to first finger connection frame 96D can be housed in notch 97F. Palm flesh portion 97E comes into contact with an object on the finger base side when hand 26 holds the object. Palm flesh portion 97E supports second finger 92, fourth finger 94, and fifth finger 95 that are rotated with respect to second finger connection frame 97D on the finger base side.

Each of second finger 92, fourth finger 94, and fifth finger 95 can be rotated in the range from the angle perpendicular to hand base 98A to the angle at which second finger 92, fourth finger 94, and fifth finger 95 come into contact with palm flesh portion 97E. First finger 91 can be rotated in the range from the angle perpendicular to hand base 98A to the angle at which first finger 91 comes into contact with first frame 96B or third finger 93. Third finger 93 can be rotated in the range from the angle perpendicular to hand base 98A to the angle at which third finger 93 comes into contact with palm flesh portion 97E or first finger 91.

The structure of the finger is described. First finger 91 includes a finger body 91A, a fingertip 91B, a finger inside cover 91C, a finger joint 91D, a worm wheel 91E (illustrated in FIG. 34), a worm 91F (not illustrated), a motor 91G (not illustrated), a distance sensor 91H, and an opening 91J. Finger body 91A has a shape including an inside surface of a finger and side surfaces on both sides of the inside surface. The inside surface and the side surfaces are made of steel plates. The inside side of first finger 91 is a surface moving toward hand base 98A when the inside side is rotated. Similarly, second finger 92 and the like define the inside side. The side surface of finger body 91A has a low height on the fingertip side and a high height on the finger base side. Finger body 91A includes a bottom surface thicker than the side surface and provided at a part of the bottom on the finger base side. The fingertip side of finger body 91A is open. A steel material part having a narrow width in the hand width direction is provided on the finger base side of the bottom surface of finger body 91A.

Fingertip 91B is a resin member attached to the inside of the fingertip of finger body 91A. Irregularities having a height of about 2 mm are provided on the surface of fingertip 91B such that fingertip 91B and the object are more firmly in contact with each other. Fingertip 91B has a sufficient area that is in contact with the object when holding the object. Finger inside cover 91C is a resin member attached to the inside surface of finger body 91A. Finger inside cover 91C is thinner than fingertip 91B.

Finger joint 91D has a configuration in which a yoke 91DA provided in first finger connection frame 96D holds a dactylus rotation axis 91DB provided in first finger 91 rotatably. Worm wheel 91E is connected to the bottom surface of the finger base side of finger body 91A so as to be rotated together with dactylus rotation axis 91DB. Worm 91F is fitted to worm wheel 91E. Worm 91F is contained in first finger connection frame 96D. The opening is provided on the surface of first finger connection frame 96D on the side where finger joint 91D is provided, and worm wheel 91E exists in the opening and is fitted to worm 91F. Motor 91G generates the power rotating worm 91F. Motor 91G is contained in first finger connection frame 96D. First finger connection frame 96D also contains the gear that transmits the rotation of motor 91G to worm 91F.

Distance sensor 91H is a sensor that measures the distance between fingertip 91B and a nearby object. Distance sensor 91H emits a light beam passing through opening 91J provided in finger body 91A and measures the distance to the object. Distance sensor 91H is a first distance sensor provided at the fingertip of first finger 91.

Third finger 93 has the same structure as first finger 91. Third finger 93 includes a finger body 93A, a fingertip 93B, a finger inside cover 93C, a finger joint 93D, a worm wheel 93E (illustrated in FIG. 35), a worm 93F (illustrated in FIG. 35), a motor 93G (not illustrated), a distance sensor 93H, and an opening 93J. Distance sensor 93H is a second distance sensor provided at the fingertip of third finger 93. Finger body portion 93A is made of a steel plate. Fingertip 93B and finger inside cover 93C are made of resin. Finger body 93A has an inside surface with a difference in thickness. On the inside surface of finger body 93A, the difference in thickness is provided between a part where fingertip 93B is provided and a part where finger inside cover 93C is provided. The part where fingertip 93B is provided and the part where finger inside cover 93C is provided are parallel to each other, and the part where fingertip 93B is provided to be thicker. Worm 93F and motor 93G are contained in second finger connection frame 97D.

Fourth finger 94 and fifth finger 95 have the same shape as third finger 95. Fourth finger 94 and fifth finger 95 do not include the distance sensor and the opening. Fourth finger 94 is disposed on a side of third finger 93, the side is opposite to the side where second finger 92 is disposed, and connected to second finger connection portion 97 rotatably. Fifth finger 95 is disposed on a side of fourth finger 94, the side is opposite to the side where third finger 93 is disposed, and is connected to second finger connection portion 97 rotatably.

In addition to the structure similar to that of fourth finger 94, second finger 92 includes a slide fingertip 92K that is moved to the finger base side along a finger body 92A and a drive mechanism that moves slide fingertip 92K. Second finger 92 includes finger body 92A, a fingertip 92B, a finger inside cover 92C, a finger joint 92D, a worm wheel 92E (illustrated in FIG. 35), a worm 92F (illustrated in FIG. 35), a motor 92G (not illustrated), slide fingertip 92K, a motor container 92L, a motor 92M (not illustrated), a screw rod 92N (illustrated in FIG. 31), an opening 92P (illustrated in FIG. 31), and a nut 92Q (not illustrated). Slide fingertip 92K is provided on the side surface of finger body 92A on the side that is opposite to third finger 93. Slide fingertip 92K has a shape bent inward when viewed from the direction of the Z4-axis. The position of the curved tip of slide fingertip 92K in the direction perpendicular to fingertip 92B is substantially the same as the position of the surface of fingertip 92B, and the position in the direction in which second finger 92 extends is substantially the same as the end on the finger base side of fingertip 92B. For this reason, slide fingertip 92K does not interfere when second finger 92 holds the object. Slide fingertip 92K can be moved to the finger base side along finger body 92A by the distance of about 20% of the length of finger body 92A. Slide fingertip 92K is a hook portion that is provided on the side of second finger 92 opposite to the side where third finger 93 is disposed and is bent toward the side (inside) on which first finger 91 is provided.

Finger body 92A contains a mechanism that moves slide fingertip 92K, and has a rectangular cylindrical outer shape. Opening 92P extending in the length direction of finger body 92A is provided on the side surface of finger body 92A on the side where third finger 93 is not disposed. The length of opening 92P is substantially equal to the length in which slide fingertip 92K can be moved. Screw rod 92N is provided in opening 92P. Screw rod 92N is provided in finger body 92A on the finger base side. Nut 92Q in which a through-hole including a female screw fitted with screw rod 92N is provided inside of finger body 92A. The position of nut 92Q in the length direction with respect to finger body 92A is determined, and the length of screw rod 92N being out of finger body 92A is changed as nut 92Q is rotated. Motor 92G generates the power rotating nut 92Q. Motor container 92L contains motor 92G.

The mechanism that moves slide fingertip 92K is a hook portion moving portion that moves slide fingertip 92K along second finger 92 in the direction toward second finger connection portion 97.

The number of movable parts included in hand 26 is seven. Five fingers, namely, first finger 91, second finger 92, third finger 93, fourth finger 94, and fifth finger 95 can be rotated in hand 26. The distance between first finger connection portion 96 and second finger connection portion 97 can be changed. Slide fingertip 92K of second finger 92 can be moved. Hand 26 has a simple structure. For example, when each of five fingers is able to be bent at two finger joints, at least 10 drive mechanisms are required.

First finger 91 can be rotated from the position perpendicular to hand base 98A to the position parallel to hand base 98A. When first finger 91 is parallel to hand base 98A, first finger 91 is housed in notch 97F provided in palm flesh portion 97E.

Second finger 92, third finger 93, fourth finger 94, and fifth finger 95 can be changed the angle with respect to hand base 98A independently. Second finger 92, third finger 93, fourth finger 94, and fifth finger 95 can be rotated from the position perpendicular to hand base 98A to the position that is in contact with palm flesh portion 97E.

Figure 33:
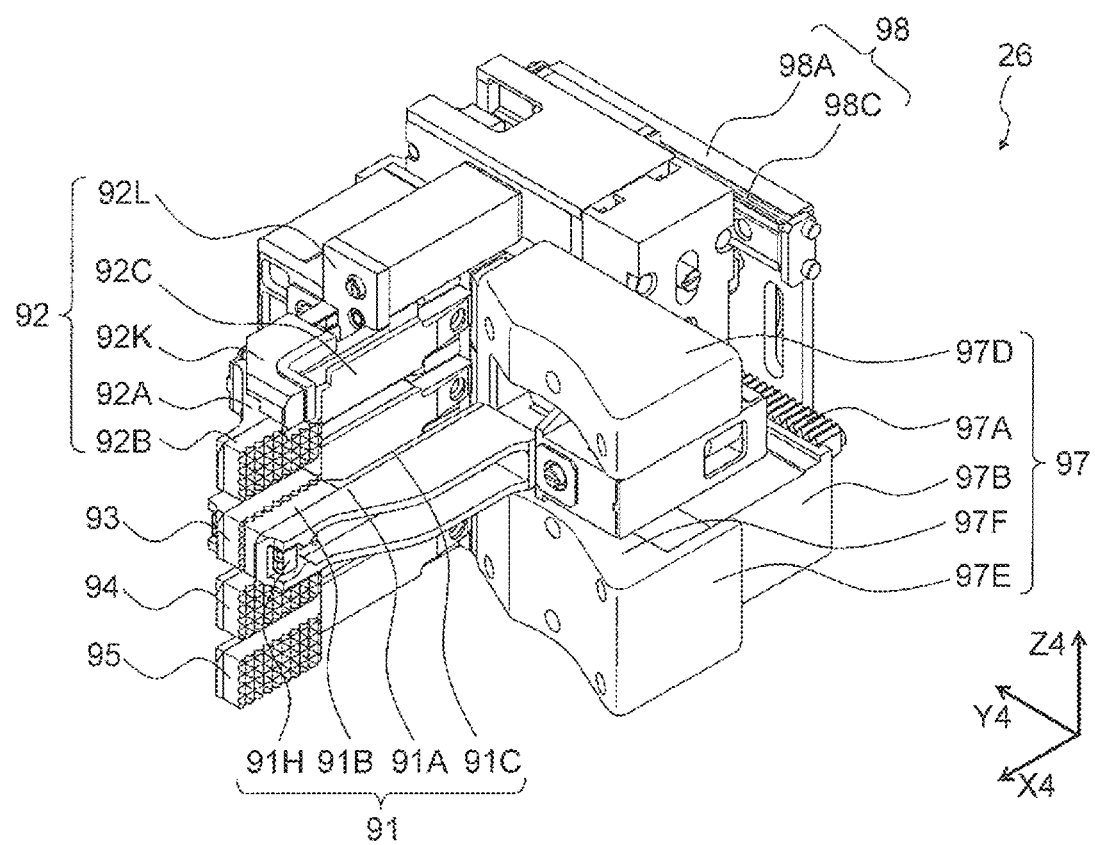
FIG. 33 is a perspective view illustrating a changed state 1 of the hand included in the robot operated by the robot operation system of the embodiment.

In state 1 shown in FIG. 33, first finger 91, second finger 93, third finger 93, fourth finger 94, and fifth finger 95 are perpendicular to hand base 98A, and fingertip 91B of first finger 91 and fingertip 93B of third finger 93 can be in contact with each other. In state 1, the object can be held between fingertip 91B and fingertip 93B. Hand 26 in state 1 can hold a thin object such as paper. In hand 26 in state 1, the object is sandwiched between the four fingers and first finger 91, so that even a large object can be sandwiched.

Figure 34:
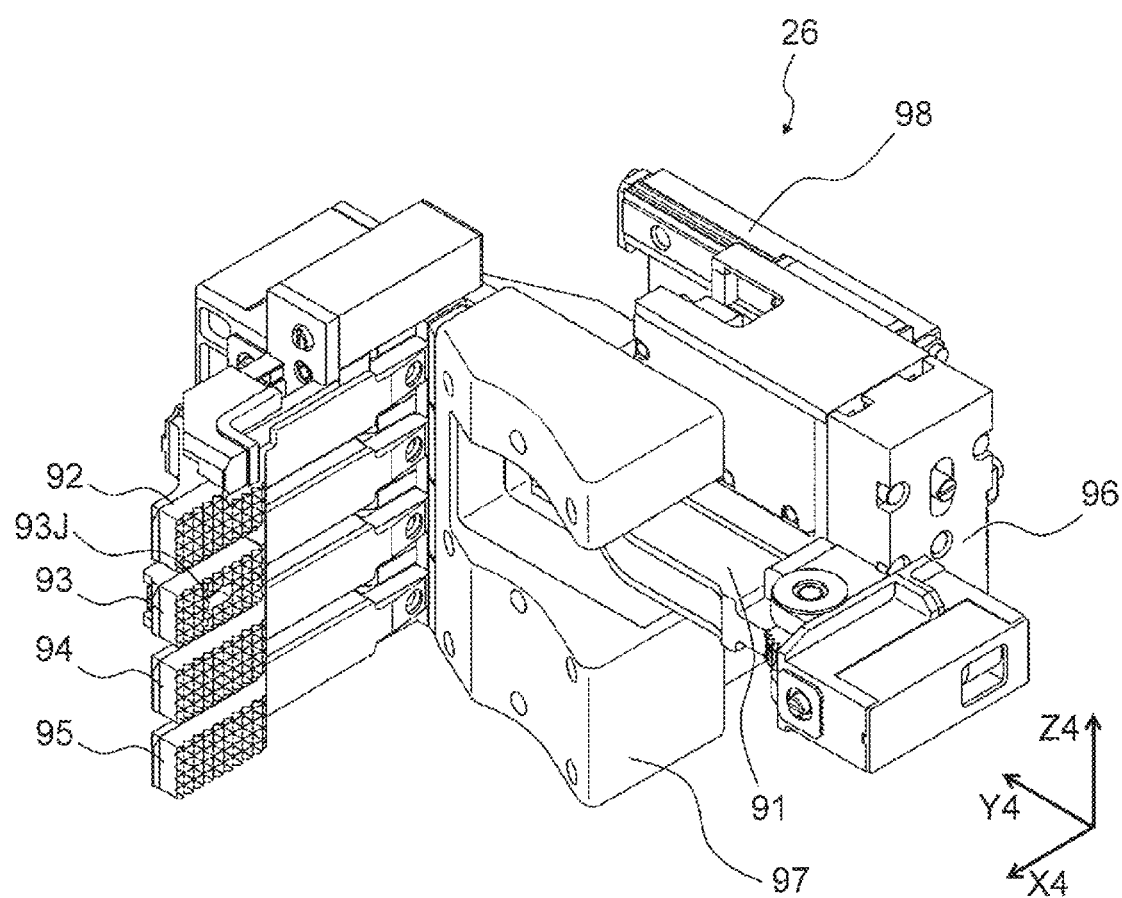
FIG. 34 is a perspective view illustrating a changed state 2 of the hand included in the robot operated by the robot operation system of the embodiment.

In state 2 shown in FIG. 34, only first finger 91 can be made parallel to hand base 98A, and second finger 93, third finger 93, fourth finger 94, and fifth finger 95 can be made perpendicular to hand base 98A. In hand 26 in state 2, when wrist joint 29 is rotated such that the inside surfaces of second finger 93, third finger 93, fourth finger 94, and fifth finger 95 are directed upward, the object can be placed on the four fingers included in hand 26. In addition, four fingers can be used like a scoop.

Figure 35:
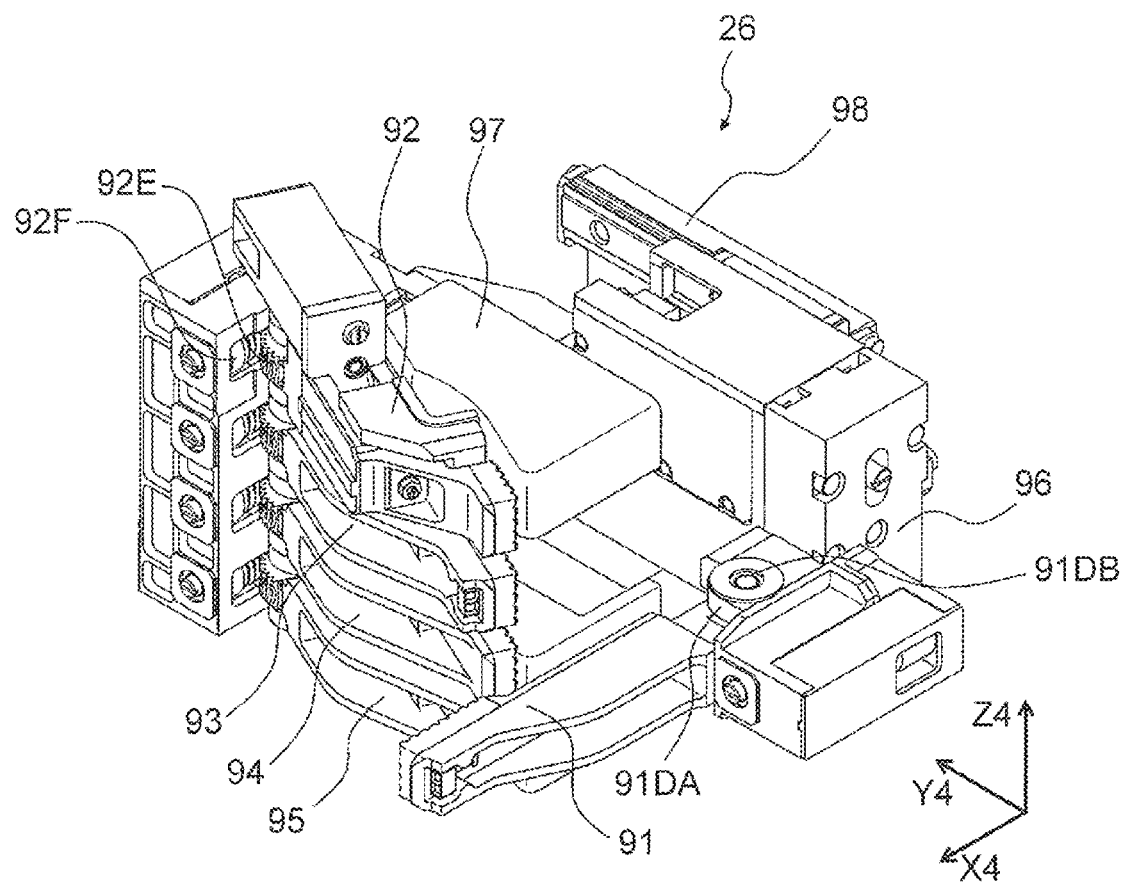
FIG. 35 is a perspective view illustrating a changed state 3 of the hand included in the robot operated by the robot operation system of the embodiment.

In state 3 shown in FIG. 35, only first finger 91 is perpendicular to hand base 98A, and second finger 93, third finger 93, fourth finger 94, and fifth finger 95 are in contact with palm flesh portion 97E. Hand 26 in state 3 can press a button or the like with fingertip 91B of first finger 91.

Figure 36:
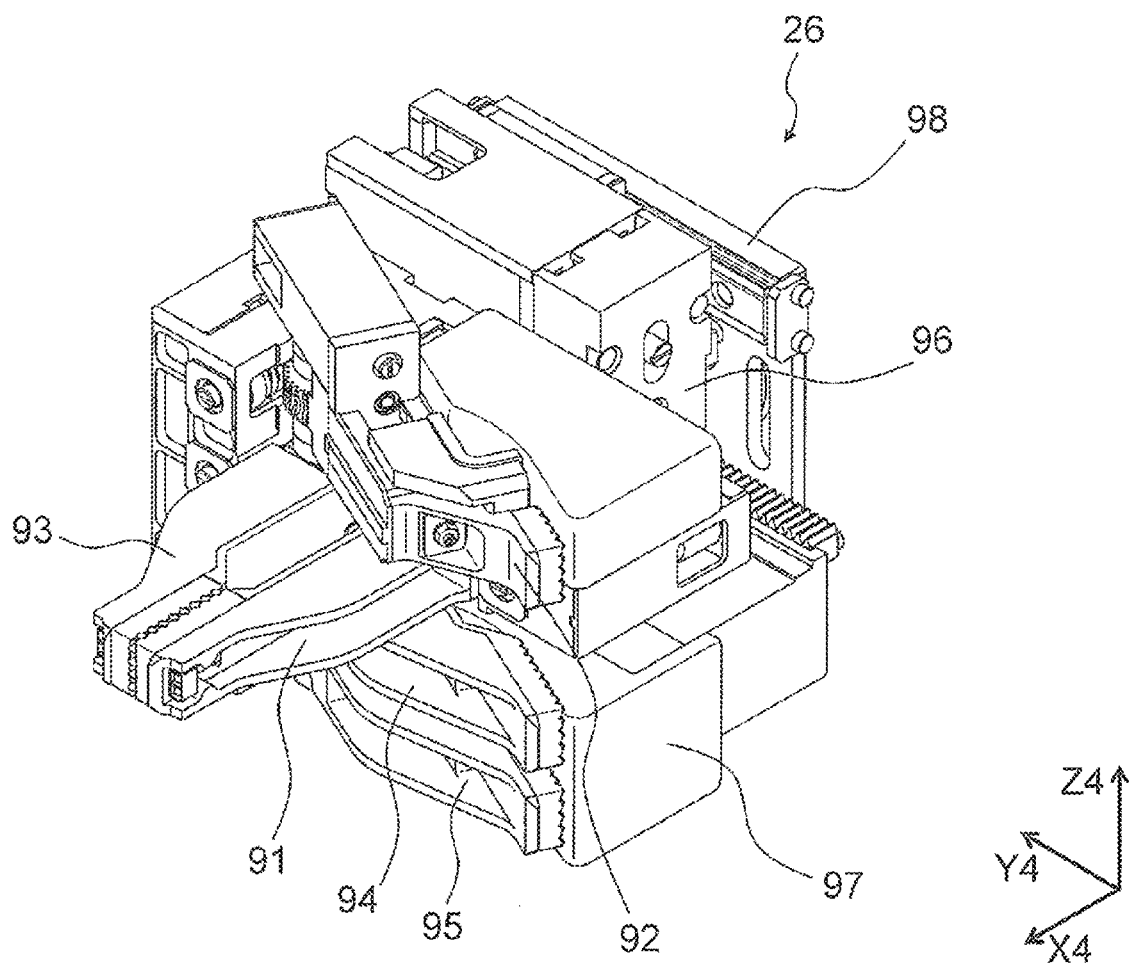
FIG. 36 is a perspective view illustrating a changed state 4 of the hand included in the robot operated by the robot operation system of the embodiment.

In state 4 shown in FIG. 36, first finger 91 and third finger 93 are perpendicular to hand base 98A, and second finger 93, fourth finger 94, and fifth finger 95 are in contact with palm flesh portion 97E. Similarly to state 1, state 4 can hold the object between fingertip 91B and fingertip 93B. Fingertips of first finger 91 and third finger 93 can be put in a narrow space where second finger 93, fourth finger 94, and fifth finger 95 being in a standing state cannot be put in to hold the object.

Figure 37:
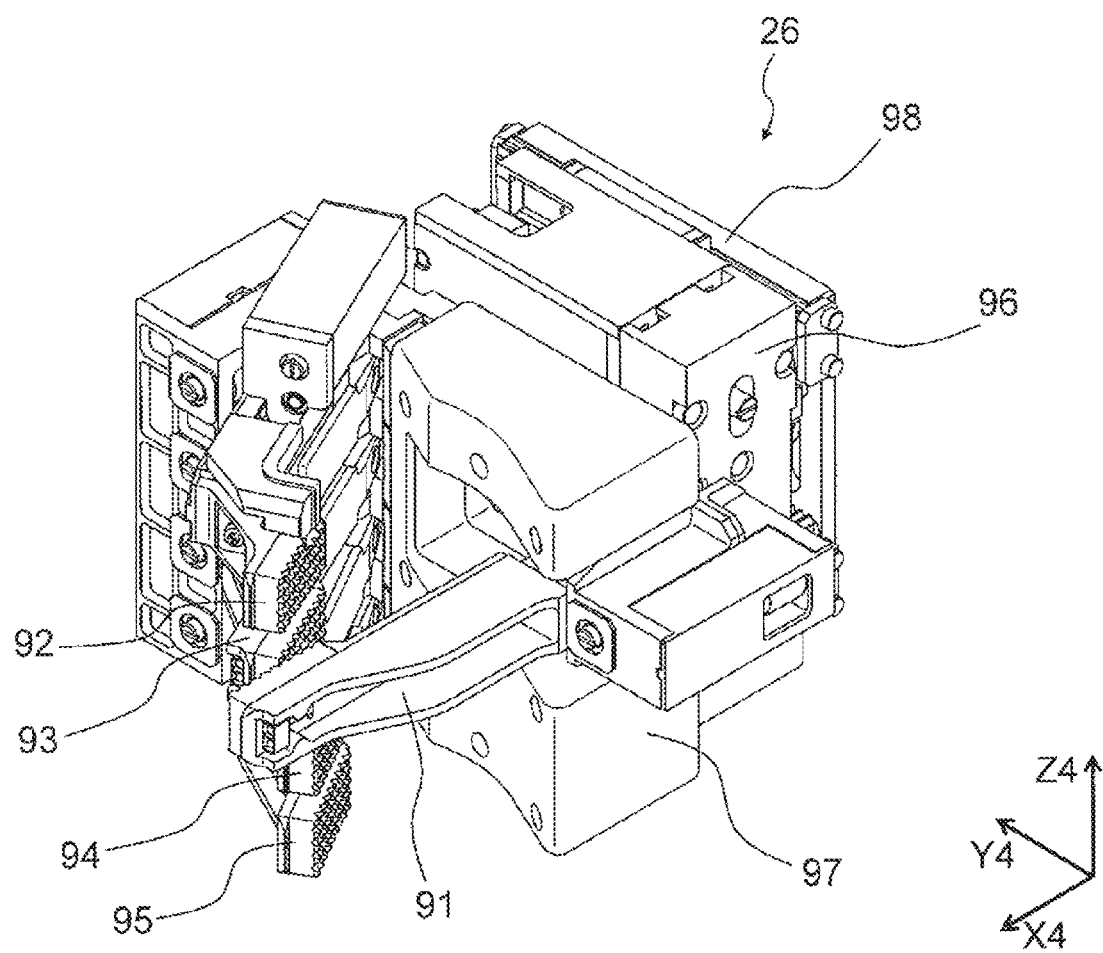
FIG. 37 is a perspective view illustrating a changed state 5 of the hand included in the robot operated by the robot operation system of the embodiment.
Figure 38:
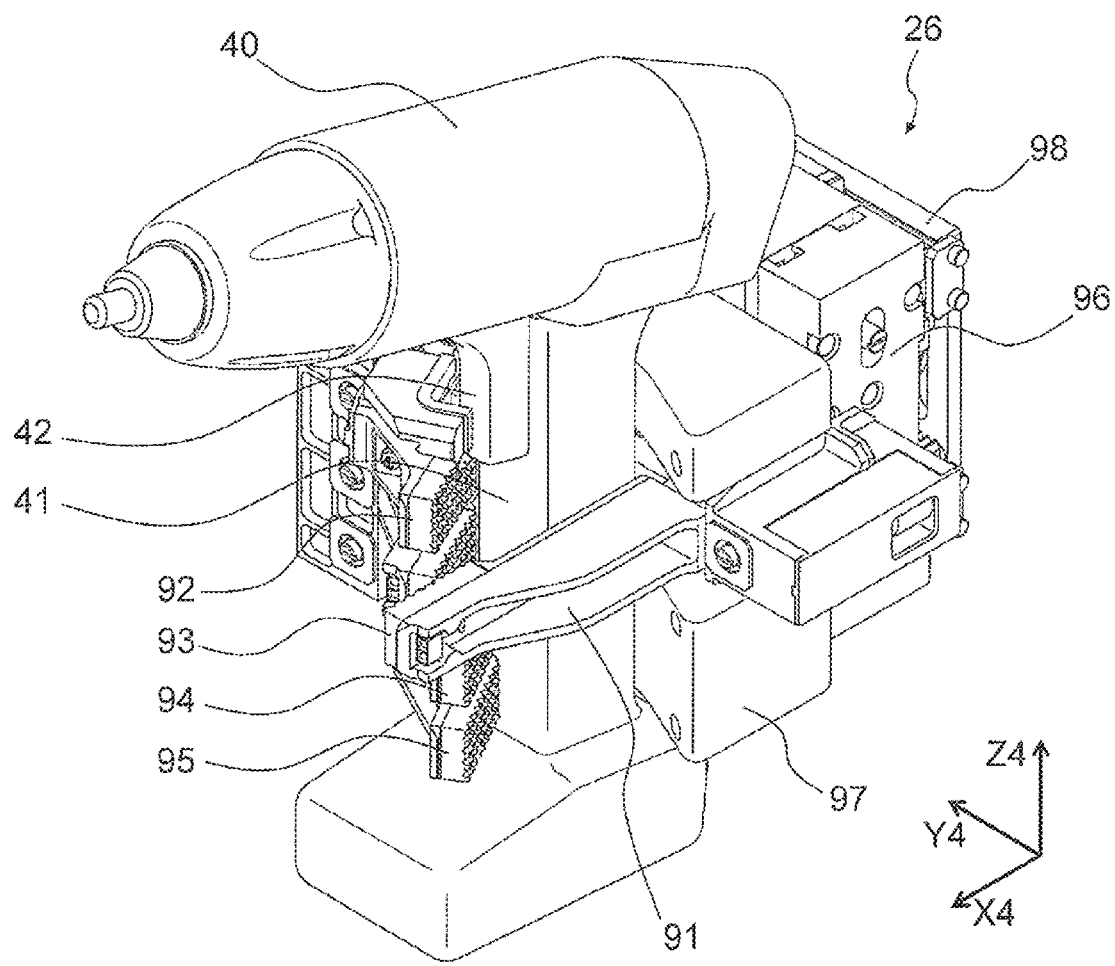
FIG. 38 is a perspective view illustrating a usage example of the changed state 5 of the hand included in the robot operated in the robot operation system of the embodiment.

In state 5 shown in FIG. 37, first finger 91 is perpendicular to hand base 98A, second finger 93, third finger 93, fourth finger 94, and fifth finger 95 are inclined, and fingertip 93B of third finger 93 are in obliquely contact with first fingertip 91B. As illustrated in FIG. 38, for example, hand 26 in state 5 is a state to be taken by hand 26 when hand 26 holds the grip of the electric driver. As illustrated in FIG. 38, a grip 41 of an electric driver 40 is held by five fingers. Furthermore, slide fingertip 92K is moved to the finger base side while slide fingertip 92K of second finger 92 is placed on a lever 42 of electric driver 40, so that lever 42 can be pulled. That is, hand 26 in state 5 can use, for example, electric driver 40.

Figure 39:
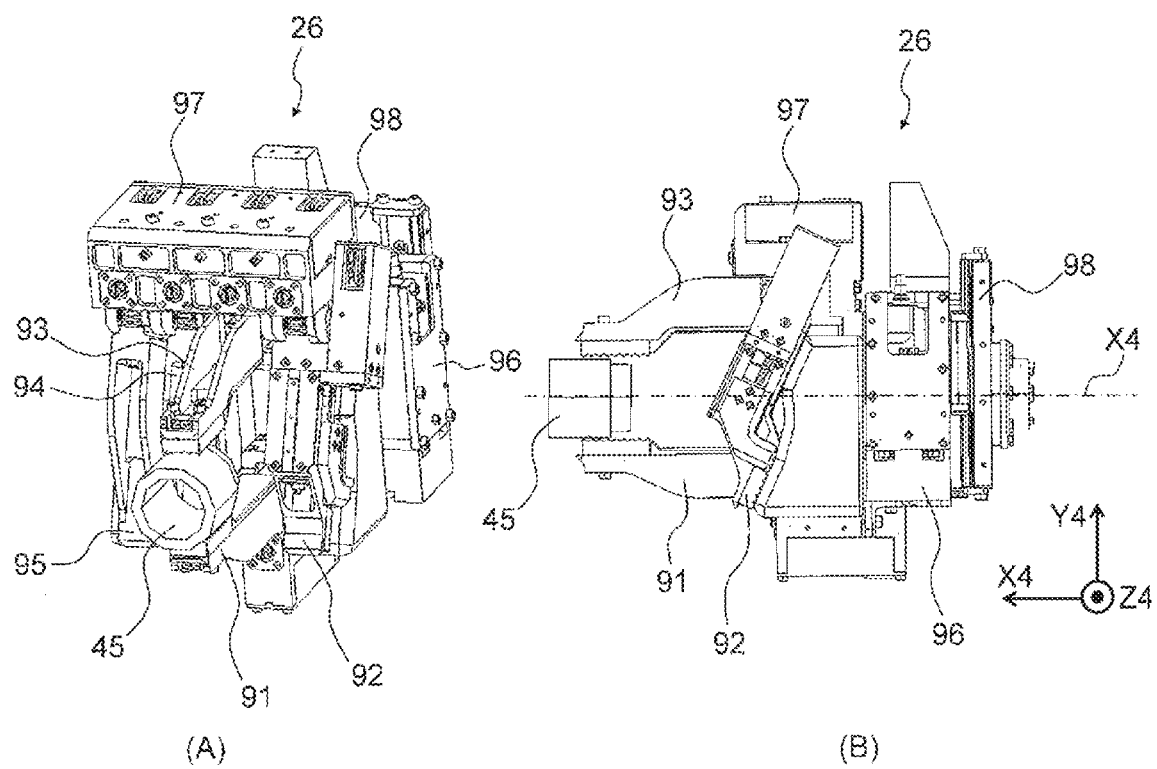
FIG. 39 is a perspective view and a front view illustrating another usage example of the hand included in the robot operated by the robot operation system of the embodiment.
Figure 40:
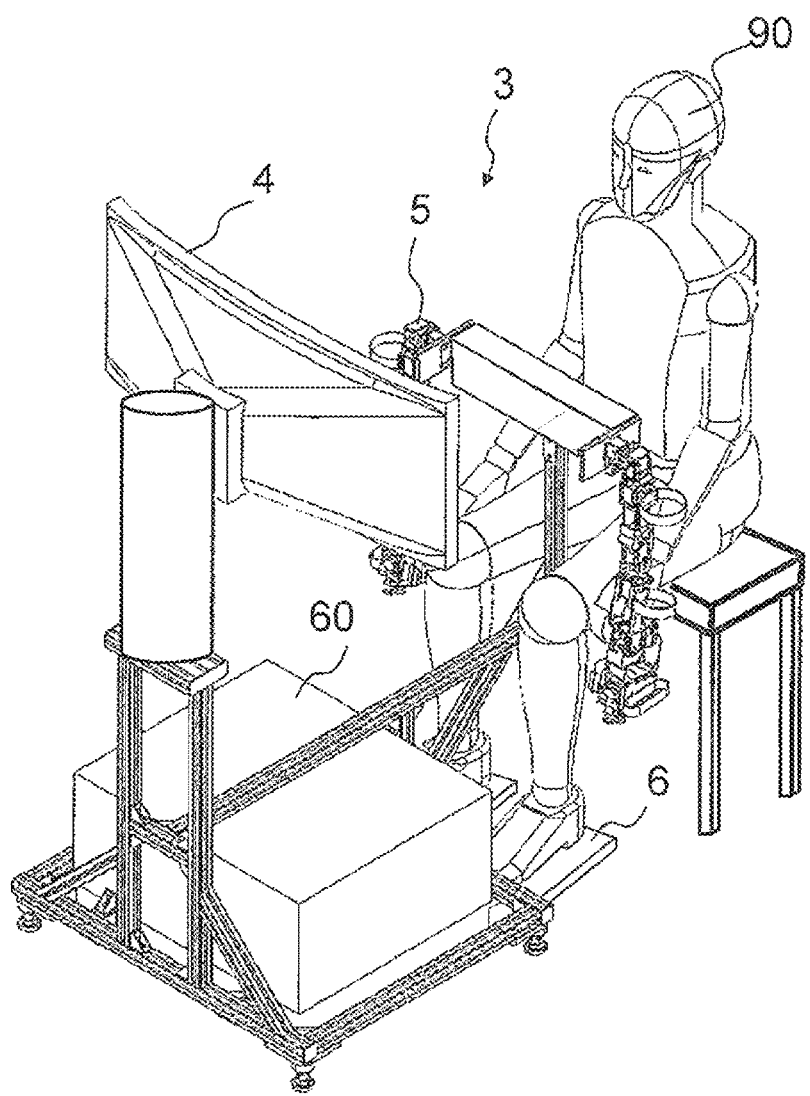
FIG. 40 is a perspective view illustrating a usage state of an operation device included in the robot operation system of the embodiment.
Figure 41:
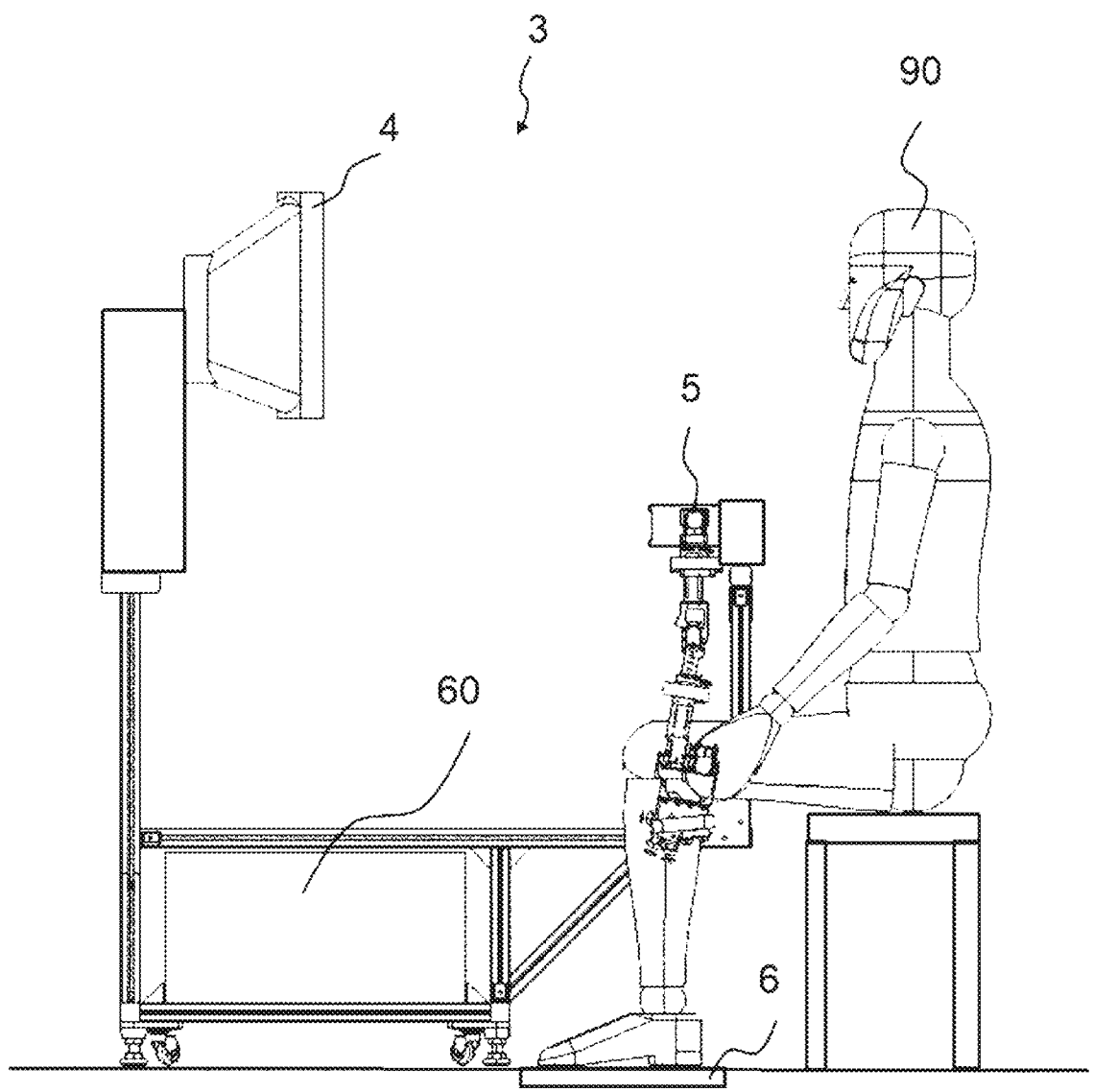
FIG. 41 is a right side view illustrating the usage state of the operation device included in the robot operation system of the embodiment.
Figure 42:
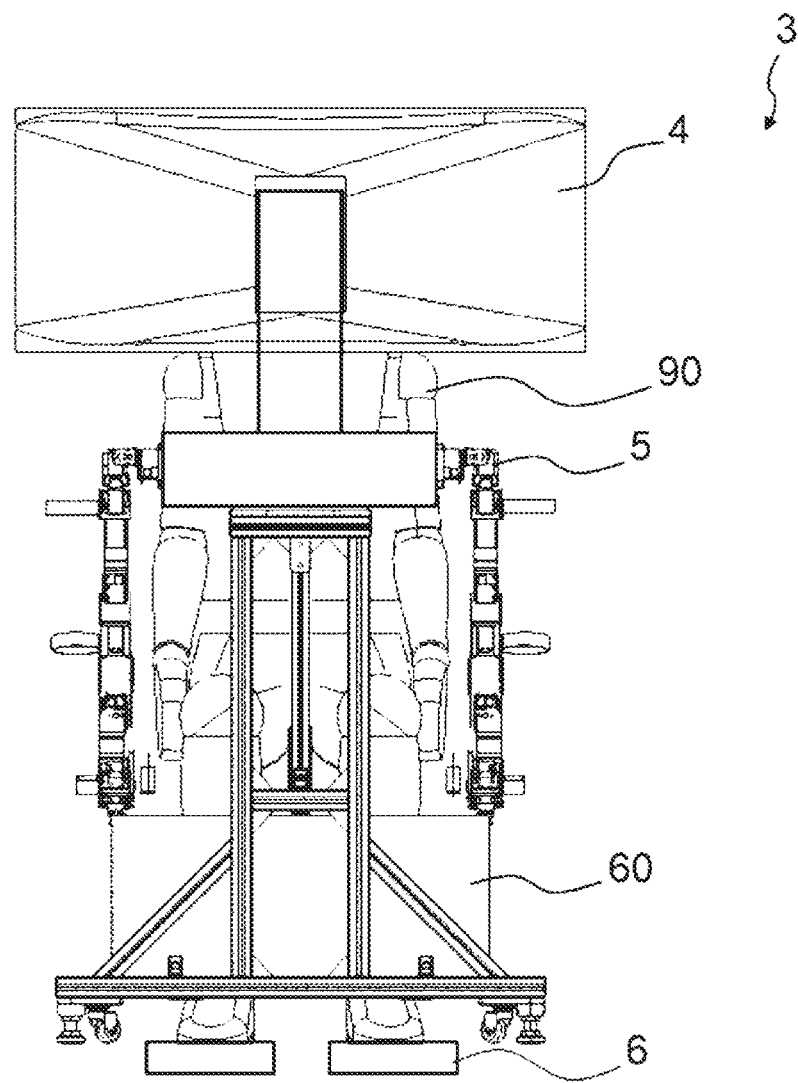
FIG. 42 is a front view illustrating the usage state of the operation device included in the robot operation system of the embodiment.
Figure 43:
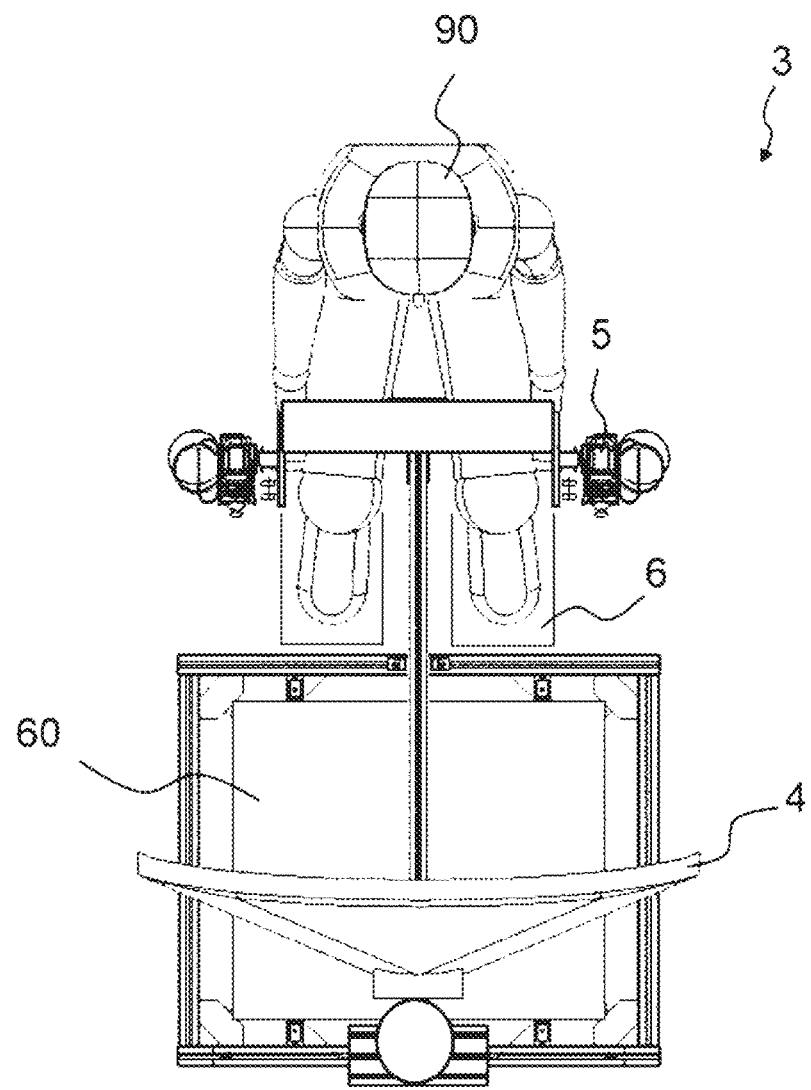
FIG. 43 is a plan view illustrating the usage state of the operation device included in the robot operation system of the embodiment.

FIG. 39 is a view illustrating an example in which hand 26 in state 4 is used. FIG. 39(A) illustrates a right side view, and FIG. 39(B) illustrates a front view. Hand 26 in state 4 holds a regular octagonal cylindrical object 45 sandwiched between fingertip 91B of first finger 91 and fingertip 93B of third finger 93. As illustrated in FIG. 39(B), when first finger 91 and third finger 93 are perpendicular to hand base 98A, fingertip 91B and fingertip 93B are parallel to each other. The rotation axis (X4-axis) that rotates hand base 98A passes through the center of the space between fingertip 91B and fingertip 93B. The center of the space is also a midpoint between the fingertips of first finger 91 and third finger 93. When hand 26 is rotated around the X4-axis, the position of object 45 is rotated without being changed. Hand 26 can rotate object 45 stably and easily.

In arm 10, hand 26 is rotated together with forearm 25 around the forearm rotation axis (AZ6-axis) of elbow joint 28. In wrist joint 29, hand 26 cannot rotate around the center axis (X4-axis) of connection columnar portion 98B. When the AZ6-axis is used instead of the X4-axis, arm 10 can rotate hand 26 around the AZ6-axis (X4-axis). To use AZ-6 axis instead of X4-axis, hand 26 is directed toward the forearm rotation axis (AZ6-axis). That is, the X4-axis is matched with the AZ6-axis. In other words, hand 26 is connected to forearm 25 such that the X4-axis and the AZ6-axis are present on one straight line. Then, the forearm rotation axis (AZ6-axis) becomes the rotation axis (X4-axis) that allows hand base 98A to be rotated. When forearm 25 is rotated around the forearm rotation axis (AZ6-axis) at elbow joint 26 in this state, hand 26 also is rotated around the X4 axis. In this manner, robot 1 can rotate hand 26 while holding a driver or the like that is a kind of tool. As described above, although the total rotational degrees of freedom of the joints is seven rotational degrees of freedom, arm 10 can perform various actions including the action rotating hand 26.

The wrist joint may have three rotational degrees of freedom that enables to be rotatable around the rotation axis passing through hand 26. In this case, even in the state where hand 26 is directed in the direction different from forearm 25, hand 26 can be rotated while holding the driver or the like. When the wrist joint has three rotational degrees of freedom, forearm 25 may not be able to be rotated around the forearm rotation axis at elbow joint 28. In the case where the wrist joint has three rotational degrees of freedom, a spherical bearing is required to be used or a member holding the biaxial gimbal rotatably is required to be added, and three links that drives the joint are required further. As a result, the structure of the wrist joint with three rotational degrees of freedom becomes more complicated than that of wrist joint 29 with two rotational degrees of freedom.

Hand 26 is operated in three modes of a finger rotation mode, a distance change mode, and a slide mode. In the finger rotation mode, the angle formed by first finger 91 and first finger connection portion 96 can be changed, and the angle formed by each of second finger 92, third finger 93, fourth finger 94, and fifth finger 95 with respect to second finger connection portion 97 can be changed independently. In the distance change mode, the distance between first finger connection portion 96 and second finger connection portion 97 can be changed. In state 2 shown in FIG. 34, the distance between first finger connection portion 96 and second finger connection portion 97 cannot be changed. State 2 can be taken when the distance between first finger connection portion 96 and second finger connection portion 97 is the widest. In the slide mode, slide fingertip 92K can be moved to the finger base side. The action modes of hand 26 and a hand operation device 80 can be changed easily by operator 90 through operating mode switching pedal 6 with a foot. Therefore, operator 90 can change the action modes of hand 26 and hand operation device 80 while hand 26 maintains the state in which hand 26 holds the object. Operation instructions to move hand 26 other than the mode switching are inputted by operator 90 through hand operation device 80. Hand operation device 80 is held by operator 90. Hand operation device 80 may be provided with a button, a switch, a lever, or the like that switches the action mode. Hand operation device 80 is described later.

Hand 26 that can be used in a plurality of action modes can be considered as a hybrid robot hand having a plurality of functions. Hand 26 has a simple structure in which the number of movable parts is only seven. Even so, hand 26 can be used in many use forms such as holding the object in many variations, using a tool, or performing the action such as snow shoveling with four fingers. Hand 26 can perform many works equivalent to or close to those performed by a human. Only a set of hand 26, hand operation device 80, and the control calculation device can be used. A robot hand system is composed of the set of hand 26, hand operation device 80, and the control calculation device. The robot hand system operates a robot hand.

Hand 26 can hold the object in various forms. For example, the object can be sandwiched and held between first finger 91 and third finger 93. First finger 91, second finger 92, third finger 93, fourth finger 94, and fifth finger 95 can sandwich and hold the object. When the object is held using five fingers, even in the case where the object is heavy, rotational moment acting on the object is received by the five fingers in a distributed manner, and the object can be held stably. When the tool or the like is held and wrist joint 29 is rotated for the purpose of the use of the tool, reaction force against the rotational moment can be received by five fingers. First finger 91, second finger 92, third finger 93, fourth finger 94, and fifth finger 95 can be bent appropriately to hold the object in a holding manner suitable for the shape of the object. The usual manipulator can be held only with two fingers, but hand 26 can hold the object with two to five fingers. Hand 26 can hold even the object having no flat surface with rotating five fingers appropriately according to the shape of the object. Operator 90 determines the angle at which the finger is bent, and operator 90 operates five fingers, first finger connection portion 96, and second finger connection portion 97 such that hand 26 is operated to have the appropriate shape. Because the number of fingers and the angle of each finger used in holding the object can be changed according to the object, the variation of the object held by hand 26 is expanded greatly.

Second finger 92 corresponding to the index finger includes slide fingertip 92K in which the fingertip is bent inward and movable to the finger base side. The electric driver, the water discharge nozzle, and the like can be held with five fingers, and slide fingertip 92K is hooked on the lever (moving the lever to the finger base side), so that the electric driver, the water discharge nozzle, and the like can be operated easily. As long as slide fingertip 92K can be hooked, the lever or the like may have any shape. The inventors do not know other robot hands or manipulators that can operate the electric driver, the water discharge nozzle, and the like and can hold the object in various forms.

Figure 44:
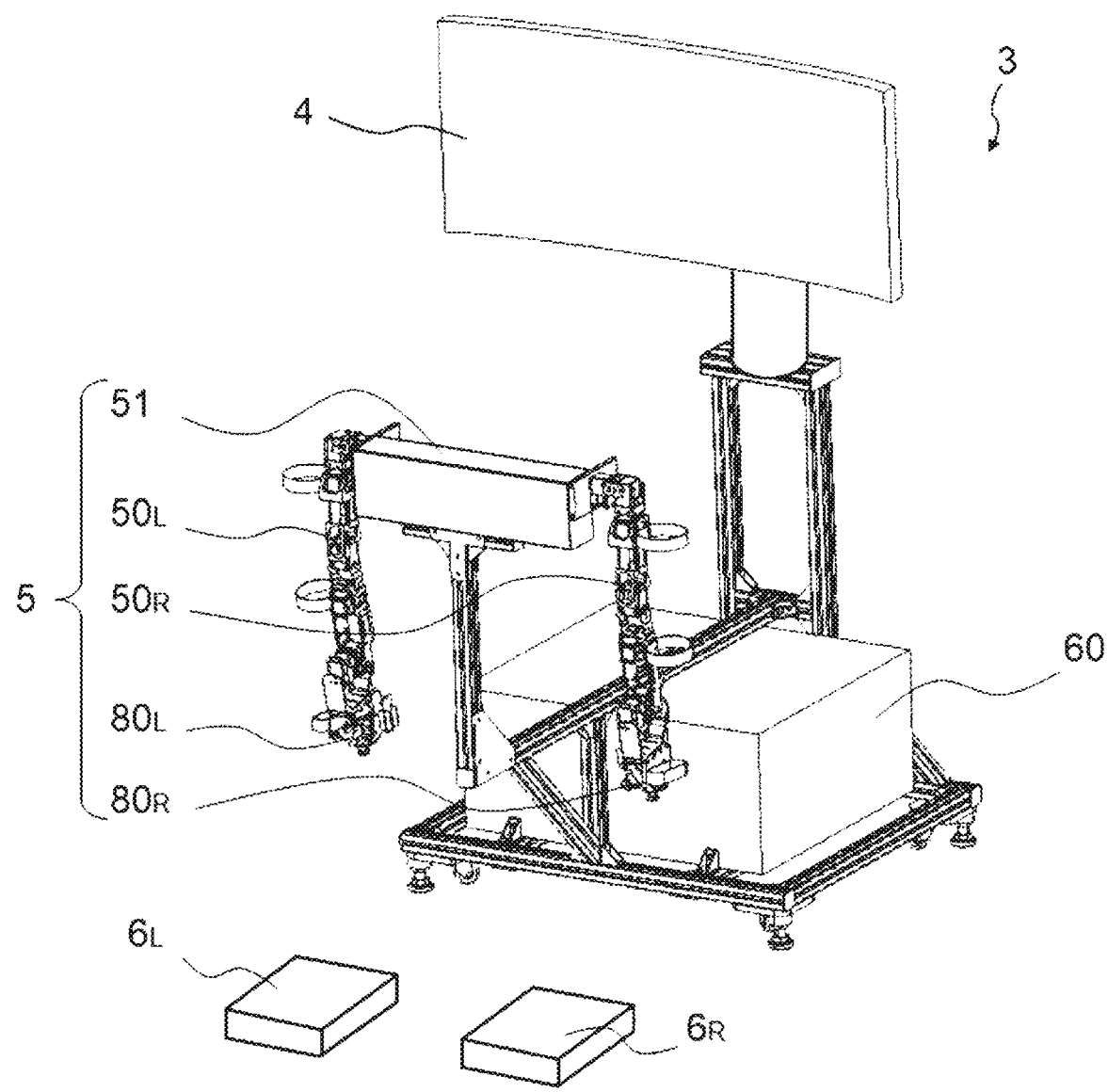
FIG. 44 is a perspective view illustrating the operation device included in the robot operation system of the embodiment.
Figure 45:
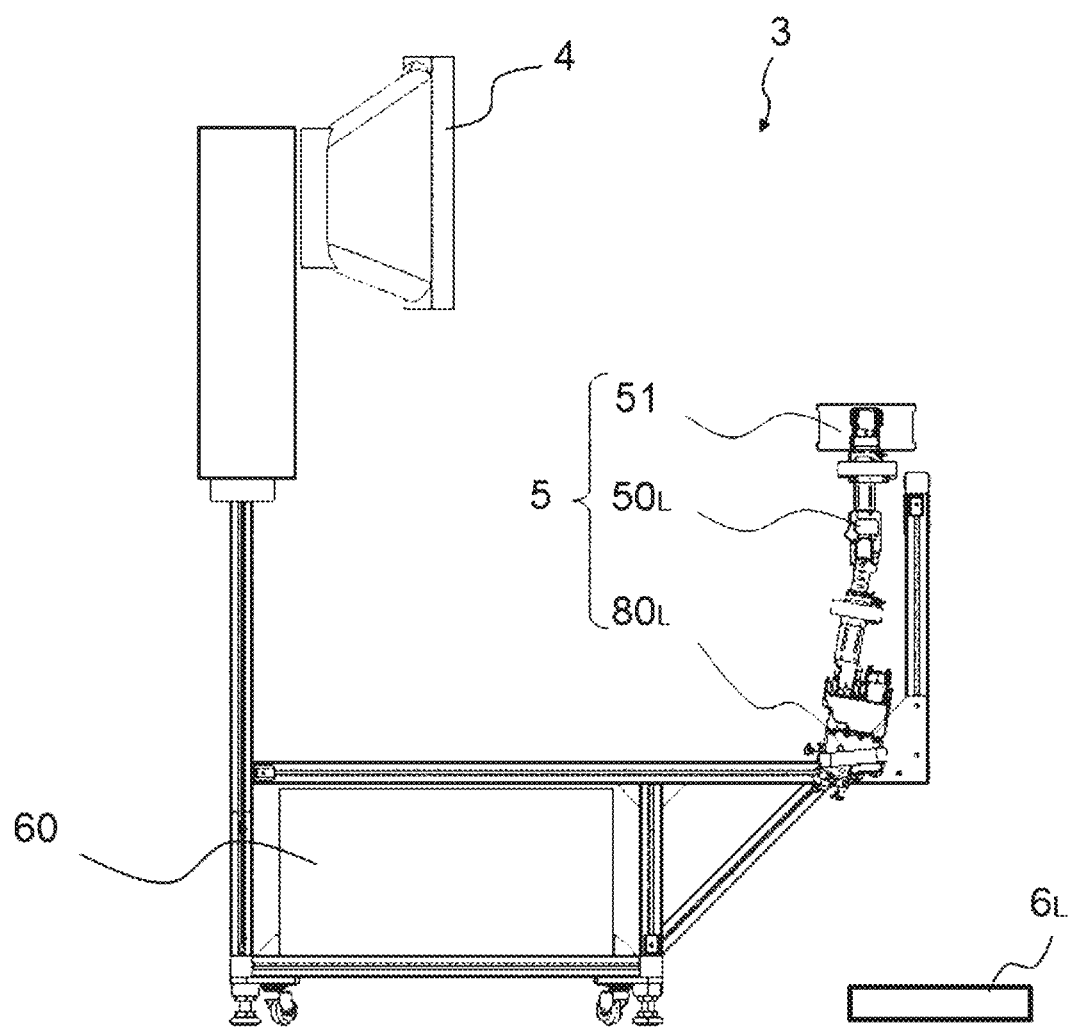
FIG. 45 is a right side view illustrating the operation device included in the robot operation system of the embodiment.

Referring to FIGS. 40 to 45, the structure of operation device 3 is described. FIGS. 40 to 43 are a perspective view, a right side view, a front view, and a plan view of operation device 3 in the use state. In FIGS. 40 to 43, operator 90 is also illustrated. FIGS. 44 and 45 are a perspective view and a right side view of operation device 3. In FIGS. 44 and 45, operator 90 is not illustrated. Operation device 3 includes display device 4, upper body input device 5, mode switching pedal 6, foot operation input device 7 (not illustrated), and control calculation device 60. Display device 4 displays the image captured by on-site camera 2, the model image that is the image of the three-dimensional model of robot 1 and the surrounding environment viewed from the viewpoint designated by operator 90, and the like. Control calculation device 60 has a function of generating an image to be displayed on display device 4. Display device 4 may be a display device capable of stereoscopic display. The stereoscopic display means that the display is performed so as to be viewed stereoscopically. The stereoscopic display device and other types of display devices may be used in combination.

Upper body input device 5 is a device that inputs the operation instruction to operate left and right arms 10 and left and right hands 26 included in robot 1. Mode switching pedal 6 is used by operator 90 to input switching of the mode in which hand 26 is moved. When operator 90 takes a posture toward upper body input device 5, mode switching pedal 6 existing on the right side of operator 90 is referred to as a mode switching pedal $6_R$, and mode switching pedal 6 existing on the left side is referred to as a mode switching pedal $6_L$. Operator 90 steps on mode switching pedal $6_R$ with the right foot and steps on mode switching pedal $6_L$ with the left foot. Foot operation input device 7 is operated by operator 90 with the foot in order to operate humanoid 1H not including vehicle portion 1W and arm 10. A device similar to that described in Japanese Patent Application No. 2020-57275 (filing date: Mar. 27, 2020) is used as foot operation input device 7. Foot operation input device 7 is not described herein. Japanese Patent Application No. 2020-57275 was published as Japanese Patent Laid-Open No. 2021-49633 on Apr. 1, 2021. The contents of Japanese Patent Application No. 2020-57275 are incorporated herein by reference.

Upper body input device 5 includes arm operation devices $50_R$, $50_L$, hand operation devices $80_R$, $80_L$, and a support frame 51. Operator 90 operates right arm 10 by arm operation device $50_R$. Left arm 10 is operated by arm operation device $50_L$. Right hand 26 is operated by hand operation device $80_R$. Left hand 26 is operated by hand operation device $80_L$. Support frame 51 disposes arm operation devices $50_R$, $50_L$ at determined positions. The upper end of arm operation device $50_R$ is connected to the right side of support frame 51. The upper end of the arm operation device $50_L$ is connected to the left side of support frame 51. In support frame 51, upper ends of arm operation devices $50_R$, $50_L$ are disposed in front of the position slightly lower than a chest of operator 90 sitting on a chair. Hand operation device $80_R$ is connected to the tip of arm operation device $50_R$. Hand operation device $80_L$ is connected to the tip of arm operation device $50_L$.

Control calculation device 60 controls right arm 10 based on the operation instruction inputted through right arm operation device $50_R$, and controls left arm 10 based on the operation instruction inputted through left arm operation device $50_L$. Control calculation device 60 controls right hand 26 based on the operation instruction inputted through right hand operation device $80_R$, and controls left hand 26 based on the operation instruction inputted through left hand operation device $80_L$.

Figure 46:
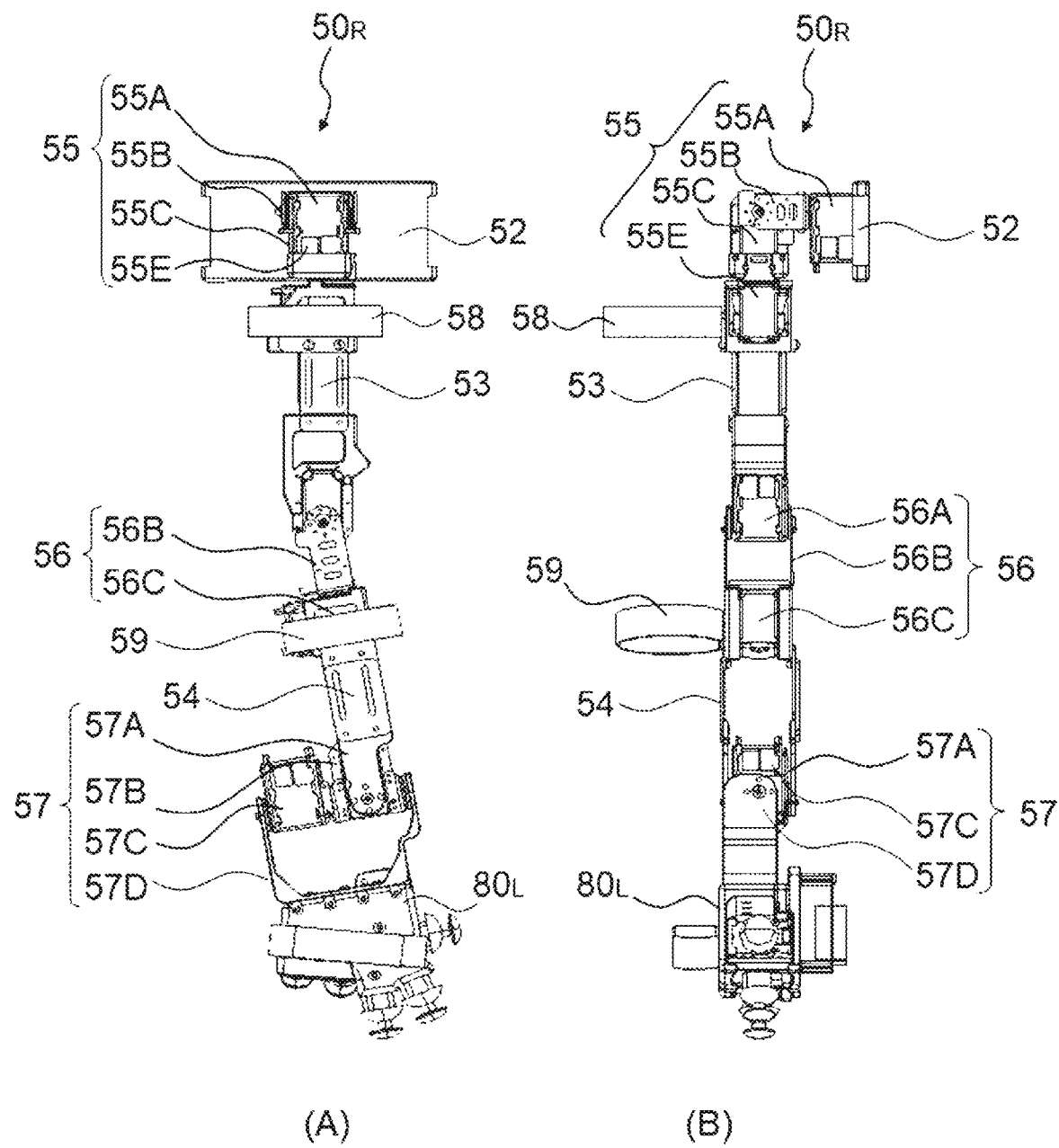
FIG. 46 is a left side view and a front view illustrating a right arm operation device and a right hand operation device included in the robot operation system of the embodiment.
Figure 47:
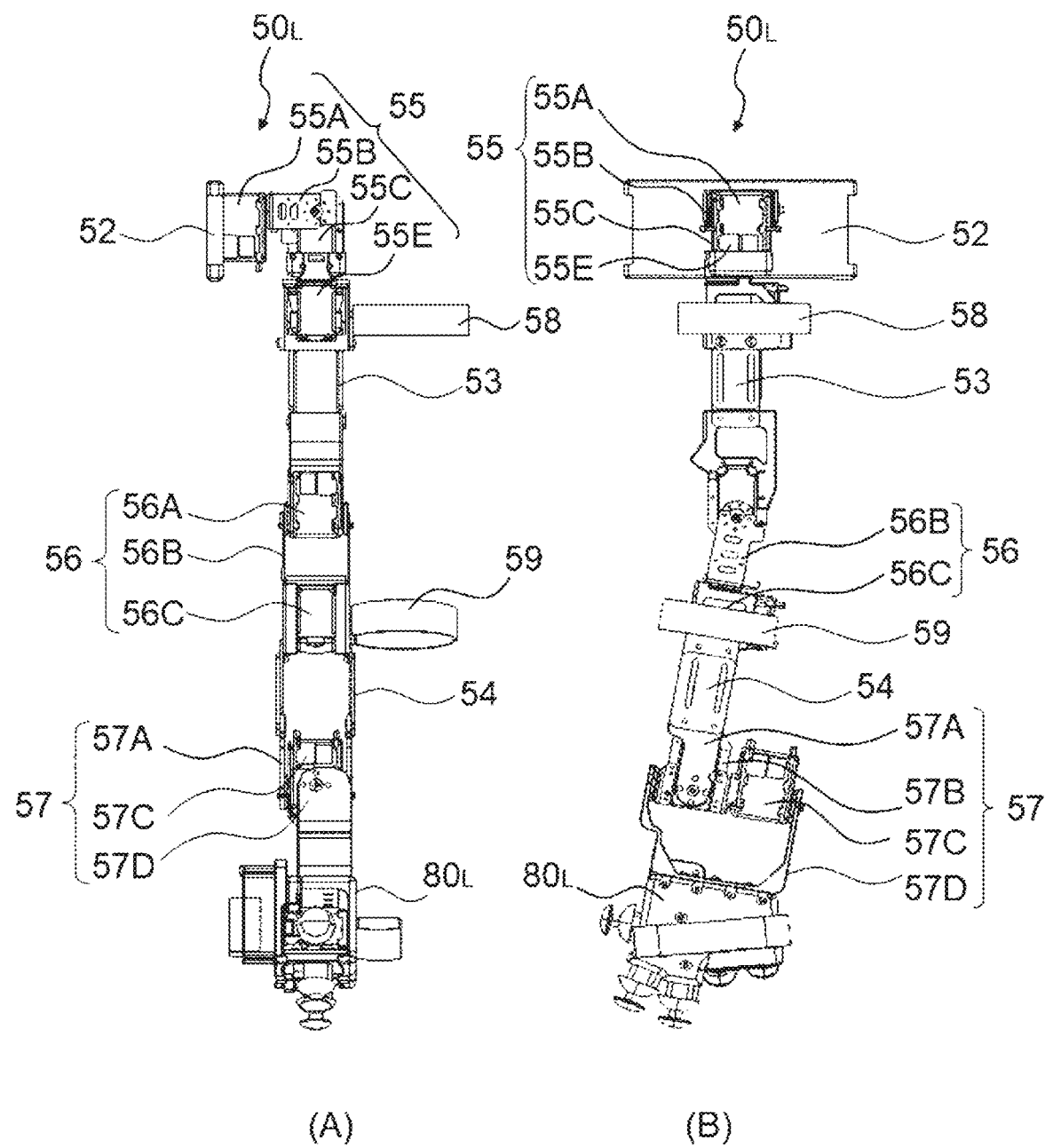
FIG. 47 is a front view and a right side view illustrating a left arm operation device and a left hand operation device included in the robot operation system of the embodiment.
Figure 48:
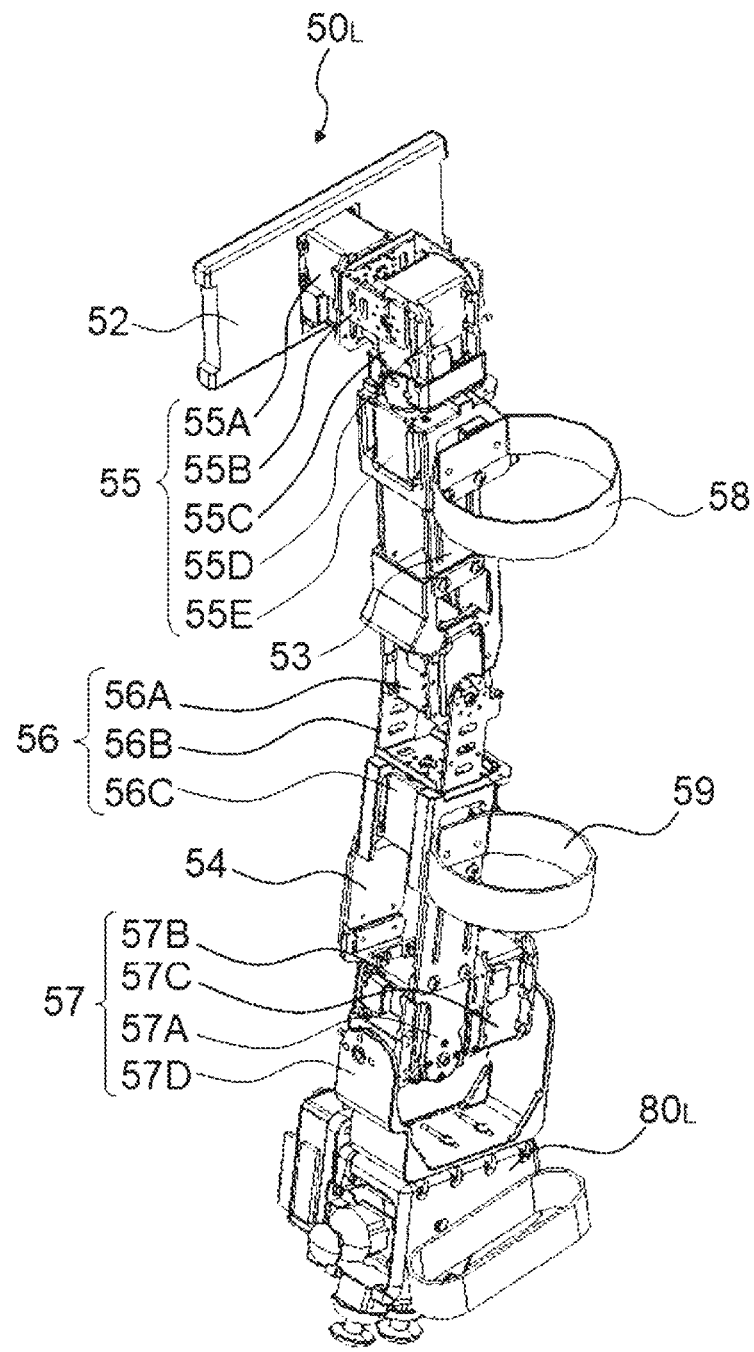
FIG. 48 is a perspective view illustrating the left arm operation device and the left hand operation device included in the robot operation system of the embodiment.
Figure 49:
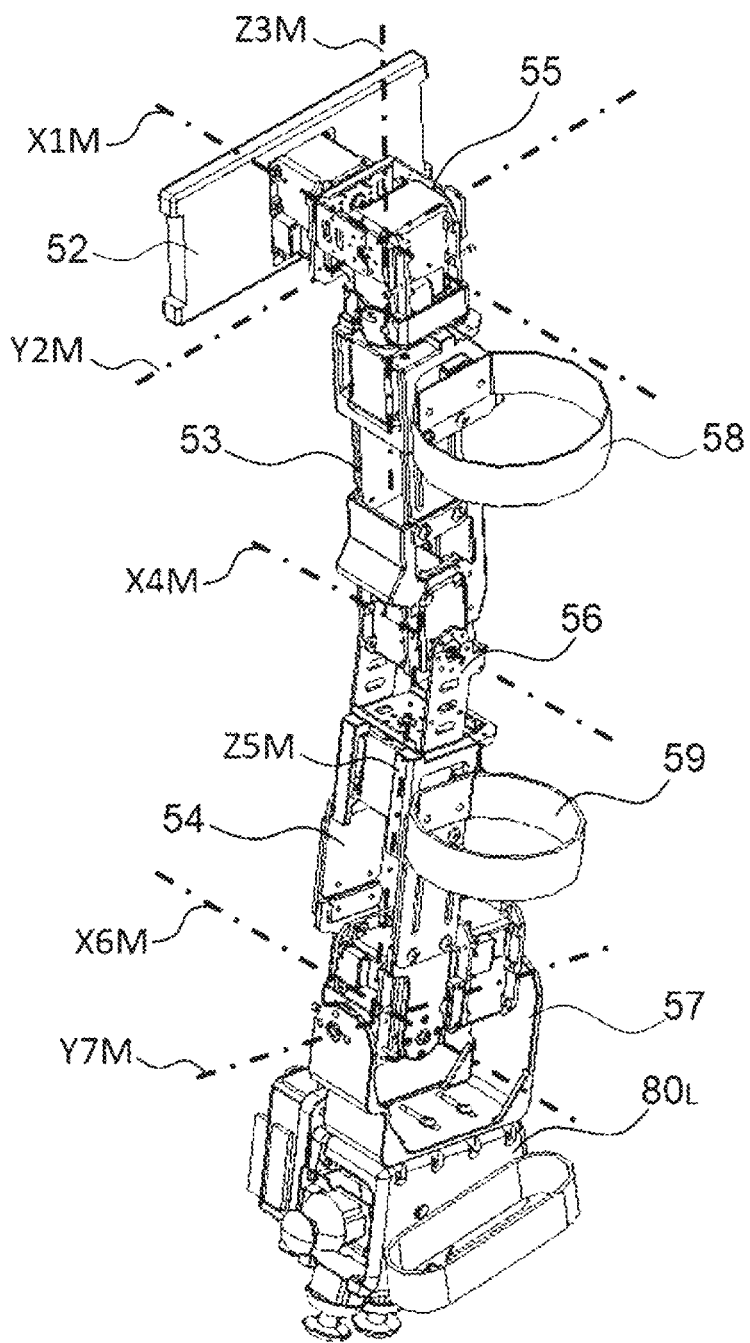
FIG. 49 is a perspective view illustrating a rotation axis included in the left arm operation device included in the robot operation system of the embodiment.
Figure 50:
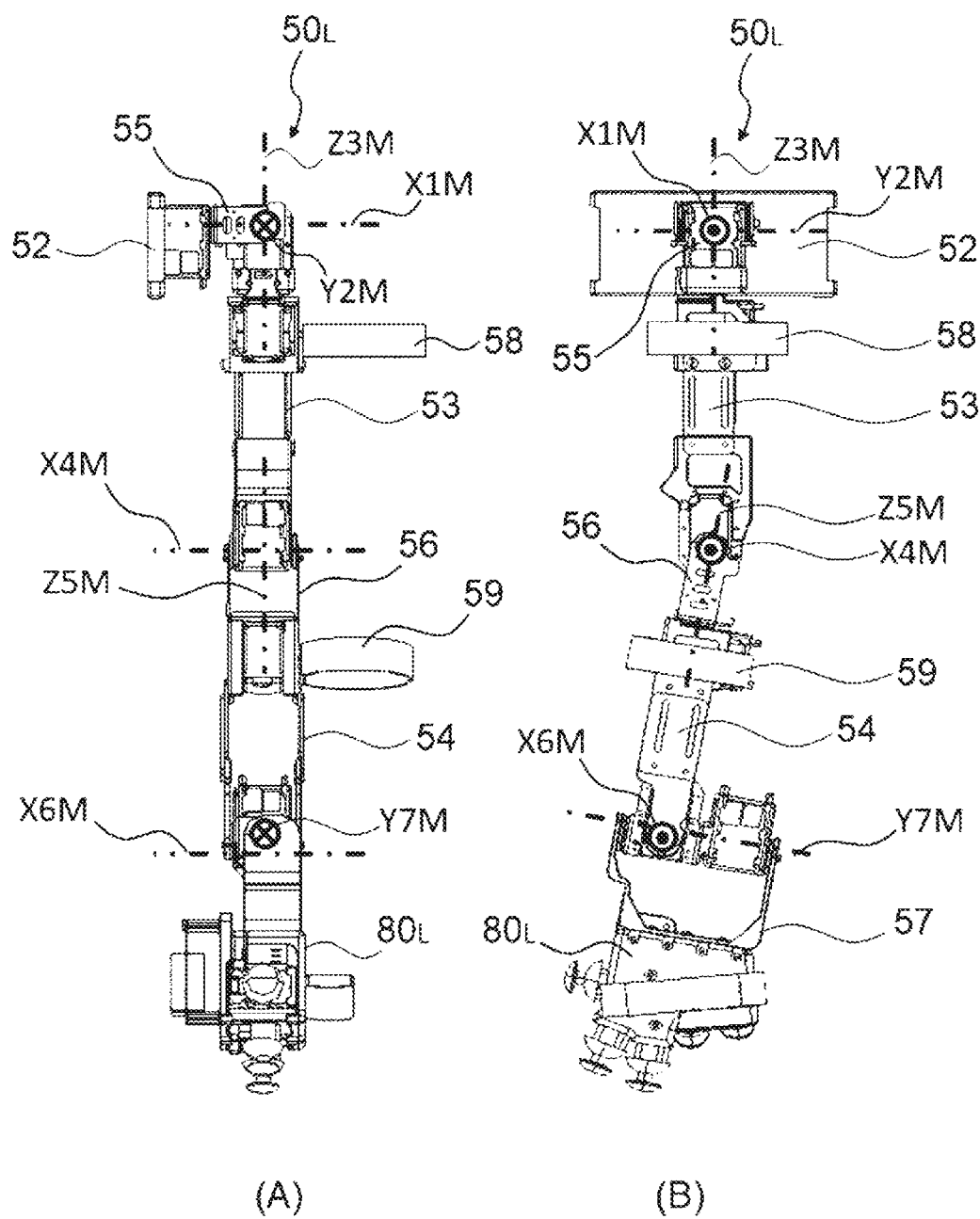
FIG. 50 is a front view and a right side view illustrating a rotation axis included in the left arm operation device included in the robot operation system of the embodiment.

Referring to FIGS. 46 to 50, the structure of arm operation devices $50_R$, $50_L$ is described. FIG. 46 is a left side view and a front view of right arm operation device $50_R$ and right hand operation device $80_R$. FIG. 46(A) is the left side view, and FIG. 46(B) is the front view. FIG. 47 is a front view and a right side view of left arm operation device $50_L$ and left hand operation device $80_L$. FIG. 47(A) is the left side view, and FIG. 47(B) is the front view. FIG. 48 is a perspective view of left arm operation device $50_L$ and left hand operation device $80_L$. FIG. 49 is a perspective view illustrating the rotation axis included in left arm operation device $50_L$. FIG. 50 is a front view and a right side view illustrating the rotation axis included in left arm operation device $50_L$. FIG. 50(A) is the left side view, and FIG. 50(B) is the front view. Arm operation device $50_R$ and arm operation device $50_L$ have similar structures. Arm operation device $50_R$ and arm operation device $50_L$ are in a mirror image relationship with each other like a right arm and a left arm of a human.

In the following description, a matter common to arm operation devices $50_R$, $50_L$ is referred to as an arm operation device 50. The same applies to hand operation device 80.

Arm operation device 50 includes a frame connection portion 52, an upper arm structure 53, a forearm structure 54, a shoulder joint measurement part 55, an elbow joint measurement part 56, a wrist joint measurement part 57, an upper arm mounting portion 58, and a forearm mounting portion 59. Frame connection portion 52 connects arm operation device 50 to support frame 51. Upper arm structure 53, forearm structure 54, and hand operation device 80 are connected in series to frame connection portion 52.

For example, arm operation device 50 has a length of about 50% of the length of the arm of operator 90. The length of arm operation device 50 is shorter than the length of arm 10 included in robot 1. The length of arm operation device 50 is set to the length suitable for operator 90 to move and input the operation instruction. When the length of arm operation device 50 is shorter than the arm of operator 90, operator 90 can operate arm operation device 50 easily. The length of arm operation device 50 is set to the length that is easy to operate even by operator 90 having a short arm. The length of arm operation device 50 is shorter than the length of the arm of operator 90, so that arm operation device 50 can be made compact.

Because the length of arm operation device 50 is shorter than the length of the arm of operator 90, it is difficult to set the angle of each measurement joint included in arm operation device 50 to the same angle as the angle taken by each joint included in arm 10. Arm operation device 50 generates the operation instruction to set the angle obtained by multiplying the angle measured by each measurement joint included in arm operation device 50 by a coefficient determined to be greater than or equal to 1 as the angle to be taken by each joint included in arm 10.

Frame connection portion 52 has a flat plate shape. Frame connection portion 52 is an arm connection structure to which upper arm structure 53 is connected. Upper arm structure 53 and forearm structure 54 have a quadrangular prism outer shape. Upper arm structure 53 includes members having a rectangular parallelepiped outer shape on the upper side and the lower side of upper arm structure 53 and two plate members facing each other and connecting the members being present the upper side and the lower side. Shoulder joint measurement part 55 is provided on the upper side of upper arm structure 53, and elbow joint measurement part 56 is provided on the lower side. Forearm structure 54 includes a member having a rectangular parallelepiped outer shape on the upper side of forearm structure 54 and two plate members facing each other and provided on the lower side. Elbow joint measurement part 56 is provided on the upper side of forearm structure 54, and wrist joint measurement part 57 is provided on the lower side.

Shoulder joint measurement part 55 connects upper arm structure 53 to frame connection portion 52 with three rotational degrees of freedom, and measures the rotation angle for each rotation axis. Elbow joint measurement part 56 connects forearm structure 54 to upper arm structure 53 with two rotational degrees of freedom, and measures the rotation angle for each rotation axis. Wrist joint measurement part 57 connects hand operation device 80 to forearm structure 54 with two rotational degrees of freedom, and measures the rotation angle for each rotation axis. Hand operation device 80 is a hand structure connected to forearm structure 54.

The rotation axes included in arm operation device 50 are the same seven axes as arm 10 included in robot 1. The rotation axes included in arm operation device 50 are as follows. The rotation axes included in arm operation device 50 are referred to as a measurement axis.

- X1M-axis: A rotation axis that allows upper arm structure 53 to be rotated with respect to frame connection portion 52. The X1M-axis is perpendicular to frame connection portion 52. The X1M-axis corresponds to the AZ4-axis included in arm 10. The X1M-axis is referred to as an arm connection structure rotation axis.
- Y2M-axis: A rotation axis that allows the angle formed by upper arm structure 53 and frame connection portion 52 to be changed. The Y2M-axis corresponds to the EL4-axis included in arm 10. The Y2M-axis is orthogonal to the X1M-axis. The Y2M-axis has the intersection with the X1M-axis.
- Z3M-axis: A rotation axis that passes through upper arm structure 53 and allows upper arm structure 53 to be rotated. The Z3M-axis corresponds to the AZ5-axis included in arm 10. The Z3M-axis is orthogonal to the Y2M-axis. The Z3M-axis passes through the intersection of the Y2M-axis and the X1M-axis. The Z3M-axis is referred to as an upper arm structure rotation axis.
- X4M-axis: A rotation axis that allows the angle formed by forearm structure 54 and upper arm structure 53 to be changed. The X4M-axis corresponds to the EL5-axis included in arm 10. The X4M-axis is orthogonal to the Z3M-axis. The X4M-axis has the intersection with the Z3M-axis. When arm 10 is in the reference state, the X4M-axis is parallel to the X1M-axis.
- Z5M-axis: A rotation axis that passes through forearm structure 54 and allows forearm structure 54 to be rotated. The Z5M-axis corresponds to AZ6-axis included in arm 10. The Z5M-axis is orthogonal to the X4M-axis. The Z5M-axis passes through the intersection of the X4M-axis and the Z3M-axis. The Z5M-axis is referred to as a forearm structure rotation axis.
- X6M-axis: A rotation axis that allows the angle formed by hand operation device 80 and forearm structure 54 to be changed. The X6M-axis corresponds to the EL6-axis included in arm 10. The X6M-axis is orthogonal to the Z5M-axis. The X6M-axis has the intersection with the Z5M-axis. When arm 10 is in the reference state, the X6M-axis is parallel to the X4M-axis.
- Y7M-axis: A rotation axis that allows the angle formed by hand operation device 80 and forearm structure 54 to be changed. The Y7M-axis corresponds to the XEL2-axis included in arm 10. The Y7M-axis is orthogonal to the Z5M-axis and the X6M-axis. The Y7M-axis passes through the intersection of the Z5M-axis and the X6M-axis.

Each of the seven measurement axes included in arm operation device 50 corresponds to each of the seven rotation axes included in arm 10. The X1M-axis corresponds to the AZ4-axis. The Y2M-axis corresponds to the EL4-axis. The Z3M-axis corresponds to the AZ5-axis. The X4M-axis corresponds to the EL5-axis. The Z5M-axis corresponds to the AZ6-axis. The X6M-axis corresponds to the EL6-axis. The Y7M-axis corresponds to the XEL2-axis. Therefore, arm operation device 50 can input the operation instruction to operate arm 10 easily. Arm operation device 50 can also be applied to the case of operating arm 10 having the configuration of different rotation axes. In this case, the angle is converted into the angle measured by each measurement axis included in arm operation device 50 and the angle to be moved by each rotation axis included in the arm.

An angle measured by rotation around each measurement axis is defined as follows.

An arm base rotation measurement angle $\theta_{X1M}$: a rotation angle of upper arm structure 53 around X1M-axis. When arm base rotation measurement angle $\theta_{X1M}$ is zero degrees, arm base rotation angle $\theta_{AZ4}$ is zero degrees. When arm base rotation measurement angle $\theta_{X1M}$ is positive, arm base rotation angle $\theta_{AZ4}$ is positive. Arm base rotation measurement angle $\theta_{X1M}$ is also referred to as a shoulder rotation measurement angle.

An upper arm inclination measurement angle $\delta_{Y2M}$: an angle formed by upper arm structure 53 and the X1M-axis. $\delta_{Y2M}$ is changed as upper arm structure 53 is rotated around the Y2M-axis. When upper arm inclination measurement angle $\delta_{Y2M}$ is zero degrees, upper arm inclination angle $\delta_{EL4}$ is zero degree. When upper arm inclination measurement angle $\delta_{Y2M}$ is positive, upper arm inclination angle $\delta_{EL4}$ is positive.

An upper arm rotation measurement angle $\theta_{Z3M}$: a rotation angle of upper arm structure 53 around the Z3M-axis. When upper arm rotation measurement angle $\theta_{Z3M}$ is zero degrees, upper arm rotation angle $\theta_{AZ5}$ is zero degree. When upper arm rotation measurement angle $\theta_{Z3M}$ is positive, upper arm rotation angle $\theta_{AZ5}$ is positive.

A forearm inclination measurement angle $\delta_{X4M}$: the angle formed by forearm structure 54 with respect to upper arm structure 53 (Z3M-axis). $\delta_{X4M}$ is changed as forearm structure 54 is rotated around the X4M-axis. When forearm inclination measurement angle $\delta_{X4M}$ is zero degrees, forearm inclination angle $\delta_{EL5}$ is zero degree. When forearm inclination measurement angle $\delta_{X4M}$ is positive, forearm inclination angle $\delta_{EL5}$ is positive.

A forearm rotation measurement angle $\theta_{Z5M}$: the rotation angle of forearm structure 54 around the Z5M-axis. When forearm rotation measurement angle $\theta_{Z5M}$ is zero degrees, forearm rotation angle $\theta_{AZ6}$ is zero degree. When forearm rotation measurement angle $\theta_{Z5M}$ is positive, forearm rotation angle $\theta_{AZ6}$ is positive.

A hand first inclination measurement angle $\delta_{X6M}$: the angle formed by hand operation device 80 with respect to forearm structure 54 (Z5M-axis) on a first measurement plane including the Z5M-axis and the Y7M-axis. $\delta_{X6M}$ is changed as hand operation device 80 is rotated around the X6M-axis. When hand first inclination measurement angle $\delta_{X6M}$ is zero degree, hand first inclination angle $\delta_{EL6}$ is zero degree. When hand first inclination measurement angle $\delta_{X6M}$ is positive, hand first inclination angle $\delta_{EL6}$ is positive.

A hand second inclination measurement angle $\delta_{Y7M}$: the angle formed by hand operation device 80 with respect to forearm structure 54 (Z5M-axis) on a second measurement plane including the Z5M-axis and the X6M-axis. $\delta_{Y7M}$ is changed as hand operation device 80 is rotated around the Y7M-axis. When hand second inclination measurement angle $\delta_{Y7M}$ is zero degree, hand second inclination angle $\delta_{XEL2}$ is zero degree. When hand second inclination measurement angle $\delta_{Y7M}$ is positive, hand second inclination angle $\delta_{XEL2}$ is positive.

The first measurement plane and the second measurement plane are orthogonal to each other. Although the calculation becomes complicated, the first measurement plane and the second measurement plane may cross at an angle being not orthogonal.

The first measurement plane and the second measurement plane may cross each other such that the Z5M-axis becomes the line intersection of the first measurement plane and the second measurement plane.

Shoulder joint measurement part 55 measures arm base rotation measurement angle $\theta_{X1M}$, upper arm inclination measurement angle $\delta_{Y2M}$, and upper arm rotation measurement angle $\theta_{Z3M}$. An angle $\alpha_1 * \theta_{X1M}$ obtained by multiplying measured $\theta_{X1M}$ by a coefficient $\alpha_1$ is an angle $\theta_{AZ4}$ to be taken by the AZ4-axis in arm 10. An angle $\alpha_2 * \delta_{Y2M}$ obtained by multiplying $\delta_{Y2M}$ by a coefficient $\alpha_2$ is an angle $\delta_{EL4}$ to be taken by the EL4-axis in arm 10. An angle $\alpha_3 * \theta_{Z3M}$ obtained by multiplying $\theta_{Z3M}$ by a coefficient as is an angle $\theta_{AZ5}$ to be taken by the AZ5-axis in arm 10. In arm operation device 50, arm base rotation measurement angle $\theta_{X1M}$, upper arm inclination measurement angle $\delta_{Y2M}$, and upper arm rotation measurement angle $\theta_{Z3M}$ are a shoulder joint measurement angle that is the angle at which upper arm structure 53 is connected to frame connection portion 52 (arm connection structure).

Elbow joint measurement part 56 measures forearm inclination measurement angle $\delta_{X4M}$ and forearm rotation measurement angle $\theta_{Z5M}$. An angle $\alpha_4 * \delta_{X4M}$ obtained by multiplying measured $\delta_{X4M}$ by a coefficient $\alpha_4$ is an angle $\delta_{EL5}$ to be taken by the EL5-axis in arm 10. An angle $\alpha_5 * \theta_{Z5M}$ obtained by multiplying $\theta_{Z5M}$ by a coefficient $\alpha_5$ is an angle $\theta_{AZ6}$ to be taken by the AZ6-axis in arm 10. In arm operation device 50, forearm inclination measurement angle $\delta_{X4M}$ and forearm rotation measurement angle $\theta_{Z5M}$ are an elbow joint measurement angle that is the angle at which forearm structure 54 is connected to upper arm structure 53.

Wrist joint measurement part 57 measures hand first inclination measurement angle $\delta_{X6M}$ and hand second inclination measurement angle $\delta_{Y7M}$. An angle $\alpha_6 * \delta_{X6M}$ obtained by multiplying measured $\delta_{X6M}$ by a coefficient $\alpha_6$ is an angle $\delta_{EL6}$ to be taken by the EL6-axis in arm 10. An angle $\alpha_7 * 6Y_{7M}$ obtained by multiplying $\delta_{Y7M}$ by a coefficient $\alpha_7$ is an angle $\delta_{XEL2}$ to be taken by the XEL2-axis in arm 10. In arm operation device 50, hand first inclination measurement angle $\delta_{X6M}$ and hand second inclination measurement angle $\delta_{Y7M}$ are a wrist joint measurement angle that is the angle at which hand operation device 80 (hand structure) is connected to forearm structure 54.

Shoulder joint measurement part 55 includes an X1M-angle measurement part 55A, a shoulder-joint first yoke 55B, a shoulder-joint second yoke 55C, a Y2M-angle measurement part 55D, and a Z3M-angle measurement part 55E. X1M-angle measurement part 55A is connected to frame connection portion 52 vertically. X1M-angle measurement part 55A includes a shaft bearing that holds the shaft member rotatably, a lock mechanism that prevents the shaft member from rotating, a rotation range restriction mechanism that restricts the range in which the shaft member can be rotated, and an encoder that measures the rotation angle of the shaft member. X1M-angle measurement part 55A holds the shaft member of shoulder-joint first yoke 55B rotatably. X1M-axis passes through the center of the shaft member of shoulder-joint first yoke 55B, and shoulder-joint first yoke 55B is rotated around the X1M-axis. X1M-angle measurement part 55A measures the angle at which shoulder-joint first yoke 55B is rotated around the X1M-axis with respect to X1M-angle measurement part 55A. X1M-angle measurement part 55A can lock the X1M-axis and the rotation of shoulder-joint first yoke 55B. Locking rotation means preventing rotation.

Shoulder-joint second yoke 55C is sandwiched between shoulder-joint first yokes 55B. Shoulder-joint first yoke 55B and shoulder-joint second yoke 55C are connected to each other such that the rotation angle around the Y2M-axis can be changed. The shaft member of the Y2M-axis is fixed to shoulder-joint second yoke 55C. Shoulder-joint second yoke 55C sandwiches Y2M-angle measurement part 55D. When shoulder-joint second yoke 55C is rotated around the Y2M-axis, Y2M-angle measurement part 55D also is rotated in the same manner. Y2M-angle measurement part 55D includes a shaft bearing, a lock mechanism, a rotation range restriction mechanism, and an encoder. Y2M-angle measurement part 55D measures the angle at which shoulder-joint second yoke 55C and Y2M-angle measurement part 55D rotate around the Y2M-axis with respect to shoulder-joint first yoke 55B. Y2M-angle measurement part 55D can lock the rotation of shoulder-joint second yoke 55C, the Y2M-axis, and Y2M-angle measurement part 55D.

Shoulder-joint second yoke 55C is rotatable around the Z3M-axis. The shaft member of the Z3M-axis is fixed to shoulder-joint second yoke 55C. The shaft member of the Z3M-axis extends downward. The shaft member of the Z3M-axis passes through the opening provided in the upper bottom surface of upper arm structure 53. Z3M-angle measurement part 55E is provided inside upper arm structure 53. Z3M-angle measurement part 55E includes a shaft bearing, a lock mechanism, a rotation range restriction mechanism, and an encoder. Z3M-angle measurement part 55E holds the Z3M-axis rotatably. Z3M-angle measurement part 55E measures the angle at which shoulder-joint second yoke 55C is rotated around the Z3M-axis with respect to Z3M-angle measurement part 55E. Z3M-angle measurement part 55E can lock the rotation of the Z3M-axis and shoulder-joint second yoke 55C.

Shoulder joint measurement part 55 is a shoulder measurement joint, a shoulder joint angle measurement part, and a shoulder lock portion. The shoulder measurement joint connects upper arm structure 53 to frame connection portion 52 so as to be rotatable around the X1M-axis perpendicular to frame connection portion 52, such that the upper arm inclination measurement angle is changeable, and so as to be rotatable around the Z3M-axis passing through upper arm structure 53. The shoulder joint angle measurement part measures arm base rotation measurement angle $\theta_{X1M}$, upper arm inclination measurement angle $\delta_{Y2M}$, and upper arm rotation measurement angle $\theta_{X3M}$. The shoulder lock portion locks the shoulder measurement joint such that the shoulder measurement joint does not move.

Elbow joint measurement part 56 includes an X4M-angle measurement part 56A, an elbow joint yoke 56B, and a Z5M-angle measurement part 56C. X4M-angle measurement part 56A is provided between two plate members connected to the lower side of the rectangular parallelepiped outer shape part on the lower side of upper arm structure 53. Elbow joint yoke 56B holds X4M-angle measurement part 56A and the two plate members so as to be rotatable around the X4M-axis. The shaft member of the X4M-axis is fixed to elbow joint yoke 56B. X4M-angle measurement part 56A includes a shaft bearing, a lock mechanism, a rotation range restriction mechanism, and an encoder. X4M-angle measurement part 56A measures the angle at which elbow joint yoke 56B is rotated around the X4M-axis with respect to X4M-angle measurement part 56A. X4M-angle measurement part 56A can lock the rotation of the X4M-axis and elbow joint yoke 56B.

Elbow joint yoke 56B is rotatable around the Z5M-axis. The shaft member of the Z5M-axis is fixed to elbow joint yoke 56B. Z5M-axis passes through the opening provided in the upper bottom surface of forearm structure 54, and is held by Z5M-angle measurement part 56C rotatably. Z5M-angle measurement part 56C is provided inside a part located on the upper side of forearm structure 54 and having an outer shape of a rectangular parallelepiped. Z5M-angle measurement part 56C includes a shaft bearing, a lock mechanism, a rotation range restriction mechanism, and an encoder. Z5M-angle measurement part 56C measures the angle at which elbow joint yoke 56B is rotated around the Z5M-axis with respect to Z5M-angle measurement part 56C. Z5M-angle measurement part 56C can lock the rotation of the Z5M-axis and elbow joint yoke 56B.

Elbow joint measurement part 56 is an elbow measurement joint, an elbow joint angle measurement part, and an elbow lock portion. Elbow measurement joint connects forearm structure 54 to upper arm structure 53 such that forearm inclination measurement angle $\delta_{X4M}$ can be changed and such that forearm can be rotated around Z5M-axis. The elbow joint angle measurement part measures forearm inclination measurement angle $\delta_{X4M}$ and forearm rotation measurement angle $\theta_{Z5M}$. The elbow lock portion locks the elbow measurement joint such that the elbow measurement joint does not move.

Wrist joint measurement part 57 includes a wrist-joint first yoke 57A, an X6M-angle measurement part 57B, a Y7M-angle measurement part 57C, and a wrist-joint second yoke 57D. Wrist-joint first yoke 57A is connected to the lower side of the two plate members on the lower end of forearm structure 54. Wrist-joint first yoke 57A holds rectangular parallelepiped X6M-angle measurement part 57B so as to be rotatable around the X6M-axis. The shaft member of the X6M-axis is fixed to the wrist-joint first yoke 57A. X6M-angle measurement part 57B includes a shaft bearing, a lock mechanism, a rotation range restriction mechanism, and an encoder. X6M-angle measurement part 57B measures the angle at which wrist-joint first yoke 57A is rotated around the X6M-axis with respect to X6M-angle measurement part 57B. X6M-angle measurement part 57B can lock the rotation of the X6M-axis and wrist-joint first yoke 57A.

Y7M-angle measurement part 57C has a rectangular parallelepiped shape. Y7M-angle measurement part 57C is connected to X6M-angle measurement part 57B and provided on the little finger side of the hand of operator 90 in the X6M-axis direction. Wrist-joint second yoke 57D sandwiches X6M-angle measurement part 57B and Y7M-angle measurement part 57C in the direction in which the Y7M-axis extends. The shaft member of the Y7M-axis is fixed to wrist-joint second yoke 57D. Hand operation device 80 is connected to the lower surface of wrist-joint second yoke 57D. Wrist-joint second yoke 57D holds X6M-angle measurement part 57B and Y7M-angle measurement part 57C so as to be rotatable around the Y7M-axis. The shaft member of the Y7M-axis exists in Y7M-angle measurement part 57C. The shaft member of the Y7M-axis does not exist in X6M-angle measurement part 57B. X6M-angle measurement part 57B holds the protrusion provided in wrist-joint second yoke 57D rotatably. The protrusion is provided at the position where the Y7M-axis is to be present on the side surface of wrist-joint second yoke 57D. Y7M-angle measurement part 57C includes a shaft bearing, a lock mechanism, a rotation range restriction mechanism, and an encoder. Y7M-angle measurement part 57C measures the angle at which wrist-joint second yoke 57D is rotated around the Y7M-axis with respect to Y7M-angle measurement part 57C. Y7M-angle measurement part 57C can lock the rotation of the Y7M-axis and wrist-joint second yoke 57D.

Wrist joint measurement part 57 is a wrist measurement joint, a wrist joint angle measurement part, and a wrist lock portion. The wrist measurement joint connects hand operation device 80 to forearm structure 54 such that hand first inclination measurement angle $\delta_{X6M}$ and the hand second inclination measurement angle can be changed. The wrist joint angle measurement part measures hand first inclination measurement angle $\delta_{X6M}$ and hand second inclination measurement angle $\delta_{Y7M}$. The wrist lock portion locks the wrist measurement joint such that the wrist measurement joint does not move.

Upper arm mounting portion 58 mounts upper arm structure 53 on the upper arm of operator 90. Forearm mounting portion 59 mounts forearm structure 54 on the forearm of operator 90. Although upper arm mounting portion 58 is expressed in a small ring shape for simplification of the drawing, shape of upper arm mounting portion 58 is actually different. Upper arm mounting portion 58 couples gently upper arm structure 53 and the upper arm of operator 90 by a band that can be connected and separated. The distance between upper arm structure 53 and the upper arm of operator 90 is set to be twice or more of the diameter of the ring illustrated in the drawing. The same applies to forearm mounting portion 59. Forearm mounting portion 59 couples gently forearm structure 54 and the forearm of operator 90 with the band that can be connected and separated. The distance between forearm structure 54 and the forearm of operator 90 is set to twice or more of the diameter of the ring illustrated in the drawing. Furthermore, a hand mounting portion 87 provided in hand operation device 80 couples hand operation device 80 provided at the distal end of arm operation device 50 and the hand of operator 90.

When operator 90 moves the arm, the rotation angle around each measurement axis included in arm operation device 50 is measured. Control calculation device 60 changes the angle at each of shoulder joint 27, elbow joint 28, and wrist joint 29 at the angle obtained by multiplying the measured rotation angle by an appropriate magnification (greater than 1). The magnification is determined for each rotation axis. Coefficients, each of which is multiplied with the rotation angle measured on each rotation axis, are coefficients $\alpha_1$, $\alpha_2$, as, $\alpha_4$, $\alpha_5$, $\alpha_6$, $\alpha_7$.

The control calculation device may control arm base rotation angle $\theta_{AZ4}$, upper arm inclination angle $\delta_{EL4}$, upper arm rotation angle $\theta_{AZ5}$, forearm inclination angle $\delta_{EL5}$, forearm rotation angle $\theta_{AZ6}$, hand first inclination angle $\delta_{EL6}$, and hand second inclination angle $\delta_{XEL2}$ based on arm base rotation measurement angle $\theta_{X1M}$, upper arm inclination measurement angle $\delta_{Y2M}$, upper arm rotation measurement angle $\theta_{Z3M}$, forearm inclination measurement angle $\delta_{X4M}$, forearm rotation measurement angle $\theta_{Z5M}$, hand first inclination measurement angle $\delta_{X6M}$, and hand second inclination measurement angle $\delta_{Y7M}$. For example, calculation may be performed as follows. A non-linear calculation formula may be used.

$$\theta_{AZ4} = \alpha_{11} * \theta_{X1M} + \alpha_{12} * \delta_{Y2M}$$
$$+\alpha_{13} * \theta_{Z3M} + \alpha_{14} * \delta_{X4M}$$
$$+\alpha_{15} * \theta_{Z5M} + \alpha_{16} * \delta_{X6M}$$
$$+\alpha_{17} * \delta_{Y7M}$$

$$\delta_{EL4} = \alpha_{21} * \theta_{X1M} + \alpha_{22} * \delta_{Y2M}$$
$$+\alpha_{23} * \theta_{Z3M} + \alpha_{24} * \delta_{X4M}$$
$$+\alpha_{25} * \theta_{Z5M} + \alpha_{26} * \delta_{X6M}$$
$$+\alpha_{27} * \delta_{Y7M}$$

$$\theta_{AZ5} = \alpha_{31} * \theta_{X1M} + \alpha_{32} * \delta_{Y2M}$$
$$+\alpha_{33} * \theta_{Z3M} + \alpha_{34} * \delta_{X4M}$$
$$+\alpha_{35} * \theta_{Z5M} + \alpha_{36} * \delta_{X6M}$$
$$+\alpha_{37} * \delta_{Y7M}$$

$$\delta_{EL5} = \alpha_{41} * \theta_{X1M} + \alpha_{42} * \delta_{Y2M}$$
$$+\alpha_{43} * \theta_{Z3M} + \alpha_{44} * \delta_{X4M}$$
$$+\alpha_{45} * \theta_{Z5M} + \alpha_{46} * \delta_{X6M}$$
$$+\alpha_{47} * \delta_{Y7M}$$

$$\theta_{AZ6} = \alpha_{51} * \theta_{X1M} + \alpha_{52} * \delta_{Y2M}$$
$$+\alpha_{53} * \theta_{Z3M} + \alpha_{54} * \delta_{X4M}$$
$$+\alpha_{55} * \theta_{Z5M} + \alpha_{56} * \delta_{X6M}$$
$$+\alpha_{57} * \delta_{Y7M}$$

$$\delta_{EL6} = \alpha_{61} * \theta_{X1M} + \alpha_{62} * \delta_{Y2M}$$
$$+\alpha_{63} * \theta_{Z3M} + \alpha_{64} * \delta_{X4M}$$
$$+\alpha_{65} * \theta_{Z5M} + \alpha_{66} * \delta_{X6M}$$
$$+\alpha_{67} * \delta_{Y7M}$$

$$\delta_{XEL2} = \alpha_{71} * \theta_{X1M} + \alpha_{72} * \delta_{Y2M}$$
$$+\alpha_{73} * \theta_{Z3M} + \alpha_{74} * \delta_{X4M}$$
$$+\alpha_{75} * \theta_{Z5M} + \alpha_{76} * \delta_{X6M}$$
$$+\alpha_{77} * \delta_{Y7M}$$

Coefficient such as $\alpha_{11}$ is a coefficient multiplied by the rotation angle measured on each rotation axis.

Arm operation device 50 uses a mechanical angle input device that is operated by operator 90 with the arm and the hand to change the angle of each joint. Consequently, arm 10 (robot arm) included in robot 1 can be operated stably without depending on a behavioral characteristic of operator 90. In the arm operation device in which an acceleration sensor or the like is used, the time that can be driven may be restricted by a capacity of a battery or the like. In addition, in the acceleration sensor, a minute angular difference may be generated due to generation of drift or the like. In arm operation device 50, operator 90 inputs the angle of each joint mechanically and controls each joint based on the angle data, so that arm 10 (robot arm) can be operated stably even in the case where arm 10 is operated for a long time.

Arm operation device 50 has a function of maintaining (locking) the angle of each measurement joint. In the case where maintaining the posture of arm operation device 50 corresponding to the posture to be taken by arm 10 becomes a burden on the muscle of operator 90, operator 90 turns on the angle maintaining mechanism (lock mechanism) of each measurement joint included in arm operation device 50. In doing so, operator 90 can rest the arms and the like. Because arm operation device 50 has the total of seven degrees of freedom of joints similar to that of a human, operator 90 can operate arm operation device 50 and operate arm 10 with a feeling similar to that of moving own arm of operator 90. Arm operation device 50 can reduce the burden on operator 90 that operates arm 10 (robot arm) as compared with the conventional one.

A switch (lock switch) that determines whether to activate the lock mechanism included in arm operation device 50 is provided in hand operation device 80. The lock switch included in hand operation device 80$_R$ locks and unlocks arm operation device 50$_R$. The lock switch included in hand operation device 80$_L$ locks and unlocks arm operation device 50$_L$. Both of arm operation devices 50$_R$, 50$_L$ may be locked and unlocked by operating one of the lock switches included in hand operation devices 80$_R$, 80$_L$. Hand operation device 80 may be lockable. Locking hand operation device 80 means that the operation instruction is not generated even when a joystick is moved. The lock switch that locks hand operation device 80 may be provided in hand operation device 80, or provided separately from hand operation device 80. When the lock switch that locks hand operation device 80 is provided on hand operation device 80, only the lock switch can be operated even when hand operation device 80 is locked.

The lock switch is a lock state change switch that switches uniformly between a locked state in which the shoulder lock portion, the elbow lock portion, and the wrist lock portion are locked and an unlocked state in which the shoulder lock portion, the elbow lock portion, and the wrist lock portion are not locked. In the locked state, the angles of the measurement joints of shoulder joint measurement part 55, elbow joint measurement part 56, and wrist joint measurement part 57 cannot be changed. In the unlocked state, the angles of the measurement joints of shoulder joint measurement part 55, elbow joint measurement part 56, and wrist joint measurement part 57 can be changed. The lock switch may be provided separately from hand operation device 80. The lock switch may be operated by operator 90 with a foot.

When the wrist joint connects the hand to the forearm with three rotational degrees of freedom, the wrist joint measurement part of the arm operation device also has three rotational degrees of freedom. The wrist joint measurement part with three rotational degrees of freedom can measure the angle of the rotation of the hand around a wrist rotation measurement axis passing through the hand, and also has a mechanism that locks the rotation of the hand around the wrist rotation measurement axis.

Figure 51:
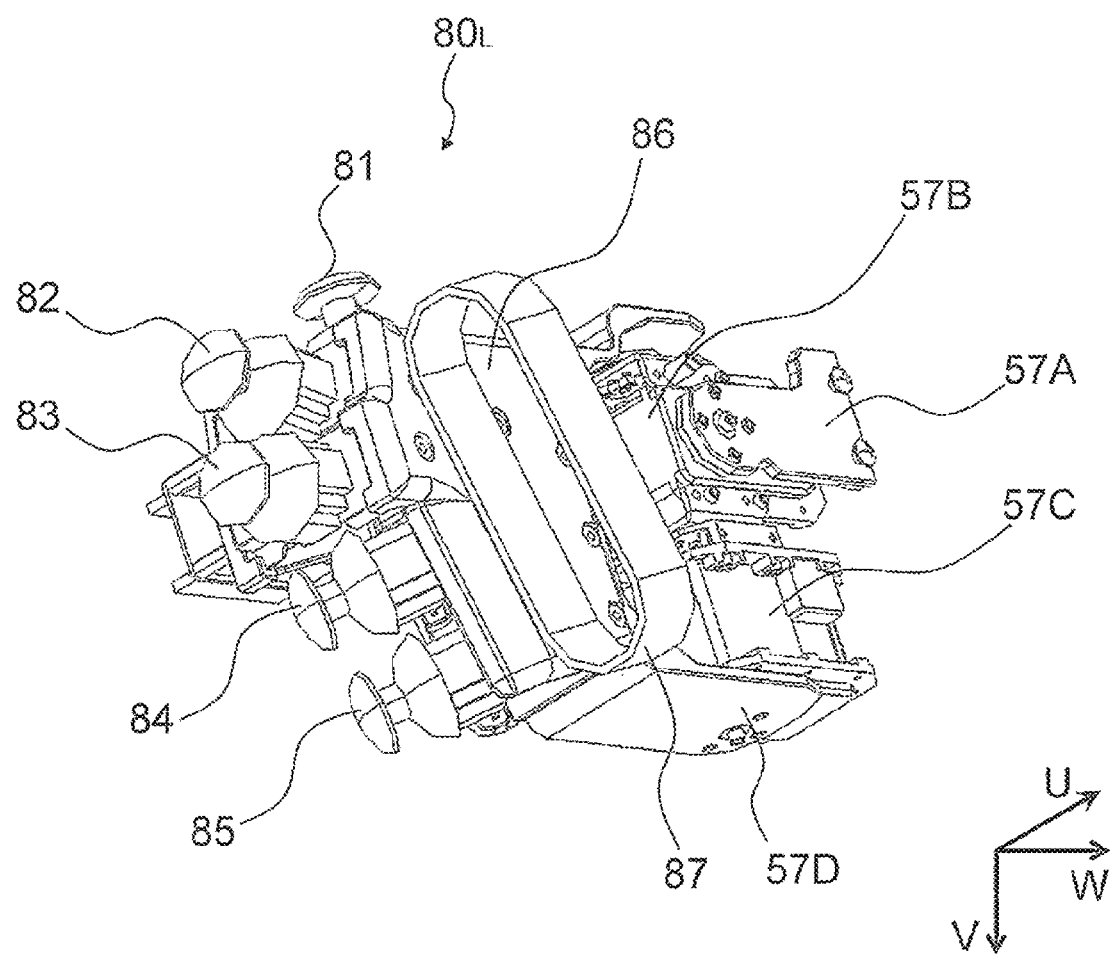
FIG. 51 is a perspective view illustrating the left hand operation device included in the robot operation system of the embodiment.
Figure 52:
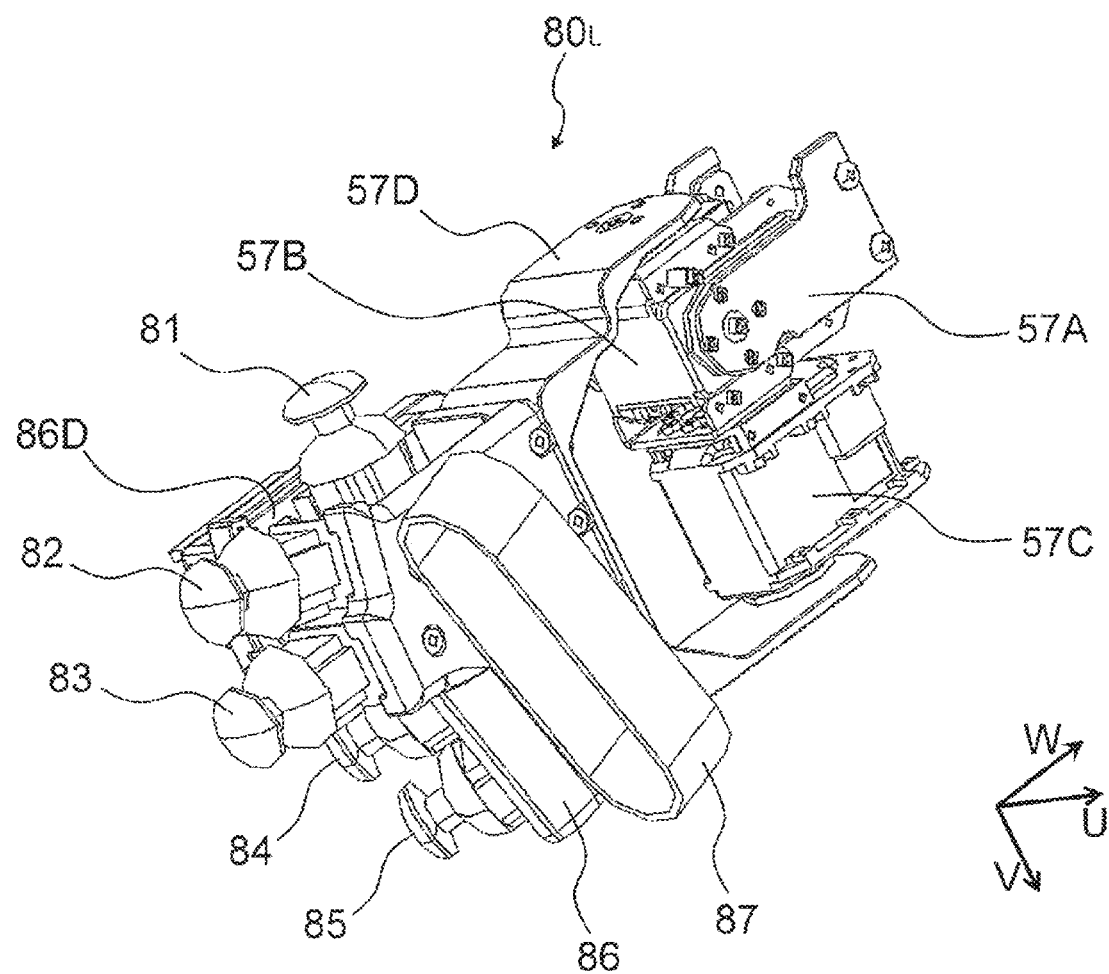
FIG. 52 is another perspective view illustrating the left hand operation device included in the robot operation system of the embodiment.
Figure 53:
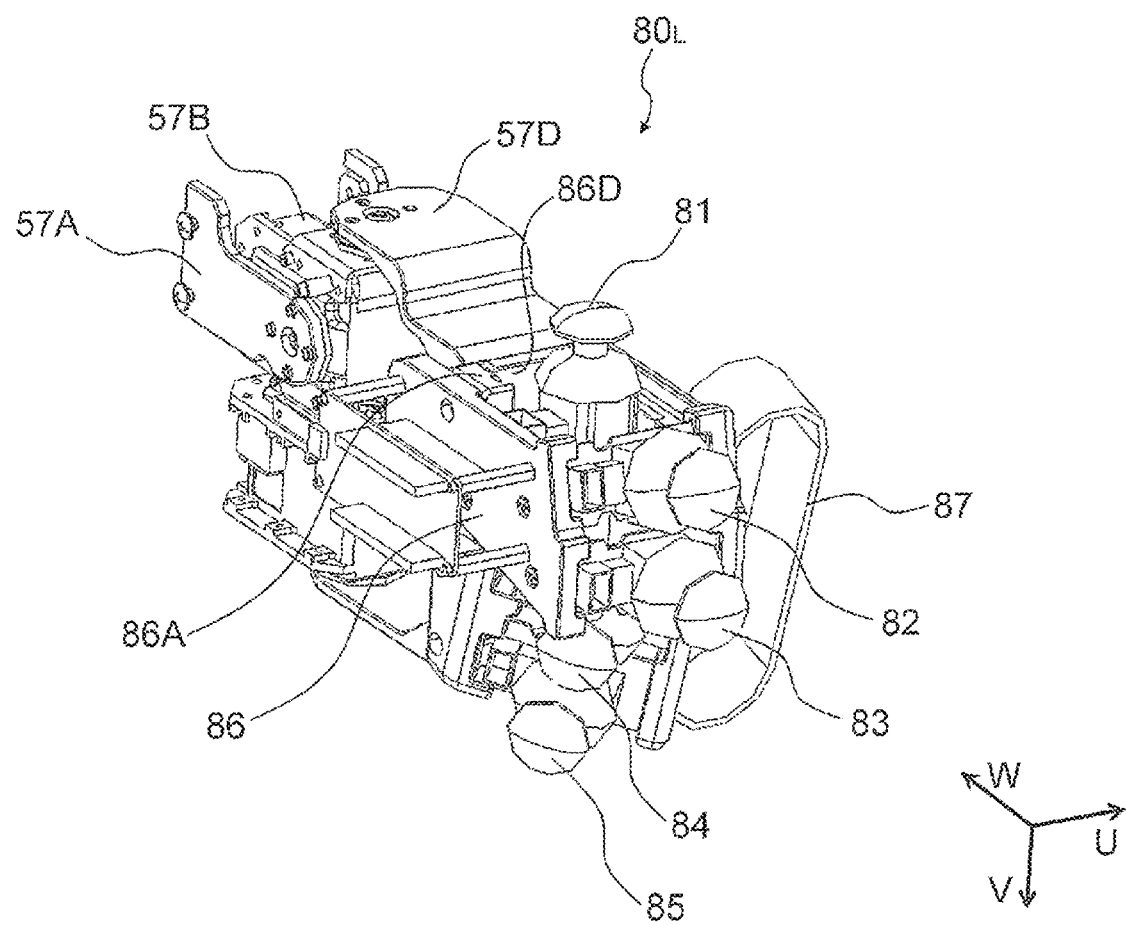
FIG. 53 is still another perspective view illustrating the left hand operation device included in the robot operation system of the embodiment.

With reference to FIGS. 51 to 57, the structure of hand operation device 80 is described. Hand operation device 80$_R$ and hand operation device 80$_L$ have the similar structure. Hand operation device 80$_R$ and hand operation device 80$_L$ are in a mirror image relationship with each other like a right hand and a left hand of a human. FIG. 51 is a perspective view illustrating hand operation device $80_L$ that is operated by operator 90 with the left hand to move left hand $26_L$. FIGS. 52 and 53 are perspective views illustrating hand operation device $80_L$ as viewed from another direction. FIGS. 54 to 57 are a front view, a right side view, a left side view, and a bottom view of hand operation device $80_L$. The lower part of wrist joint measurement part 57 is also illustrated in the drawing.

FIGS. 51 to 57 also illustrate a UVW coordinate system that is an orthogonal coordinate system defined by using hand operation device 80 as a reference. A U-axis is an axis in the thickness direction of hand operation device 80. The side on which the hand of operator 90 is present is defined as the positive direction of the U-axis. A V-axis is an axis in the front-rear direction of hand operation device 80. The positive direction of the V-axis is the direction from the front to the rear. A W-axis is an axis in the height direction of hand operation device 80. The positive direction of the W-axis is the direction from the bottom to the top.

Hand operation device 80 includes a first joystick 81, a second joystick 82, a third joystick 83, a fourth joystick 84, a fifth joystick 85, a main body portion 86, and a hand mounting portion 87. First joystick 81, second joystick 82, third joystick 83, fourth joystick 84, and fifth joystick 85 correspond to first finger 91, second finger 92, third finger 93, fourth finger 94, and fifth finger 95 included in hand 26, respectively. Main body portion 86 is a portion held by operator 90. Hand mounting portion 87 is provided on the principal surface on the outside (a back side of the hand of operator 90) of main body portion 86. When operator 90 puts the hand into hand mounting portion 87, main body portion 86 does not separate from the hand of operator 90 even if operator 90 does not hold main body portion 86.

Main body portion 86 has a substantially rectangular shape when viewed from the front, and has a substantially pentagonal shape in which one side of a rectangle is bent slightly by 30 degrees in the middle when viewed from the side surface. The side surface on the front side is referred to as a first side surface 86A. The side surface connected to the lower side of first side surface 86A is referred to as a second side surface 86B. The side surface bent and connected to second side surface 86B so as to form the angle of about 30 degrees on a VW-plane is referred to as a third side surface 86C. Second side surface 86B is parallel to the U-axis. Third side surface 86C is inclined inward (the side far from the palm of operator 90) with respect to second side surface 86B. When inclined inward, the negative side of the U-axis is located on the positive side of the W-axis. Third side surface 86C is inclined to form the angle of about 30 degrees on the UW-plane with respect to second side surface 86B. A recess 86D including a substantially rectangular parallelepiped space is provided in first side surface 86A. Most of first side surface 86A is a substantially rectangular opening of recess 86D. The bottom surface of recess 86D is parallel to first side surface 86A. First side surface 86A is the side surface of main body portion 86 along the direction in which the index finger and the middle finger of operator 90 extend when main body portion 86 is held. Second side surface 86B is the side surface of main body portion 86 that is adjacent to first side surface 86A and extends in the direction of the angle crossing first side surface 86A. Second side surface 86B extends in the direction forming an obtuse angle, for example, about 110 degrees with first side surface 86A. First side surface 86A and second side surface 86B may be adjacent to each other through a thin shallow groove or the like.

First joystick 81 is provided perpendicular to the bottom surface of recess 86D provided in first side surface 86A. Second joystick 82 and third joystick 83 are provided perpendicular to second side surface 86B. Fourth joystick 84 and fifth joystick 85 are provided perpendicular to third side surface 86C. By disposing in this way, the five joysticks can be disposed at positions that are easy to operate with five fingers of the human hand. Operator 90 operates first joystick 81 with the thumb. Because first joystick 81 is provided on the bottom surface of recess 86D, the width of main body portion 86 in the direction parallel to the V-axis can be determined to the length that can be held easily by a human, and first joystick 81 can be inclined easily with the thumb. Second joystick 82 is operated with the index finger. Third joystick 83 is operated with the middle finger. Fourth joystick 84 is operated with the ring finger. Fifth joystick 85 is operated with the little finger. In the finger rotation mode, when first joystick 81 is operated, first finger 91 is rotated. When second joystick 82 is operated, second finger 92 is rotated. When third joystick 83 is operated, third finger 93 is rotated. When fourth joystick 84 is operated, fourth finger 94 is rotated. When fifth joystick 85 is operated, fifth finger 95 is rotated. When a plurality of joysticks are operated simultaneously, a plurality of fingers are moved simultaneously.

Figure 54:
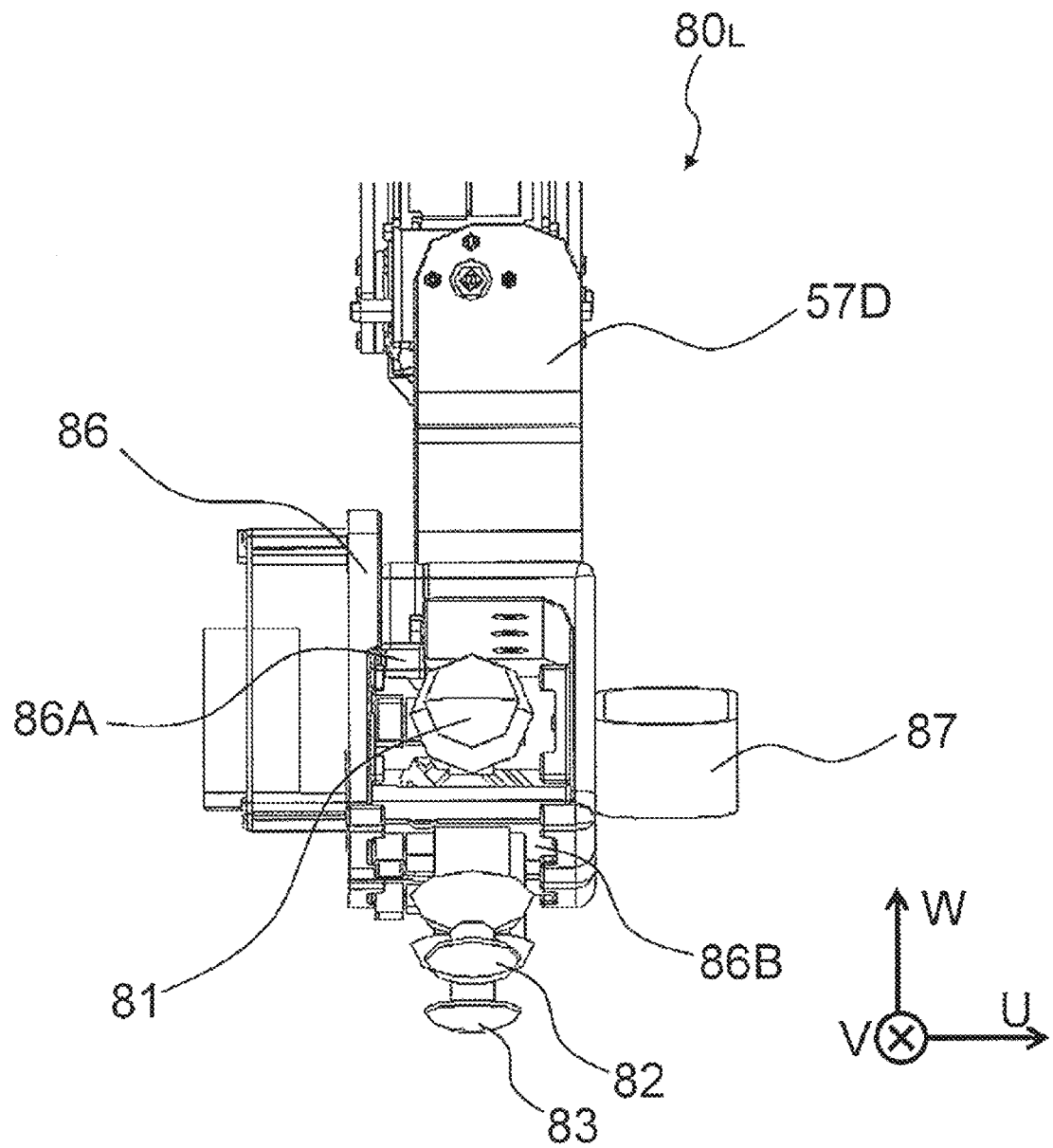
FIG. 54 is a front view illustrating the left hand operation device included in the robot operation system of the embodiment.
Figure 55:
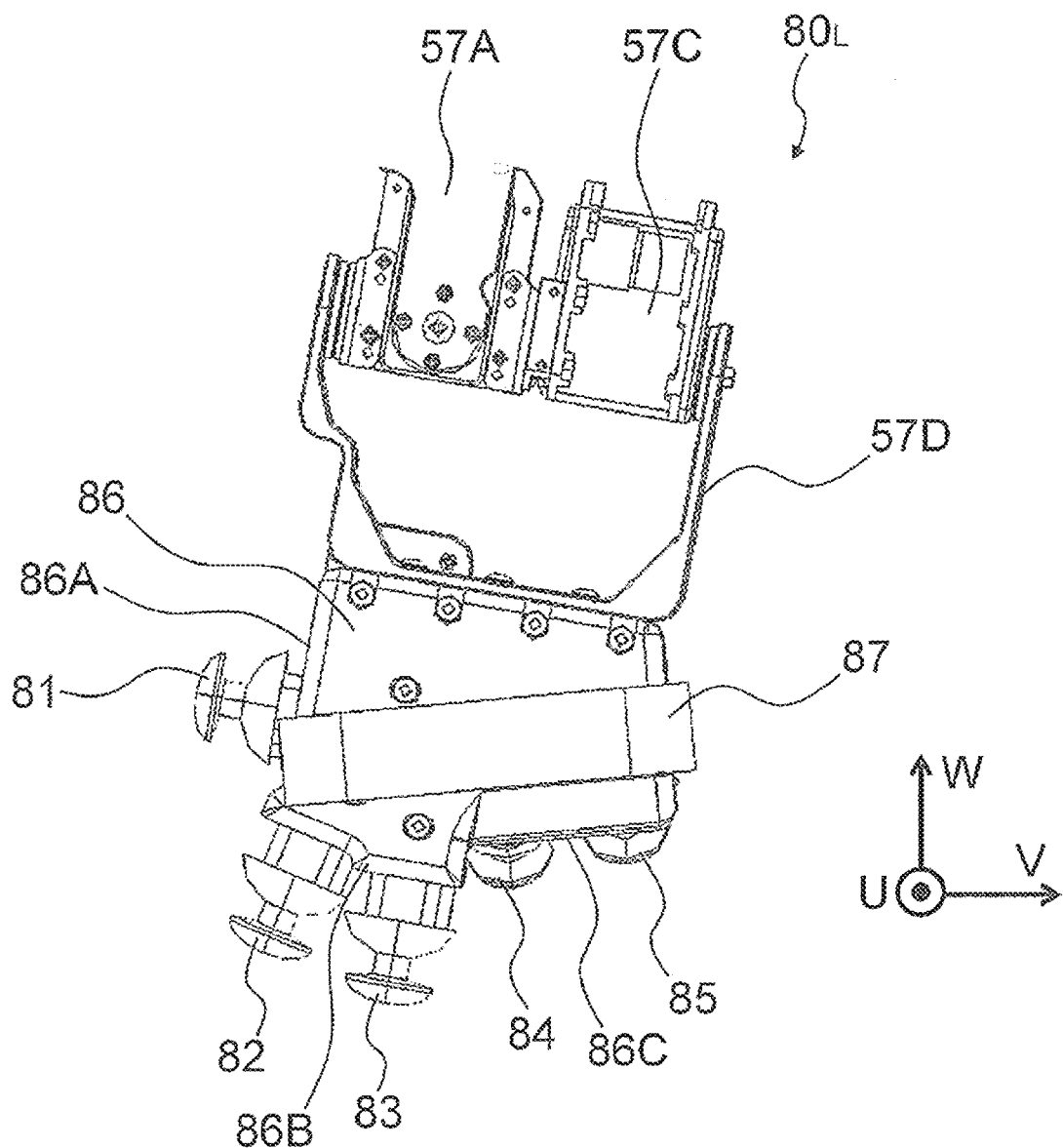
FIG. 55 is a right side view illustrating the left hand operation device included in the robot operation system of the embodiment.
Figure 56:
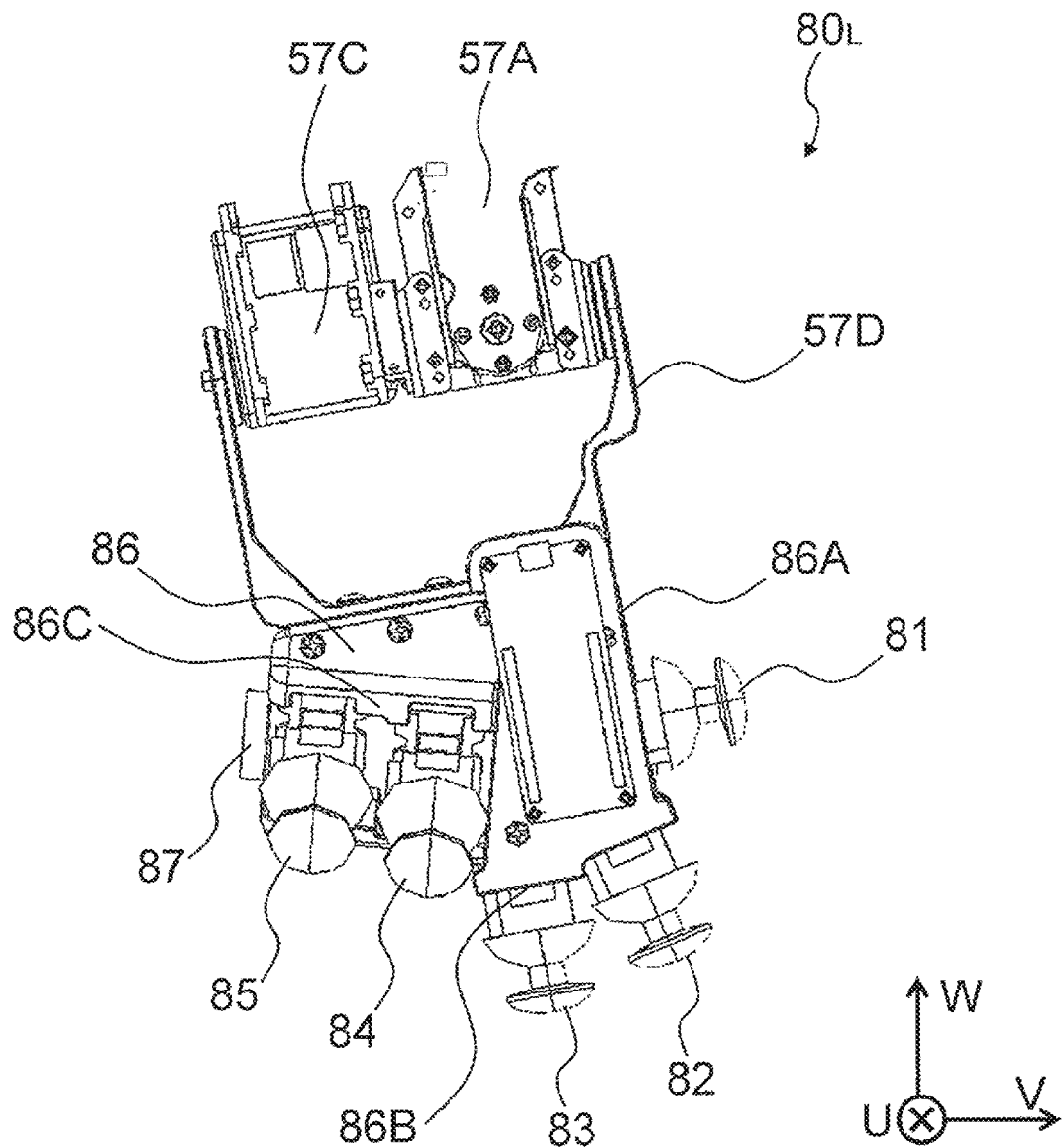
FIG. 56 is a left side view illustrating the left hand operation device included in the robot operation system of the embodiment.
Figure 57:
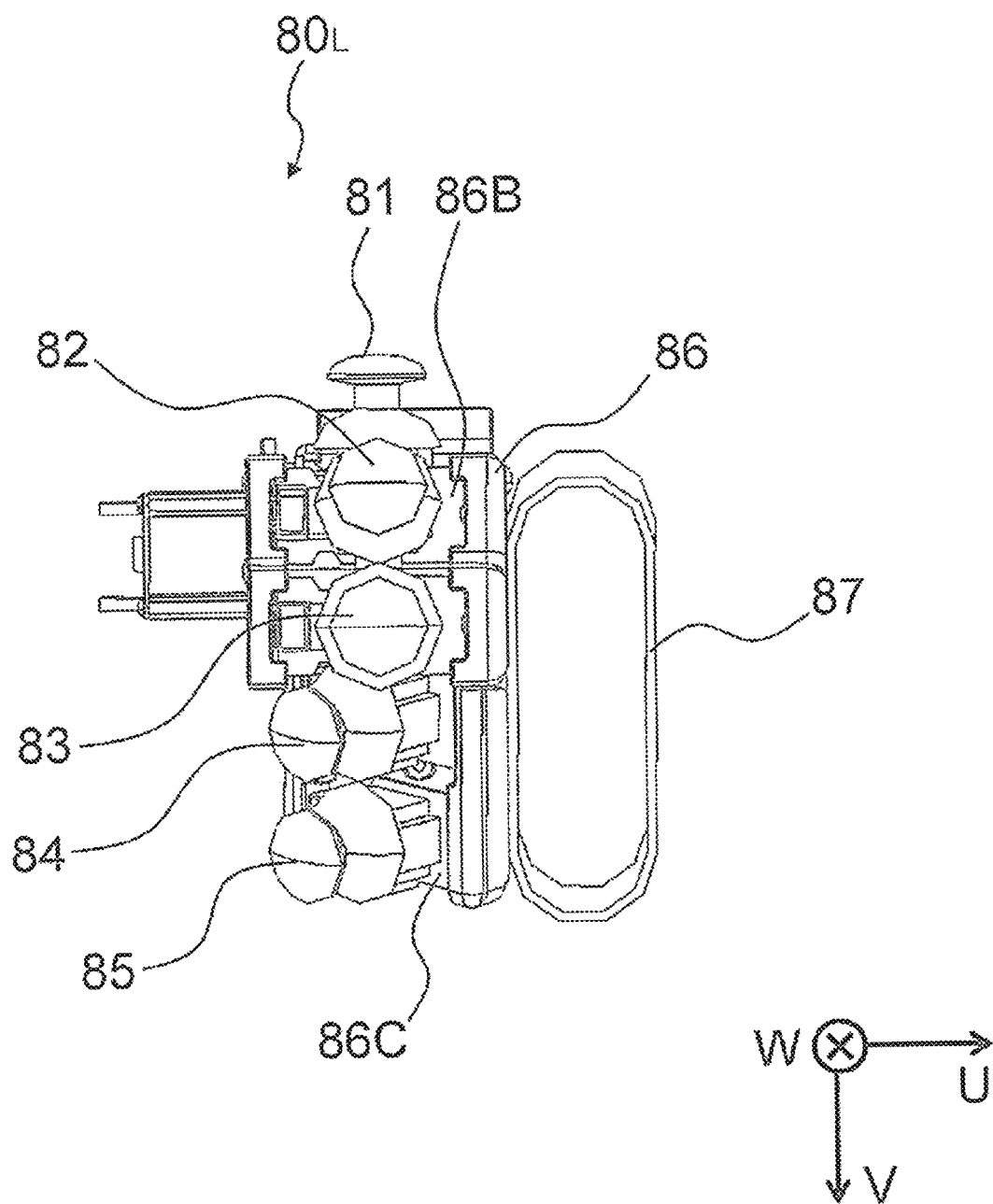
FIG. 57 is a bottom view illustrating the left hand operation device included in the robot operation system of the embodiment.

First joystick 81, second joystick 82, third joystick 83, fourth joystick 84, and fifth joystick 85 can be inclined in the right-left direction in FIG. 54. The length of first joystick 81 in the direction (height direction) perpendicular to first side surface 86A can be changed. Each joystick can be operated in the vertical direction, the right-left direction, and the height direction in FIG. 54, and is locked so as not to move in the direction not used to operate hand 26. Each joystick inclines in the direction in which the force is applied, and returns to the normal position (perpendicular position) when the force is no longer applied.

In the operation of moving first joystick 81 in the height direction, it is determined whether to fix (lock) the rotation angle around each rotation axis in each joint measurement part included in arm operation device 50 to the angle at that time. First joystick 81 is also a lock switch. Whether to fix each angle in each joint measurement part included in arm operation device 50 is changed by the operation of pushing and releasing first joystick 81. During locking, first joystick 81 may remain be pressed. The angle of each joint measurement part included in arm operation device 50 can be changed at the start of the action. When first joystick 81 is pushed, the rotation angle around each rotation axis in each joint measurement part included in arm operation device 50 is fixed to the angle at that time. In this state, when first joystick 81 is pushed again, the rotation angle around each rotation axis in each joint measurement part included in arm operation device 50 can be changed. Through first joystick 81 included in hand operation device $80_R$, operator 90 operates whether to fix the angle at each joint measurement part included in arm operation device $50_R$. Through first joystick 81 included in hand operation device $80_L$, operator 90 operates whether to fix the angle of arm operation device $50_L$.

Mode switching pedals $6_R$, $6_L$ allow operator 90 to switch the action modes of hand 26 and hand operation device 80. When the action mode is switched, hand 26 and hand operation device 80 is operated in the action mode being switched to. Left and right hands 26 is operated in the same action mode. When hand operation device $80_R$ is operated, right hand 26 is moved. When hand operation device $80_L$ is operated, left hand 26 is moved. When neither of mode switching pedals $6_R$, $6_L$ is stepped, left and right hands 26 can be operated in the finger rotation mode by operating hand operation devices $80_R$, $80_L$. When only mode switching pedal $6_R$ is stepped, left and right hands 26 can be operated in the distance change mode by operating hand operation devices $80_R$, $80_L$. When only mode switching pedal $6_L$ is stepped, left and right hands 26 can be operated in the slide mode by operating hand operation devices $80_R$, $80_L$. When mode switching pedals $6_R$, $6_L$ are stepped simultaneously, left and right hands 26 can be operated in the finger rotation mode by operating hand operation devices $80_R$, $80_L$. The correspondence relationship between whether mode switching pedals $6_R$, $6_L$ are stepped and the action modes of hand 26 and hand operation device 80 may be changed from the above. For example, the action mode may be switched between the case where only right mode switching pedal $6_R$ is stepped and the case where only left mode switching pedal $6_L$ is stepped. While three or more values can be inputted with the mode switching pedal, the action modes of right hand 26 and hand operation device $80_R$ may be changed with the right mode switching pedal and the action modes of left hand 26 and hand operation device $80_L$ may be changed with the left mode switching pedal.

Mode switching pedals $6_R$, $6_L$ constitute a part of the robot hand operation device that inputs the operation instruction to operate hand 26 that is the robot hand. Mode switching pedal $6_R$ is a moving mode change switch operated by operator 90 with the foot in order to switch the action modes of hand 26 and hand operation device 80 between the finger rotation mode and the distance change mode. Mode switching pedal $6_L$ is a slide mode change switch operated by operator 90 with the foot in order to switch the action modes of hand 26 and hand operation device 80 between the finger rotation mode and the slide mode. Mode switching pedal $6_R$ may be a slide mode change switch, and mode switching pedal $6_L$ may be the moving mode change switch. The hand operation device may include at least one of the moving mode change switch and the slide mode change switch.

A method for operating hand 26 in the finger rotation mode is described. When first joystick 81 is inclined in the direction (the negative direction of the U-axis) away from the palm of operator 90 in the right-left direction, first finger 91 is rotated in the direction toward first frame 96B. When first joystick 81 is inclined in the direction (the positive direction of the U-axis) toward the palm of operator 90 in the right-left direction, first finger 91 is rotated in the direction away from first frame 96B. While first joystick 81 is inclined, first finger 91 is rotated. When the force is no longer applied to cause first joystick 81 to return to the perpendicular position, the rotation of first finger 91 is stopped. By operating first joystick 81, first finger 91 can take any angle within the range from the angle perpendicular to hand base 98A to the angle at which the first finger 91 comes into contact with first frame 96B or third finger 93.

The speed at which first finger 91 is rotated is changed according to the speed at which first joystick 81 is inclined. The speed at which first finger 91 is rotated is determined to be monotonous un-decrease according to the speed at which first joystick 81 is moved. When first joystick 81 is inclined fast, first finger 91 is rotated fast. When first joystick 81 is inclined slowly, first finger 91 is rotated slowly. The relationship between the speed at which the joystick is moved and the speed at which the finger is rotated is the same between second joystick 82 and second finger 92.

Through second joystick 82, operator 90 operates second finger 92. When second joystick 82 is inclined in the direction (the negative direction of the U-axis) away from the palm of operator 90 in the right-left direction, second finger 92 is rotated in the direction toward palm flesh portion 97E. When second joystick 82 is inclined in the direction (the positive direction of the U-axis) toward the palm of operator 90 in the right-left direction, second finger 92 is rotated in the direction away from palm flesh portion 97E. While second joystick 82 is inclined, second finger 92 is rotated. When the force is no longer applied and second joystick 82 returns to the perpendicular position, the rotation of second finger 92 is stopped. By operating second joystick 82, second finger 92 can take any angle within the range from the angle perpendicular to hand base 98A to the angle at which the second finger comes into contact with palm flesh portion 97E.

Through third joystick 83, operator 90 operates third finger 93. When third joystick 83 is inclined in the direction (the negative direction of the U-axis) away from the palm of operator 90 in the right-left direction, third finger 93 is rotated in the direction toward palm flesh portion 97E. When third joystick 83 is inclined in the direction toward the palm of operator 90 in the right-left direction (the positive direction of the U-axis), third finger 93 is rotated in the direction away from palm flesh portion 97E. While third joystick 83 is inclined, third finger 93 is rotated. When the force is no longer applied and third joystick 83 returns to the perpendicular position, the rotation of third finger 93 is stopped. By operating third joystick 83, third finger 91 can take any angle within the range from the angle perpendicular to hand base 98A to the angle at which the third finger 93 comes into contact with palm flesh portion 97E or first finger 91.

Through fourth joystick 84, operator 90 operates fourth finger 94. When fourth joystick 84 is inclined in the direction (the negative direction of the U-axis) away from the palm of operator 90 in the right-left direction, fourth finger 94 is rotated in the direction toward palm flesh portion 97E. When fourth joystick 84 is inclined in the direction (the positive direction of the U-axis) toward the palm of operator 90 in the right-left direction, fourth finger 94 is rotated in the direction away from palm flesh portion 97E. While fourth joystick 84 is inclined, fourth finger 94 is rotated. When the force is no longer applied and fourth joystick 84 returns to the perpendicular position, the rotation of fourth finger 94 is stopped. By operating fourth joystick 84, fourth finger 94 can take any angle within the range from the angle perpendicular to hand base 98A to the angle at which fourth finger 94 comes into contact with palm flesh 97E.

Through fifth joystick 85, operator 90 operates fifth finger 95. When fifth joystick 85 is inclined in the direction (the negative direction of the U-axis) away from the palm of the operator 90 in the right-left direction, fifth finger 95 is rotated in the direction toward palm flesh portion 97E. When fifth joystick 85 is inclined in the direction (the positive direction of the U-axis) toward the palm of operator 90 in the right-left direction, fifth finger 95 is rotated in the direction away from palm flesh portion 97E. While fifth joystick 85 is inclined, fifth finger 95 is rotated. When the force is no longer applied and fifth joystick 85 returns to the perpendicular position, the rotation of fifth finger 95 is stopped. By operating fifth joystick 85, fifth finger 95 can take any angle within the range from the angle perpendicular to hand base 98A to the angle at which fifth finger 95 comes into contact with palm flesh portion 97E.

In all the five joysticks, the corresponding finger may rotate in the direction toward hand base 98A in the case where the joystick is inclined in the direction (the positive direction of the U-axis) toward the palm of operator 90 in the right-left direction, and the corresponding finger may rotate in the direction away from hand base 98A in the case where the joystick is inclined in the direction (the negative direction of the U-axis) away from the palm of operator 90 in the right-left direction.

In this manner, the operation instruction to move the corresponding finger is inputted when operator 90 operates each joystick, and the operation instruction to move the corresponding finger is not inputted when operator 90 does not operate each joystick. Operating the joystick means that operator 90 moves the entire joystick or a part thereof or keeps the state after operation.

In hand operation device 80, the joystick is operated to rotate the corresponding finger. When the joystick is not inclined, the finger does not rotate. Operator 90 inclines the joystick until the finger is rotated to the intended angle and releases the finger from the joystick when the intended angle is reached. With such the operation, operator 90 can bring each finger to the intended angle easily. The finger corresponding to the joystick is rotated at the speed determined to be monotonous un-decrease according to the speed of movement of the joystick. For example, when first joystick 81 is moved fast, first finger 91 is rotated fast. When first joystick 81 is moved slowly, first finger 91 is rotated slowly. The same applies to the fingers corresponding to other joysticks. Thus, operator 90 can rotate the finger easily in both the case where the operator wants to move fast and the case where the operator wants to move the finger accurately at the intended angle.

The speed at which the joystick is moved (referred to as an operation speed) and the speed at which the corresponding finger is rotated (referred to as a rotation speed) may or may not be proportional to each other. While the operation speed is low, the rotation speed and the operation speed may be proportional to each other. When the operation speed increases, a proportional coefficient between the rotation speed and the operation speed may be reduced. When the operation speed is greater than or equal to a threshold, the rotation speed may be set to an upper limit value.

The corresponding finger is rotated at a first value (referred to as a rotation speed 1) when the operation speed is a first value (referred to as an operation speed 1), and the corresponding finger is rotated at a second value (referred to as a rotation speed 2) greater than or equal to the first value when the operation speed is a second value (referred to as an operation speed 2) greater than the first value. No matter how operation speed 1 and operation speed 2 are selected such that operation speed 1≤operation speed 2 is satisfied, rotation speed 1≤rotation speed 2 is satisfied. In this case, it is said that the rotation speed is the monotonous un-decrease with respect to the operation speed.

In the distance change mode, first joystick 81 controls first finger connection portion 96 and second finger connection portion 97. When first joystick 81 is inclined in the direction (the positive direction of the U-axis) toward the palm of the operator 90 in the right-left direction, first finger connection portion 96 and second finger connection portion 97 are moved in the direction in which the distance between first finger connection portion 96 and second finger connection portion 97 increases.

When first joystick 81 is inclined in the direction (the negative direction of the U-axis) away from the palm of the operator 90 in the right-left direction, first finger connection portion 96 and second finger connection portion 97 are moved in the direction in which the distance between first finger connection portion 96 and second finger connection portion 97 decreases. However, when the rotation angle of first finger 91 is less than or equal to the threshold, first finger connection portion 96 and second finger connection portion 97 are not moved even when first joystick 81 is operated in the distance change mode. The rotation angle of first finger 91 is set to zero degree when first finger 91 is parallel to the upper surface of first frame 96B. For example, the threshold is determined appropriately such as three degrees.

In the distance change mode, when first joystick 81 is inclined in the direction (the positive direction of the U-axis) toward the palm of the operator 90 in the right-left direction, first finger connection portion 96 and second finger connection portion 97 may be moved in the direction in which the distance between first finger connection portion 96 and second finger connection portion 97 decreases, and when first joystick 81 is inclined in the direction (the negative direction of the U-axis) away from the palm of operator 90 in the right-left direction, first finger connection portion 96 and second finger connection portion 97 may be moved in the direction in which the distance between first finger connection portion 96 and second finger connection portion 97 increases.

In the distance change mode, the speed at which first finger connection portion 96 and second finger connection portion 97 are moved is changed according to the speed at which first joystick 81 is moved. The speed at which first finger connection portion 96 and second finger connection portion 97 are moved is the speed at which the finger moving portion is moved. When the finger moving portion is moved, the distance between first finger connection portion 96 and second finger connection portion 97 is changed. According to the moving speed, the speed at which the distance between first finger connection portion 96 and second finger connection portion 97 is changed is determined to be monotonous un-decrease. When first joystick 81 is moved fast, the distance increases or decreases fast. When first joystick 81 is moved slowly, the distance increases or decreases slowly.

First joystick 81 in the distance change mode is a finger moving portion operation part that inputs the operation instruction to move the finger moving portion by the operation of operator 90. The finger moving portion operation part may be any one of second joystick 82, third joystick 83, fourth joystick 84, and fifth joystick 85 instead of first joystick 81. Either one of first joystick 81, second joystick 82, third joystick 83, fourth joystick 84, and fifth joystick 85, which is also the finger moving portion operation parts, is referred to as a finger moving portion operation joystick. The finger moving portion operation joystick is a joystick that is also used as a finger moving portion operation part.

The hand operation device that operates the robot hand not including the fifth finger 95 or not including fifth finger 95 and fourth finger 94 does not include fifth joystick 85 or fifth joystick 85 and fourth joystick 84. The finger moving portion operation joystick is a joystick that inputs the operation instruction operating the finger moving portion among the joysticks provided in the hand operation device. In the hand operation device including first joystick 81, second joystick 82, and third joystick 83, any one of first joystick 81, second joystick 82, and third joystick 83 is a finger moving portion operation joystick also used as the finger moving portion operation part.

As the finger moving portion operation part, a dedicated button, lever, switch, or the like may be provided in the hand operation device. In the distance change mode, the finger moving portion operation joystick is the finger moving portion operation part. In the finger rotation mode and the slide mode, the finger moving portion operation joystick is not the finger moving portion operation part.

When the distance between first finger connection portion 96 and second finger connection portion 97 becomes the maximum of possible range, the distance does not expand any more. When the distance between first finger connection portion 96 and second finger connection portion 97 becomes the minimum of possible range, the distance is not narrowed any more. In the case where at least one of first finger 91 and third finger 93 is not perpendicular to hand base 98A, the distance cannot be narrowed any more when first finger 91 and third finger 93 come into contact with each other.

In hand 26, the finger rotation mode and the distance change mode can be switched regardless of the states of the five fingers. The distance can be changed after the finger is rotated, and the finger can be rotated further. After the distance is changed, the finger can be rotated to change the distance further. In the situation that first finger 91 and third finger 93 are in contact with each other, first finger 91 and third finger 93 can only be rotated or moved to the side where the contact is released.

In order to hold the object, for example, operator 90 operates in the following procedure. In the finger rotation mode, the angle of first finger 91 with respect to first finger connection portion 96 is set to the intended angle. The angle of each of second finger 92, third finger 93, fourth finger 94, and fifth finger 95 with respect to second finger connection portion 97 is set to the intended angle. Then, in the distance change mode, first finger connection portion 96 and second finger connection portion 97 are moved until the distance between first finger connection portion 96 and second finger connection portion 97 is an intended distance. Returning to the finger rotation mode, the angles of first finger 91, second finger 92, third finger 93, fourth finger 94, and fifth finger 95 are adjusted finely. As required, the distance between first finger connection portion 96 and second finger connection portion 97 is changed further in the distance change mode.

In some objects, first finger connection portion 96 and second finger connection portion 97 are moved in the distance change mode until the distance between first finger connection portion 96 and second finger connection portion 97 becomes the intended distance. Then, in the finger rotation mode, first finger 91 is set to the intended angle with respect to first finger connection portion 96. Each of second finger 92, third finger 93, fourth finger 94, and fifth finger 95 is set to the intended angle with respect to second finger connection portion 97.

Hand 26 can hold the object with two fingers of first finger 91 and third finger 93. Hand 26 can hold the object with three to five fingers including first finger 91, third finger 93 and at least one of second finger 92, fourth finger 94, and fifth finger 95.

In the slide mode, second joystick 82 controls the movement of slide fingertip 92K. When second joystick 82 is inclined in the direction (negative direction of the U-axis) away from the palm of operator 90 in the right-left direction, slide fingertip 92K is moved in the direction toward palm flesh portion 97E. When the second joystick 82 is inclined in a direction toward the palm of the operator 90 in the right-left direction (the positive direction of the U axis), slide fingertip 92K is moved in a direction away from palm flesh portion 97E. While second joystick 82 is inclined, slide fingertip 92K is moved. When the force is no longer applied and second joystick 82 returns to the perpendicular position, movement of slide fingertip 92K is stopped.

The moving speed of slide fingertip 92K is changed according to the speed at which second joystick 82 is inclined. According to the speed of inclination, the speed at which slide fingertip 92K is moved is determined to be monotonous un-decrease.

When second joystick 82 is inclined fast, slide fingertip 92K is moved fast. When second joystick 82 is inclined slowly, slide fingertip 92K is moved slowly.

Second joystick 82 in the slide mode is a hook portion operation part that inputs the operation instruction to operate the hook portion moving portion by the operation of operator 90. The hook portion operation part may be any one of first joystick 81, third joystick 83, fourth joystick 84, and fifth joystick 85 instead of second joystick 82. Either one of first joystick 81, second joystick 82, third joystick 83, fourth joystick 84, and fifth joystick 85, which is also the hook portion operation part, is referred to as a hook portion operation joystick. The hook portion operation joystick is a joystick that is also used as the hook portion operation part.

The hand operation device that operates the robot hand not including fifth finger 95 or not including fifth finger 95 and fourth finger 94 does not include fifth joystick 85 or fifth joystick 85 and fourth joystick 84. The hook portion operation joystick is a joystick that inputs the operation instruction to operate the hook portion moving portion in the joysticks provided in the hand operation device. In the hand operation device including first joystick 81, second joystick 82, and third joystick 83, any one of first joystick 81, second joystick 82, and third joystick 83 is the hook portion operation joystick that is used also as the hook portion operation part.

A dedicated button, lever, switch, or the like may be provided as the hook portion operation part in the hand operation device. In the slide mode, the hook portion operation joystick is the hook portion operation part. In the finger rotation mode and the distance change mode, the hook portion operation joystick is not the hook portion operation part.

Because hand 26 is also operated in the slide mode, the electric driver, the water discharge nozzle, and the like can be operated by moving slide fingertip 92K to the finger base side in the state where the grip of the electric driver, the water discharge nozzle, and the like is held and slide fingertip 92K is hooked on the operation lever.

When the electric driver, the water discharge nozzle, or the like is operated, replacement of hand 26 is not required.

Using the joystick to operate the finger included in hand 26, the burden on operator 90 can be reduced as compared with the conventional one. The use of the joystick facilitates keeping of the state in which hand 26 holds the object. When the joystick is not operated, the finger can keep the state at that time. For this reason, operator 90 can rest hands and nerves in the middle of the operation. Using the joystick, operator 90 can perform the operation such as hold of the object or release of the object with the sense of on and off control.

In a glove type hand operation device and a hand operation device in which a bending sensor is used, the operator needs to always pay attention to the angle of the hand and the finger. In the operation requiring fine movement of the hand or a continuous operation for a long time, the operator cannot rest the finger, and thus the burden on the operator is large. When the operator moves the finger inadvertently, the finger of the robot hand is moved following the finger of the operator, causing an unexpected action and hindering the performance of the task to be performed.

Figure 58:
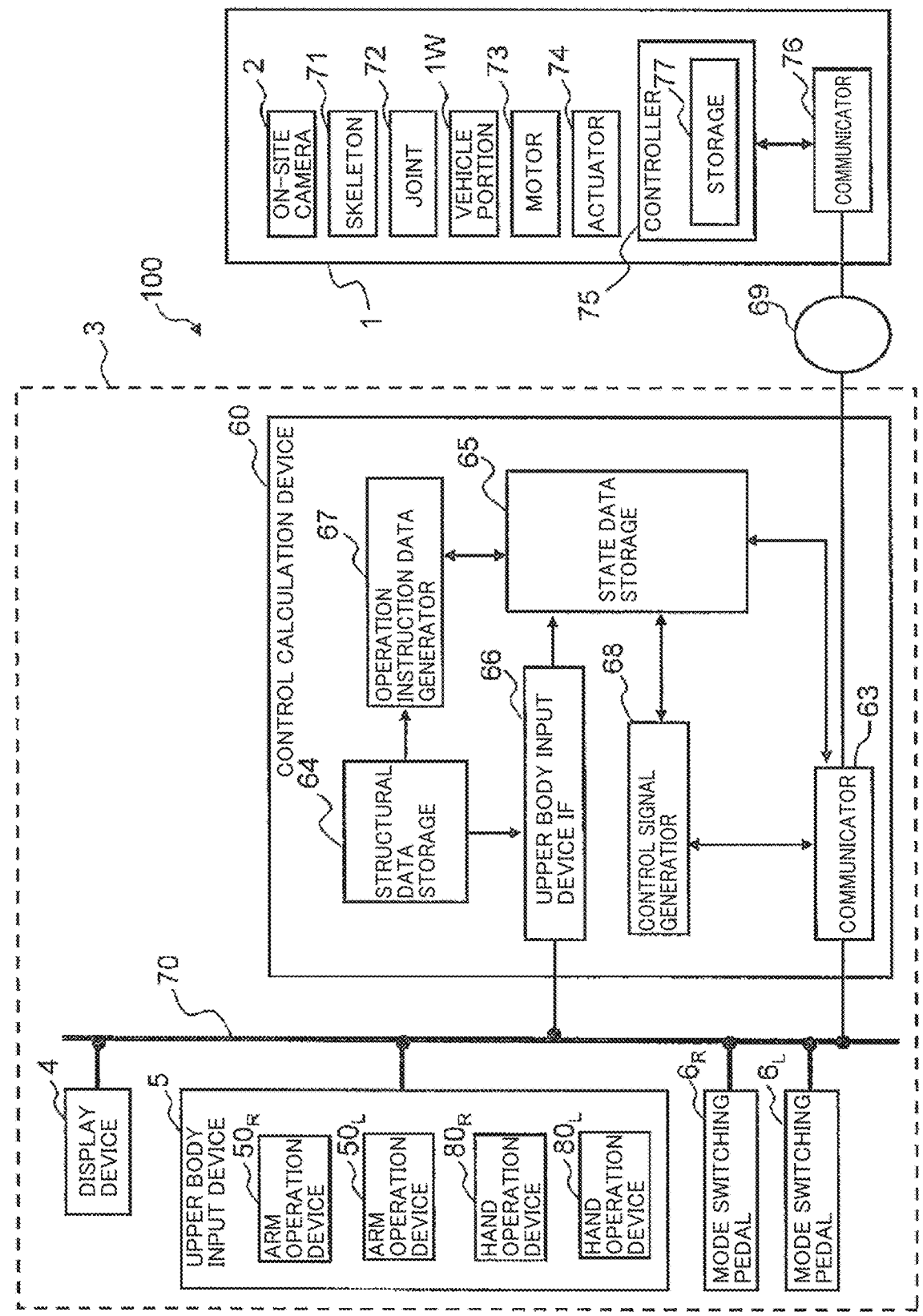
FIG. 58 is a block diagram illustrating a functional configuration of the robot operation system of the embodiment.

With reference to FIG. 58, a software configuration of operation device 3 is described. FIG. 58 is a block diagram illustrating a functional configuration of the robot operation system of the embodiment. Control calculation device 60 is connected to robot 1 through a communication line 69. Control calculation device 60 and robot 1 communicate with each other through communication line 69. A control signal controlling robot 1 is sent from control calculation device 60 through communication line 69. An image captured by on-site camera 2, distances detected by distance sensors 91H, 93H provided on the fingertip of hand 26, and the like are sent from robot 1. Communication line 69 may be a wired line or a wireless line, and may be a public line or a dedicated line. A communication line suitable for the application is used for communication line 69. The distance between robot 1 and control calculation device 60 is arbitrary. The distance may be thousands of kilometers or one meter.

Display device 4, upper body input device 5, mode switching pedals $6_R$, $6_L$, foot operation input device 7 (not illustrated), and control calculation device 60 are connected by a LAN 70. The remote operation in this specification means controlling (operating) the machine by a method for operating the machine remotely. When the remote operation is performed, the operation instruction or the control signal is sent to the machine operated remotely. The actual distance between robot 1 and control calculation device 60 may not be remote. Upper body input device 5 and control calculation device 60 may be connected without LAN 70.

Robot 1 includes mainly on-site camera 2, a skeleton 71 such as body support arm 12, a joint 72 such as support arm connection portion 14, vehicle portion 1W, a motor 73, an actuator 74, a controller 75, and a communicator 76.

Skeleton 71 includes body support arm 12, body lower portion 21, body upper portion 20, arm connection portion 19, upper arm 24, forearm 25, and hand 26. Joint 72 includes support arm connection portion 14, body connection portion 13, body crossing rotation portion 23, arm connection-portion rotation portion 20A, arm base joint 22A, shoulder joint 27, elbow joint 28, and wrist joint 29. Shoulder joint 27 allows the rotation around the upper arm rotation axis (AZ5-axis) passing through upper arm 24 and the rotation around the rotation axis (EL4-axis) that allows the angle formed by upper arm 24 and arm base 22 to be changed. Elbow joint 28 enables the rotation around the forearm rotation axis (AZ6-axis) passing through forearm 25 and the rotation around the rotation axis (EL5-axis) that allows the angle formed by forearm 25 and upper arm 24 to be changed. The upper arm rotation axis (AZ5-axis) is the rotation axis passing through upper arm 24 and extending in the direction of upper arm 24. The forearm rotation axis (AZ6-axis) is the rotation axis passing through the forearm 25 and extending in the direction of forearm 25.

In the robot operated remotely, a member to be operated remotely is referred to as an operated portion. The operated portions included in robot 1 include support arm connection portion 14, body connection portion 13, body crossing rotation portion 23, arm connection-portion rotation portion 20A, arm base joint 22A, shoulder joint 27, elbow joint 28, wrist joint 29, and hand 26. The member included in robot 1 operated remotely by the operation instruction is referred to as an operation target portion. The operation instruction is inputted through upper body input device 5 or the like. The operation target portion is at least a part of the operated portion.

Motor 73 generates the power rotating support arm connection portion 14, body connection portion 13, body crossing rotation portion 23, arm connection-portion rotation portion 20A, the joint (excluding wrist joint 29) included in arm 10, the finger joint included in hand 26, and the like. Actuator 74 includes forearm outside actuator 35 and forearm inside actuator 36, and actuator 74 rotates and keeps still wrist joint 29.

Controller 75 controls motor 73 and actuator 74 based on the control signal from control calculation device 60. Controller 75 includes a storage 77 therein. Storage 77 stores the control signal and the like. Communicator 76 communicates bidirectionally with control calculation device 60.

Control calculation device 60 includes mainly a communicator 63, a structural data storage 64, a state data storage 65, an upper body input device interface 66, an operation instruction data generator 67, and a control signal generator 68. In the drawings and the following description, the upper body input device interface is referred to as an upper body input device IF. Although not illustrated, there is also a functional portion that generates the operation instruction and the control signal that operate vehicle portion 1W and humanoid 1H (excluding arm 10) from the operation of operator 90 on foot input device 7 (not illustrated).

Structural data storage 64 stores structural data representing the structure of robot 1. Structural data storage 64 stores data that does not change during remote control of robot 1. State data storage 65 stores the image captured by on-site camera 2 and the data that is changed during the remote control of operation instruction data (described later) or the like.

Upper body input device IF 66 receives data such as the angle at each measurement joint measured by arm operation devices $50_R$, $50_L$ included in upper body input device 5 and the operation direction and speed of the joystick operated by hand operation devices $80_R$, $80_L$, and writes the data in state data storage 65.

Operation instruction data generator 67 generates operation instruction data to be used for operating (controlling) the operated portion included in robot 1. The generated operation instruction data is data representing the operation instruction instructing the action to be performed by arm 10 and hand 26.

Operation instruction data generator 67 generates the operation instruction data for arm base joint 22A, shoulder joint 27, elbow joint 28, and wrist joint 29 of left and right arms 10 from the angles measured by arm operation devices $50_R$, $50_L$. Operation instruction data generator 67 generates the operation instruction data to be used for operating left and right hands 26 from movements of first joystick 81 to fifth joystick 85 included in hand operation devices $80_R$, $80_L$.

Control signal generator 68 refers to state data storage 65 and generates the control signal controlling motor 73 and actuator 74 included in robot 1 from the operation instruction data.

Structural data storage 64 and state data storage 65 correspond to memory 62 as hardware. Communicator 63, operation instruction data generator 67, and control signal generator 68 are implemented by causing CPU 61 to execute the dedicated program stored in memory 62.

The operation is described. Operator 90 sits in front of display device 4 and upper body input device 5, moves arm operation devices $50_R$, $50_L$, and operates hand operation devices $80_R$, $80_L$ and mode switching pedals $6_R$, $6_L$. The angle of each measurement joint included in arm operation devices $50_R$, $50_L$, the movement of each joystick included in hand operation devices $80_R$, $80_L$, and whether mode switching pedals $6_R$, $6_L$ are stepped are inputted to control calculation device 60. Control calculation device 60 generates operation instruction data and the control signal. Left and right arm 10 included in robot 1 are moved according to the operation instructions inputted through arm operation devices $50_R$, $50_L$ and hand operation devices $80_R$, $80_L$.

When the angle of each measurement joint is fixed (locked) with respect to arm operation devices $50_R$, $50_L$, arm operation devices $50_R$, $50_L$ do not move. When arm operation devices $50_R$, $50_L$ do not move, arm 10 included in robot 1 also does not move. Operator 90 can take a rest while locking arm operation devices $50_R$, $50_L$. When operator 90 mounts arm operation devices $50_R$, $50_L$ and releases the lock, operator 90 can resume the operation of arm 10.

Left and right hands 26 included in robot 1 are moved according to the operation instructions inputted through hand operation devices $80_R$, $80_L$. Because the joystick is used in hand operation device 80, hand 26 are not moved when the joystick is not inclined.

When neither of mode switching pedals $6_R$, $6_L$ is stepped, left and right hands 26 are in the finger rotation mode. In the finger rotation mode, each finger included in hand 26 is rotated by operating each joystick included in hand operation device 80. The operation instruction to rotate first finger 91 is inputted by moving first joystick 81. The operation instruction to rotate second finger 92 is inputted by moving second joystick 82. The operation instruction to rotate third finger 93 is inputted by moving the third joystick 83. The operation instruction to rotate fourth finger 94 is inputted by moving fourth joystick 84. The operation instruction to rotate fifth finger 95 is inputted by moving fifth joystick 85.

When only mode switching pedal $6_R$ is stepped, left and right hands 26 are in the distance change mode. In the distance change mode, first joystick 81 included in hand operation device 80 is operated to be able to change the distance between first finger connection portion 96 and second finger connection portion 97 included in hand 26. When only mode switching pedal $6_L$ is stepped, left and right hands 26 are in the slide mode. In the slide mode, second joystick 82 included in hand operation device 80 is operated to be able to move slide fingertip 92K included in hand 26 to the finger base side.

Hand 26 has a simple structure, but can perform many kinds of actions. In the case where the object is held, the object can be held with fingertips extended by two to five fingers, and the object can be held by rotating the five fingers according to the shape of the object. For example, the large or long object is held by increasing the number of fingers used for holding, and the small object is held by only two fingers. Alternatively, first finger 91 can be put into palm flesh portion 91E, and the object can be placed on four fingers facing upward. The large or long object can be held by left and right hands 26. In the case where the object is held by left and right hands 26, left and right hands 26 are disposed at the same height at appropriate distances with the four fingers facing upward, and the object is placed on the four fingers of left and right hands 26. The large object can also be held between two hands 26 such that the four fingers of left and right hands 26 are disposed in the vertical direction. Furthermore, hand 26 can be operated such that hand 26 is caused to perform various and many actions such as pinching, twisting, bending, wrenching, pressing a button, and pulling a lever. Hand 26 can perform almost all actions performed by a human. Here, hand 26 is not required to be replaced according to the work content. Consequently, robot 1 including hand 26 can be operated remotely to perform many types of work continuously and seamlessly.

In the robot operation system of the present disclosure, even in the situation where an unexpected event is occurred, the remote control can be performed by determination of the operator such that the robot can perform the action suitable for the situation. In various environments, an autonomous robot to which an artificial intelligence technology is applied cannot cope with the situation, the robot operation system of the present disclosure enables the operator to give a flexible operation instruction. The robot operation system of the present disclosure can reduce the burden on the operator to operate the robot as compared with the conventional one.

The robot operation system of the present disclosure is applied to a very wide variety of applications. For example, the followings are conceivable examples.

A field where human alternative work is required in hazardous work related to a human life.

A field requiring labor saving. Care field, agricultural field, and the like.

A remote operation business field implementing telework.

For example, the robot operation system is expected to be used for the following work.

Work of handling landmines, explosives, and the like.

Harmful operations involving a human life, such as in response to terrorism.

Work at a nuclear power plant where an accident is occurred.

Work in a work environment where long-time work is impossible with chemical substances or the like. Coating work and the like.

Work of supporting or assisting a human at a nursing care site.

Various works in agricultural work.

Security and monitoring work. For example, security work in an unmanned facility for 24 hours.

Any work illustrated in the above example is work that requires determination according to the situation at that time and cannot be handled only by the robot. Even when the robot has artificial intelligence, it is difficult for the current technology to cope with the work only by the robot. In these works, the work content cannot be determined previously. These works are works in which unpredictable situations are occurred and the flexible determination is required. In order to enable the robot to perform various tasks appropriate for the situation according to the situation, the remote control using human determination is required. It would be greatly beneficial for society when a human could operate the robot remotely, up to a variety of fine tasks using both hands. The robot operation system of the present disclosure enables a human to operate the robot remotely for a wide variety of work including detailed work using both hands.

The robot operation system can also be used in the field of security of important facilities. The present disclosure can be applied to 24-hour security in an unmanned facility such as an unmanned communication station or an unmanned station. When required, the remote control of the robot by a human can improve, for example, the quality of work in monitoring and security work.

Hand 26 includes five fingers. The hand may be a hand that includes three fingers of first finger 91, second finger 92, and third finger 93. Alternatively, four fingers also including fourth finger 94 may be used. Alternatively, a hand including six or more fingers may be used. The second finger may not include the slide fingertip. The hand may be a hand that includes at least three fingers including the first finger and the third finger facing each other, the first finger may be connected to the first finger connection portion rotatably, the third finger and the other finger may be connected to the second finger connection portion rotatably, and the distance between the first finger connection portion and the second finger connection portion may be changeable. Even when the hand includes a different number of fingers from five, the hand operation device includes the same number of joysticks as the fingers of the hand.

The three-finger hand may not have the second finger as the finger other than the first finger and the third finger. When the hand includes the first finger, the third finger and the fourth finger or the fifth finger, it can be considered that the fourth finger or the fifth finger is the second finger disposed side by side with the third finger.

When the hand including three or four fingers includes the slide fingertip, the slide fingertip is provided on the second finger. The second finger is disposed on the front side of the third finger. The front side of the hand is the side existing in front of the robot in the reference state.

Hand 26 is the robot hand including five fingers. Arm 10 is the robot arm including the upper arm, the forearm, and the hand that are connected in series. Hand 26 or a modification thereof may be used as the robot hand. Arm 10 or a variant thereof may be used as the robot arm.

Hand operation device 80 is a robot hand operation device that is operated by operator 90 in order to input the operation instruction to move hand 26 (robot hand). The robot hand to be operated may be any robot hand as long as the robot hand includes at least three fingers. One set of hand 26 and hand operation device 80, and the function for operating hand 26 remotely included in control calculation device 60 constitute the robot hand operation system operating the robot hand remotely. The hand (robot hand) may be obtained by modifying hand 26. The hand operation device may be obtained by modifying hand operation device 80. When at least one of the robot hand and the hand operation device is modified, the control calculation device is also modified according to the modification. The control calculation device controls the robot hand based on the operation instruction inputted through the hand operation device. In either case, the robot hand operation device and the robot hand operation system of the present disclosure can reduce the burden on the operator to operate the robot hand as compared with the conventional one.

Arm operation device 50 is the robot arm operation device through which the operator inputs the operation instruction to operate arm 10, which is the robot arm, by moving arm operation device 50. The robot arm may be a robot arm that includes a robot hand (hand) different from hand 26.

Shoulder joint 26 (including arm base joint 22A) and elbow joint 27 included in arm 10 constitute the joint with two rotational degrees of freedom or three rotational degrees of freedom by series connection of the mechanisms rotatable with one rotational degree of freedom. The joint in which the mechanisms rotatable with one rotational degree of freedom are connected in series is referred to as a serial joint. The arm may be an arm that includes the joint in which the biaxial gimbal or the like rotatable with two rotational degrees of freedom is used, or the joint in which the spherical bearing or the like with three rotational degrees of freedom is used. The biaxial gimbal may be either one including two rotation mechanisms capable of changing the angles on two crossing planes (XY-type) or one including a rotation mechanism around the straight line serving as the reference (reference straight line) and a rotation mechanism capable of changing the angle formed with the reference straight line (longitude and latitude type). The joint with three rotational degrees of freedom may be a joint that includes a mechanism that enables the rotation around the axis passing through the member on one side of two members to which the biaxial gimbal is connected rotatably. The joint with two rotational degrees of freedom or three rotational degrees of freedom using the XY-type biaxial gimbal is referred to as an XY-type joint. The joint with two rotational degrees of freedom or three rotational degrees of freedom using the longitude and latitude biaxial gimbal is referred to as a longitude and latitude joint.

The robot arm may be a robot arm that includes the arm connection portion, the upper arm connected to the arm connection portion, the forearm connected to the upper arm, the hand connected to the forearm, the shoulder joint connecting the upper arm to the arm connection portion rotatably, the elbow joint connecting the forearm to the upper arm rotatably, and the wrist joint connecting the hand to the forearm rotatably. The hand may be any type. The shoulder joint may be any one of the serial joint, the XY-type joint, and the longitude and latitude joint. The shoulder joint may be any joint as long as the upper arm is connected to the arm connection portion rotatably. The elbow joint may be any one of the serial joint, the XY-type joint, and the longitude and latitude joint. The elbow joint may be any one that connects the forearm to the upper arm rotatably. The wrist joint may be any one of the serial joint, the XY-type joint, and the longitude and latitude joint. The wrist joint may be any joint as long as the hand is connected to the forearm rotatably. The wrist joint may connect the hand to the forearm such that the hand is rotatable around the rotation axis passing through the hand. Such the robot arm is referred to as a type-1 robot arm.

The type-1 robot arm may be a robot arm that includes the hand, the forearm to which the hand is connected, the upper arm to which the forearm is connected, the arm connection portion to which the upper arm is connected, the wrist joint connecting the hand to the forearm rotatably, the elbow joint connecting the forearm to the upper arm rotatably, and the shoulder joint connecting the upper arm to the arm base rotatably.

The type-1 robot arm may be a robot arm that includes the robot hand, the forearm to which the robot hand is connected, the upper arm to which the forearm is connected, and the arm connection portion to which the upper arm is connected. The robot arm may be a robot arm that includes the wrist joint that connects the robot hand to the forearm so as to be rotatable with at least two rotational degrees of freedom, the elbow joint that connects the forearm to the upper arm so as to be rotatable with at least two rotational degrees of freedom, and the shoulder joint that connects the upper arm to the arm connection portion so as to be rotatable with at least two rotational degrees of freedom.

A type-1 robot arm operation device through which the operator inputs the operation instruction to operate the type-1 robot arm by moving the robot arm operation device includes the arm connection structure, the upper arm structure connected to the arm connection structure, the forearm structure connected to the upper arm structure, and the hand structure connected to the forearm structure. The robot arm operation device includes the shoulder measurement joint that connects the upper arm structure to the arm connection structure so as to be rotatable with the same rotational degree of freedom as the upper arm is connected to the arm connection portion at the shoulder joint, the elbow measurement joint that connects the forearm structure to the upper arm structure so as to be rotatable with the same rotational degree of freedom as the forearm is connected to the upper arm at the elbow joint, and the wrist measurement joint that connects the hand structure to the forearm structure so as to be rotatable with the same rotational degree of freedom as the hand is connected to the forearm at the wrist joint.

The robot arm operation device includes the shoulder lock portion that locks the shoulder measurement joint such that the shoulder measurement joint does not move, the elbow lock portion that locks the elbow measurement joint such that the elbow measurement joint does not move, the wrist lock portion that locks the wrist measurement joint such that the wrist measurement joint move, the shoulder joint angle measurement part that measures the shoulder joint measurement angle that is the angle at which the upper arm structure is connected to the arm connection structure at the shoulder measurement joint, the elbow joint angle measurement part that measures the elbow joint measurement angle that is the angle at which the forearm structure is connected to the upper arm structure at the elbow measurement joint, and the wrist joint angle measurement part that measures the wrist joint measurement angle that is the angle at which the hand structure is connected to the forearm structure at the wrist measurement joint. The robot arm operation device includes the lock state change switch to switch uniformly between the locked state in which the shoulder lock portion, the elbow lock portion, and the wrist lock portion are locked and the unlocked state in which the shoulder lock portion, the elbow lock portion, and the wrist lock portion are not locked. The operation instructions inputted through the type-1 robot arm operation device are the shoulder joint measurement angle, the elbow joint measurement angle, and the wrist joint measurement angle.

In the type-1 robot arm, the control calculation device controls the shoulder joint, the elbow joint, and the wrist joint based on the shoulder joint measurement angle, the elbow joint measurement angle, and the wrist joint measurement angle, which are operation instructions.

Alternatively, the robot arm includes the hand, the forearm to which the hand is connected rotatably, the upper arm to which the forearm is connected rotatably, the arm base to which the upper arm is connected rotatably, and the arm connection portion to which the arm base is connected rotatably. In the robot arm, the hand is connected to the forearm such that a hand first inclination angle formed by a forearm rotation axis and the hand on a first plane including the forearm rotation axis passing through the forearm and a hand second inclination angle formed by the forearm rotation axis and the hand on a second plane crossing the first plane and including the forearm rotation axis are changeable. In the robot arm, the forearm is connected to the upper arm such that a forearm inclination angle that is an angle formed by the upper arm and the forearm is changeable. In the robot arm, the upper arm is connected to the arm base such that an upper arm inclination angle that is an angle between the arm base and the upper arm is changeable. In the robot arm, the arm base is connected to the arm connection portion such that an arm base rotation angle, which is a rotation angle around the arm base rotation axis passing through the arm base, is changeable. In the robot arm, the upper arm is rotatable around an upper arm rotation axis passing through the upper arm, and the forearm is rotatable around the forearm rotation axis. Such the robot arm is referred to as a type-2 robot arm. The type-2 robot arm is included in the type-1 robot arm.

The type-2 robot arm may be as follows. The robot arm includes the hand, the forearm to which the hand is connected rotatably, the upper arm to which the forearm is connected rotatably, the arm base to which the upper arm is connected rotatably, and the arm connection portion to which the arm base is connected rotatably. The robot arm includes a wrist joint, an elbow joint, a shoulder joint, and an arm base joint. The wrist joint connects the hand to the forearm such that a hand first inclination angle formed by a forearm rotation axis and the hand on a first plane including the forearm rotation axis passing through the forearm and a hand second inclination angle formed by the forearm rotation axis and the hand on a second plane crossing the first plane and including the forearm rotation axis are changeable. The elbow joint connects the forearm to the upper arm such that a forearm inclination angle that is the angle formed by the upper arm and the forearm is changeable. The shoulder joint connects the upper arm to the arm base such that an upper arm inclination angle that is an angle formed by the arm base and the upper arm is changeable. The arm base joint connects the arm base to the arm connection portion such that an arm base rotation angle that is a rotation angle around the arm base rotation axis passing through the arm base is changeable.

Arm 10 is a type-2 robot arm. Arm 10 is also a type-1 robot arm.

In the type-2 robot arm, the operator inputs the operation instruction to operate the robot arm through the type-2 robot arm operation device. Through the operation of the operator that moves the type-2 robot arm operation device, the operator inputs the operation instruction to operate the robot arm. The inputted operation instruction is inputted to the control calculation device that controls the robot arm.

The type-2 robot arm operation device includes an arm connection structure, an upper arm structure connected to the arm connection structure, a forearm structure connected to the upper arm structure, and a hand structure connected to the forearm structure.

The robot arm operation device includes a shoulder measurement joint, an elbow measurement joint, and a wrist measurement joint. The shoulder measurement joint connects the upper arm structure to the arm connection structure so as to be rotatable around an arm connection structure rotation axis perpendicular to the arm connection structure, such that an upper arm inclination measurement angle that is an angle formed by the upper arm structure with the arm connection structure rotation axis is changeable, and so as to be rotatable around an upper arm structure rotation axis passing through the upper arm structure. The elbow measurement joint connects the forearm structure to the upper arm structure such that a forearm inclination measurement angle that is an angle formed by the forearm structure with respect to the upper arm structure is changeable and such that the forearm structure is rotatable around a forearm structure rotation axis passing through the forearm structure. The wrist measurement joint connects the hand structure to the forearm structure such that a hand first inclination measurement angle that is an angle formed by the hand structure with respect to the forearm structure rotation axis on a first measurement plane including the forearm structure rotation axis and a hand second inclination measurement angle that is an angle formed by the hand structure with respect to the forearm structure rotation axis on the second measurement plane crossing the first measurement plane and including the forearm structure rotation axis are changeable.

The robot arm operation device includes a shoulder joint angle measurement part, an elbow joint angle measurement part, and a wrist joint angle measurement part. The shoulder joint angle measurement part measures an arm base rotation measurement angle that is an angle at which the upper arm structure is rotated around an arm connection structure rotation axis, the upper arm inclination measurement angle, and an upper arm rotation measurement angle that is an angle at which the upper arm structure is rotated around the upper arm structure rotation axis. The elbow joint angle measurement part measures a forearm inclination measurement angle and a forearm rotation measurement angle that is an angle at which the forearm structure is rotated around the forearm structure rotation axis. The wrist joint angle measurement part measures the hand first inclination measurement angle and the hand second inclination measurement angle.

The operation instructions inputted by the operator with the robot arm operation device are arm base rotation measurement angle $\theta_{X1M}$, upper arm inclination measurement angle $\delta_{Y2M}$, upper arm rotation measurement angle $\theta_{Z3M}$, forearm inclination measurement angle $\delta_{X4M}$, forearm rotation measurement angle $\theta_{Z5M}$, hand first inclination measurement angle $\delta_{X6M}$, and hand second inclination measurement angle $\delta_{Y7M}$.

Arm operation device 50 is a type-2 robot arm operation device. Arm operation device 50 is also a type-1 robot arm operation device. Arm operation device 50, which is the type-1 robot arm operation device, measures arm base rotation measurement angle $\theta_{X1M}$, upper arm inclination measurement angle $\delta_{Y2M}$, and upper arm rotation measurement angle $\theta_{Z3M}$ as the shoulder joint measurement angles. Arm operation device 50 measures forearm inclination measurement angle $\delta_{X4M}$ and forearm rotation measurement angle $\theta_{Z5M}$ as the elbow joint measurement angles. Arm operation device 50 measures hand first inclination measurement angle $\delta_{X6M}$ and hand second inclination measurement angle $\delta_{Y7M}$ as the wrist joint measurement angles.

In the type-2 robot arm, the control calculation device controls arm base rotation angle $\theta_{AZ4}$, upper arm inclination angle $\delta_{EL4}$, upper arm rotation angle $\theta_{AZ5}$, forearm inclination angle $\delta_{EL5}$, forearm rotation angle $\theta_{AZ6}$, forearm first inclination angle $\delta_{EL6}$, hand first inclination angle $\delta_{EL6}$, and hand second inclination angle $\delta_{XEL2}$ based on arm base rotation measurement angle $\theta_{X1M}$, upper arm inclination measurement angle $\delta_{Y2M}$, upper arm rotation measurement angle $\theta_{Z3M}$, forearm inclination measurement angle $\delta_{X4M}$, forearm rotation measurement angle $\theta_{Z5M}$, hand first inclination measurement angle $\delta_{X6M}$, and hand second inclination measurement angle $\delta_{Y7M}$ that are operation instructions.

In the type-1 and type-2 robot arm operation devices, the shoulder measurement joint has the same rotational degree of freedom as the shoulder joint, the elbow measurement joint has the same rotational degree of freedom as the elbow joint, and the wrist measurement joint has the same rotational degree of freedom as the wrist joint. The state in which the joint and the corresponding measurement joint have the same rotational degrees of freedom means that the types and the numbers of the rotation axes of the joints and the corresponding measurement joints coincide with each other.

Even when at least one of the shoulder measurement joint and the shoulder joint, the elbow measurement joint and the elbow joint, and the wrist measurement joint and the wrist joint does not have the same rotational degree of freedom, sometimes the robot arm operation device can operate the robot arm.

In the joint, the member closer to the arm connection portion is referred to as a first member, and the member farther from the arm connection portion is referred to as a second member. In shoulder joint 27 (including arm base joint 22A), arm connection portion 19 is the first member, and upper arm 24 is the second member. In elbow joint 28, upper arm 24 is the first member, and forearm 25 is the second member. In wrist joint 29, forearm 25 is the first member, and hand 26 is the second member. The first member of shoulder joint 27 may be body 11. Hand 26 that is the second member in wrist joint 29 is the robot hand.

In the serial joint or the longitude and latitude joint, the angle formed by the second member with respect to the first member is represented by a joint inclination angle formed by a first member rotation axis passing through the first member and the second member and a joint rotation angle at which the second member is rotated around the first member rotation axis. The state in which the angle formed by the second member with respect to the first member in the joint can be changed with two rotational degrees of freedom means that the joint inclination angle and the joint rotation angle can be changed. The state in which the angle formed by the second member with respect to the first member at the joint can be changed with one rotational degree of freedom means that the joint inclination angle can be changed at the joint. The state in which the angle formed by the second member with respect to the first member can be changed means that the joint inclination angle can be changed at the joint. The rotation axis passing through the second member is referred to as a second member rotation axis. The angle at which the second member is rotated around the second member rotation axis at the joint is referred to as a second member rotation angle.

The first member rotation axis in shoulder joint 27 is the arm base rotation axis (AZ4-axis). The second member rotation axis in shoulder joint 27 is the upper arm rotation axis (AZ5-axis). The joint inclination angle of shoulder joint 27 is upper arm inclination angle $\delta_{EL4}$. The joint rotation angle of shoulder joint 27 is an arm base rotation angle $\theta_{AZ4}$. The second member rotation angle in shoulder joint 27 is upper arm rotation angle $\theta_{AZ5}$.

The first member rotation axis in elbow joint 28 is the upper arm rotation axis (AZ5-axis). The second member rotation axis in elbow joint 2 is the forearm rotation axis (AZ6-axis). The joint inclination angle of elbow joint 28 is forearm inclination angle $\delta_{EL5}$. The joint rotation angle of elbow joint 28 is the angle (referred to as an elbow joint rotation angle) at which forearm 25 is rotated with respect to upper arm 24 around the upper arm rotation axis (AZ5-axis). The second member rotation angle at elbow joint 28 is forearm rotation angle $\theta_{AZ6}$. The first member rotation axis at wrist joint 29 is the forearm rotation axis (AZ6-axis).

In the XY-type joint, two planes crossing each other are referred to as a first plane and a second plane. A rotation axis perpendicular to the second plane is referred to as a first rotation axis, and a rotation axis perpendicular to the first plane is referred to as a second rotation axis. The angle at which the second member is rotated around the first rotation axis is referred to as a first inclination angle. The angle at which the second member is rotated around the second rotation axis is referred to as a second inclination angle. In the XY-type joint, the angle formed by the second member with respect to the first member is the first inclination angle and the second inclination angle. The angle formed by the second member with respect to the first member at the XY-type joint can be changed with two rotational degrees of freedom. The first plane and the second plane are orthogonal to each other preferably, but may cross each other. The line intersection between the first plane and the second plane coincides with the first member rotation axis desirably, but the line intersection between the first plane and the second plane may not coincide with the first member rotation axis.

In wrist joint 29, the first member rotation axis is the forearm rotation axis (AZ6-axis), the front-rear direction rotation plane is the second plane, the EL6-axis is the first rotation axis, the right-left direction rotation plane is the first plane, and the EL6-axis is the second rotation axis. In wrist joint 29, the first inclination angle is hand first inclination angle $\delta_{EL6}$, and the second inclination angle is hand second inclination angle $\delta_{XEL2}$.

In the serial or longitude and latitude wrist joint, the joint inclination angle is referred to as a hand inclination angle, and the joint rotation angle is referred to as a wrist joint rotation angle. The second member rotation angle of the wrist joint is referred to as a hand rotation angle.

The rotational degree of freedom of the joint is a rotational degree of freedom obtained by adding one rotational degree of freedom to the rotational degree of freedom of the angle formed by the second member with respect to the first member when the second member can be rotated around the second member rotation axis at the joint. When the second member cannot rotate around the second member rotation axis at the joint, the rotational degree of freedom of the joint is equal to the rotational degree of freedom of the angle formed by the second member with respect to the first member.

The angle at which the upper arm is connected to the arm connection portion at the shoulder joint with one rotational degree of freedom or two rotational degrees of freedom is referred to as an upper arm connection angle. The angle at which the forearm is connected to the upper arm at the elbow joint with one rotational degree of freedom or two rotational degrees of freedom is referred to as a forearm connection angle. The angle at which the hand is connected to the forearm at the wrist joint with one rotational degree of freedom or two rotational degrees of freedom is referred to as a hand connection angle.

A type-3 robot arm includes an arm connection portion, an upper arm connected to the arm connection portion, a forearm connected to the upper arm, and a hand connected to the forearm. The robot arm includes a shoulder joint that connects the upper arm to the arm connection portion so as to be able to change a shoulder rotation angle that is a rotation angle around a shoulder rotation axis crossing the arm connection portion and an upper arm inclination angle that is an angle formed by the shoulder rotation axis and the upper arm, an elbow joint that connects the forearm to the upper arm so as to be able to change a forearm inclination angle that is an angle formed by the upper arm rotation axis passing through the upper arm and the forearm, and a wrist joint that connects the hand to the forearm rotatably. In the type-3 robot arm, an elbow rotation angle, which is an angle at which the upper arm or the forearm is rotated around the upper arm rotation axis, can be changed.

The type-3 robot arm includes the arm connection portion, the upper arm connected to the arm connection portion, the forearm connected to the upper arm, and the hand connected to the forearm. The upper arm may be connected to the arm connection portion so as to be rotatable around the shoulder rotation axis crossing the arm connection portion and such that the angle formed by the shoulder rotation axis and the upper arm is changeable. The forearm may be connected to the upper arm such that the angle formed by the upper arm rotation axis passing through the upper arm and the forearm is changeable. The hand may be connected to the forearm rotatably, and the upper arm or the forearm may be rotatable around the upper arm rotation axis.

In the type-3 robot arm, the state in which the elbow rotation angle, which is the angle at which the upper arm is rotated around the upper arm rotation axis, can be changed means that the shoulder joint has three rotational degrees of freedom. When it is considered that the shoulder joint included in arm 10 includes the mechanism to rotate the intermediate cylindrical portion 24B with respect to the joint connected portion 24A, arm base 22, and arm base joint 22A, the shoulder joint included in arm 10 has three rotational degrees of freedom. The three rotational degrees of freedom of the shoulder joint are rotational degrees of freedom that change the arm base rotation angle, the upper arm inclination angle, and the upper arm rotation angle. Consequently, arm 10 is thus also the type-3 robot arm.

The state in which the elbow rotation angle, which is the angle at which the forearm is rotated around the upper arm rotation axis, is changeable means that the forearm is connected to the upper arm at the elbow joint with two rotational degrees of freedom. The arm in which the forearm is connected to the upper arm at the elbow joint with two rotational degrees of freedom is, for example, an elbow joint 31 included in a humanoid robot 100 described in WO 2018/074101 (referred to as Prior Art Document 1: PAD 1). Paragraph 0093 of PAD 1 describes that "The forearm 8 is connected to upper arm 7 with two rotational degrees of freedom by elbow joint 31". PAD 1 describes that "Elbow joint 31 is a biaxial gimbal having a rotation axis Rz2 in the same direction as upper arm 7. In the biaxial gimbal, the angle formed by upper arm 7 and forearm 8 can be changed. And forearm 8 can be rotated around rotation axis Rz2.". "Rotation axis Rz2" in PAD 1 corresponds to the upper arm rotation axis in the present disclosure. The rotation angle around the "rotation axis Rz2" corresponds to the elbow rotation angle that is the angle at which the forearm is rotated around the upper arm rotation axis in the present disclosure. "The angle of forearm 8 rotated around rotation axis Rz2 with respect to upper arm 7" corresponds to the forearm inclination angle in the present disclosure.

When the wrist joint has at least two rotational degrees of freedom, the total rotational degrees of freedom of the shoulder joint, the elbow joint, and the wrist joint are at least seven rotational degrees of freedom in the type-3 robot arm.

In the type-3 robot arm, the operator inputs the operation instruction to operate the robot arm by the type-3 robot arm operation device. Through the operation of the operator that moves the type-3 robot arm operation device, the operator inputs the operation instruction to operate the robot arm. Arm 10 is also the type-3 robot arm. Arm operation device 50 is also a type-3 robot arm operation device.

The type-3 robot arm operation device includes an arm connection structure, an upper arm structure connected to the arm connection structure, a forearm structure connected to the upper arm structure, and a hand structure connected to the forearm structure. The robot arm operation device includes: a shoulder measurement joint that connects the upper arm structure to the arm connection structure so as to be rotatable around an arm connection structure rotation axis crossing the arm connection structure, such that an upper arm inclination measurement angle that is an angle formed by the upper arm structure with the arm connection structure rotation axis is changeable, and so as to be rotatable around an upper arm structure rotation axis passing through the upper arm structure; an elbow measurement joint that connects the forearm structure to the upper arm structure such that a forearm inclination measurement angle that is an angle formed by the forearm structure with respect to the upper arm structure is changeable; and a wrist measurement joint that connects the hand structure to the forearm structure such that a forearm inclination measurement angle is changeable. The robot arm operation device further includes: a shoulder joint angle measurement part that measures a shoulder rotation measurement angle that is an angle at which the upper arm structure is rotated around the arm connection structure rotation axis, the upper arm inclination measurement angle, and a upper arm rotation measurement angle that is an angle at which the upper arm structure is rotated around the upper arm structure rotation axis; an elbow joint angle measurement part that measures a forearm inclination measurement angle; and a wrist joint angle measurement part that measures a wrist joint measurement angle that is the angle at which the hand structure is connected to the forearm structure at the wrist measurement joint.

In the type-3 robot arm, the control calculation device controls the shoulder rotation angle, the upper arm inclination angle, the elbow rotation angle, the forearm inclination angle, and the wrist joint based on the shoulder rotation measurement angle, the upper arm inclination measurement angle, the upper arm rotation measurement angle, the forearm inclination measurement angle, and the wrist joint measurement angle which are operation instructions.

The type-2 or type-3 robot arm operation device may not include at least one of the shoulder lock portion, the elbow lock portion, and the wrist lock portion. The type-2 or type-3 robot arm operation device may be a robot arm operation device that includes the shoulder lock portion, the elbow lock portion, and the wrist lock portion.

In the robot arm operation device of the present disclosure, at least one of the shoulder measurement joint, the elbow measurement joint, and the wrist measurement joint may have rotational degrees of freedom that is different from the rotational degrees of freedom of the shoulder joint, the elbow joint, and the wrist joint of the robot arm to be operated. For example, arm operation device 50 can be used to input the operation instruction to operate an upper limb portion 7 described in PAD 1. Arm operation device 50 includes the shoulder measurement joint with three rotational degrees of freedom and the elbow measurement joint with two rotational degrees of freedom including the rotational degree of freedom capable of changing the forearm inclination angle. Upper limb portion 7 described in PAD 1 includes a shoulder joint 13 with two rotational degrees of freedom and elbow joint 31 with two rotational degrees of freedom in which the elbow rotation angle and the forearm inclination angle can be changed. Arm operation device 50 can input the operation instruction to operate upper limb portion 7 described in PAD 1. When the operation instruction to operate upper limb portion 7 described in PAD 1 is inputted through arm operation device 50, the operation instruction to change the rotation angle around rotation axis Rz2 at elbow joint 31 is inputted based on upper arm rotation measurement angle $\theta_{Z3M}$ that is the rotation angle around the Z3M-axis.

Arm operation device 50 may be modified so as to be able to measure the angle formed by the hand structure and the forearm structure at the wrist measurement joint (referred to as a hand inclination measurement angle) and the rotation angle of the hand structure around the rotation axis passing through the hand structure (referred to as a hand rotation measurement angle). The hand inclination measurement angle is represented by a variable $\delta_{Y8M}$, and the hand rotation measurement angle is represented by a variable $\delta_{Z9M}$. The arm operation device modified as described above can be used, for example, when the operation instruction to operate wrist joint 36 of PAD 1 is inputted. Based on forearm rotation measurement angle $\theta_{Z5M}$ and hand inclination measurement angle $\delta_{Y8M}$, the operation instructions to change a rotation angle $\alpha_v$ around the X-axis and a rotation angle $\beta_v$ around the Y-axis included in wrist joint 36 are inputted. The operation instruction to change a rotation angle $\gamma_v$ around the Z-axis included in wrist joint 36 is inputted based on hand rotation measurement angle $\delta_{Z9M}$.

One set of arm 10 and arm operation device 50 and the function of operating arm 10 remotely included in control calculation device 60 constitute the robot arm operation system operating the robot arm remotely. Even in the case where the arm not including hand 26 is operated remotely, the robot arm operation system is composed of one set of the arm and the arm operation device, and the function of operating the arm remotely included in the control calculation device. In the case where arm 10 including hand 26 is operated remotely, the robot arm operation system also includes hand operation device 80. The robot arm operation system may be a robot arm operation system that does not include arm operation device 50 but includes hand operation device 80. The operation target of the robot arm operation system may be arm 10 not including hand 26, arm 10 including hand 26, or the robot arm including hand 26. The arm (robot arm) may be obtained by modifying arm 10, and the arm operation device may be obtained by modifying arm operation device 50. The hand (robot hand) may be obtained by modifying hand 26, and the hand operation device may be obtained by modifying hand operation device 80. When at least one of the robot arm, the arm operation device, the robot hand, and the hand operation device is modified, the control calculation device is also modified according to the modification. The control calculation device controls at least one of the robot arm and the robot hand based on the operation instruction inputted through at least one of the arm operation device and the hand operation device. In any case, according to the robot arm operation device and the robot arm operation system, the burden on the operator to operate the robot arm can be reduced as compared with the conventional one.

Robot operation system 100 operates left and right arms 10 (including hand 26). The robot operation system may operate left and right arms 10 (not including hand 26). The robot operation system may be configured to operate left and right hands 26. Arm 10 (not including hand 26) may be modified, and hand 26 may be modified.

The robot may be a robot including only an upper body. Instead of a crawler, a robot that moves on a normal wheel, a humanoid robot that moves with two legs, or the like may be used.

The robot to be operated may be a robot that includes a robot hand, as the hand, that includes at least three fingers including the first finger and the third finger that face each other, the first finger may be connected to the first finger connection portion rotatably, the third finger and other fingers may be connected to the second finger connection portion rotatably, and in which the distance between the first finger connection portion and the second finger connection portion can be changed.

Alternatively, the robot having the type-1, type-2, or type-3 robot arm described above on the left and right of the body may be the operation target.

The robot may be controlled by operator 90 by voice remotely. In this case, operator 90 wears the microphone, and the control calculation device includes a speech processing part. The speech processing part includes a speech recognition part and a speech control part. The speech recognition part extracts a determined specific phrase from the voice generated by operator 90. The voice of operator 90 is inputted from a microphone. The voice controller generates operation instruction data corresponding to the extracted phrase. The operation instruction data generated by the voice controller is written in the state data storage.

The control signal generator generates the control signal corresponding to the operation instruction data with reference to the state data storage.

For example, specific phrase is "stop", "keeping", and "release keeping". For example, the correspondence between the expression and the operation instruction data generated from the expression is as follows.

(a) The operation instruction data stopping the action of robot 1 is generated from the "stop".

(b) From the "keeping", the operation instruction data bringing arm operation devices $50_R$, $50_L$ into the locked state and stopping arm 10 is generated. The operation instructions inputted through hand operation devices $80_R$, $80_L$ become invalid.

(c) From the "release keeping", the lock of arm operation devices $50_R$, $50_L$ is released, and the operation instruction data is generated in response to the inputted through arm operation devices $50_R$, $50_L$ and hand operation devices $80_R$, $80_L$.

The speech recognition part may recognize a word or phrase different from the above, or there may be the word or phrase that is not recognized in the above words or phrases. The speech control part may be anything that can stop or actuate robot 1 according to the phrase extracted by the speech recognition part.

Modifications of the embodiment, omission of some components, and free combinations of modifications and omissions are possible.

REFERENCE SIGNS LIST

100: robot operation system (robot arm operation system, robot hand operation system)
1: crawler mobile robot (robot)
1W: vehicle portion
1WA: crawler cover
1WB: battery container
1H: humanoid
2: on-site camera
3: operation device
4: display device
5: upper body input device
6: mode switching pedal (robot hand operation device)
$6_R$: mode switching pedal (moving mode change switch, robot hand operation device)
$6_L$: mode switching pedal (slide mode change switch, robot hand operation device)
7: foot operation input device
9: head
9C: head connection portion
10: arm (robot arm)
11: body
12: body support arm
12A: side plate
12B: coupling plate
13: body connection portion
13A: body rotation portion
13B: rotation shaft connection yoke
13C: rotation shaft member
13D: rotation axis gear
13E: motor
13F: drive gear
13G: gear cover
14: support arm connection portion
14A: support arm rotation portion
14B: support arm base
14C: rotation shaft holding yoke
14D: rotation shaft member
14E: rotation axis gear
14F: motor
14G: drive gear
14H: gear cover
15, $15_L$, $15_R$: crawler moving portion
16: wheel
17: crawler
18: battery
19: arm connection portion
19A: torso connection portion
19B: arm rotation portion
19C: arm connection structure
19D: motor
19E: worm wheel
19F: worm
20: body upper portion
20A: arm connection-portion rotation portion
20B: rotation shaft connection yoke
21: body lower portion
21A: rotation shaft holding yoke
21B: vertical columnar portion
22: arm base
22A: arm base joint
23: body crossing rotation portion
23A: rotation shaft member
23B: rotation axis gear
23C: motor
23D: drive gear
23E: gear cover
24: upper arm
24A: joint connected portion
24B: intermediate cylindrical portion
24C: lid
24D: lower column
24E: motor
25: forearm
25A: rotation shaft connected portion
25B: forearm base
25C: forearm bone
25D: actuator structure
25E: screw rod holder
25F: screw rod holder
26: hand (robot hand)
27: shoulder joint
27A: shoulder joint structure
27B: motor
27C: motor installation portion
27D: rotation shaft member
27E: opening
28: elbow joint
28A: rotation shaft holding yoke
28B: rotation shaft member
28C: worm wheel
28D: worm
28E: gear portion
28F: motor
28G: gear portion
28J: gear cover
29: wrist joint
29A: T-shaped member
29B: T-shaped member holding yoke
29C: T-shaped member holder
29D: wrist base
29E: bearing
29F: bearing
35: forearm outside actuator 35L: forearm outside link
35M: motor
35A: screw rod
35B: moving member
35C: rail
35D: link
35E: motor installation plate
35F: motor
35G: belt
35H: pulley
35J: pulley
36: forearm inside actuator
36L: forearm inside link
36M: motor
36A: screw rod
36B: moving member
36C: rail
36D: link
36E: motor installation plate
36F: motor
36G: belt
36H: pulley
36J: pulley
40: electric driver
41: grip
42: lever
45: object
50, 50$_R$, 50$_L$: arm operation device (robot arm operation device)
51: support frame
52: frame connection portion
53: upper arm structure
54: forearm structure
55: shoulder joint measurement part (shoulder measurement joint shoulder lock portion shoulder joint angle measurement part)
55A: X1M-angle measurement part
55B: shoulder-joint first yoke
55C: shoulder-joint second yoke
55D: Y2M-angle measurement part
55E: Z3M-angle measurement part
56: elbow joint measurement part (elbow measurement joint, elbow lock portion, elbow joint angle measurement part)
56A: X4M-angle measurement part
56B: elbow joint yoke
56C: Z5M-angle measurement part
57: wrist joint measurement part (wrist measurement joint, wrist lock portion, wrist joint angle measurement part)
57A: wrist-joint first yoke
57B: X6M-angle measurement part
57C: Y7M-angle measurement part
57D: wrist-joint second yoke
58: upper arm mounting portion
59: forearm mounting portion
60: control calculation device
61: CPU
62: memory
63: communicator
64: structural data storage
65: state data storage
66: upper body input device interface (upper body input device IF)
67: operation instruction data generator
68: control signal generator
69: communication line 70: LAN
71: skeleton
72: joint
73: motor
74: actuator
75: controller
76: communicator
77: storage
80, 80$_R$, 80$_L$: hand operation device (robot hand operation device)
81: first joystick (lock state change switch, finger moving portion operation part, finger moving portion operation joystick)
82: second joystick (hook portion operation part, hook portion operation joystick)
83: third joystick
84: fourth joystick
85: fifth joystick
86: main body portion
86A: first side surface
86B: second side surface
86C: third side surface
86D: recess
87: hand mounting portion
90: operator
91: first finger
92: second finger
93: third finger
94: fourth finger
95: fifth finger
91A, 92A, 93A, 94A, 95A: finger body
91B, 92B, 93B, 94B, 95B: fingertip
91C, 92C, 93C, 94C, 95C: finger inside cover
91D, 92D, 93D, 94D, 95D: finger joint
91DA, 92DA, 93DA, 94DA, 95DA: yoke
91DB, 92DB, 93DB, 94DB, 95DB: dactylus rotation axis
91E, 92E, 93E, 94E, 95E: worm wheel
91F, 92F, 93F, 94F, 95F: worm
91G, 92G, 93G, 94GF, 95F: motor
91H: distance sensor (first distance sensor)
93H: distance sensor (second distance sensor)
91J, 93J: opening
92K: slide fingertip (hook portion)
92L: motor container
92M: motor (hook portion moving portion)
92N: screw rod (hook portion moving portion)
92P: groove (hook portion moving portion)
92Q: nut (hook portion moving portion)
96: first finger connection portion
96A: first rack (finger moving portion)
96B: first frame
96C: first holder (finger moving portion)
96D: first finger connection frame
97: second finger connection portion
97A: second rack (finger moving portion)
97B: second frame
97C: second holder (finger moving portion)
97D: second finger connection frame
97E: palm flesh portion
97F: notch
98: wrist connection portion
98A: hand base
98B: connection columnar portion
98C: first rail (finger moving portion)
98D: second rail (finger moving portion)
98E: pinion (finger moving portion)
98F: motor (finger moving portion)

J11: forearm outside link attaching unit
J12: forearm inside link attaching unit
J13: hand outside link attaching unit
J13A: rotary yoke
J13B: bearing
J13C: bearing
J14: hand inside link attaching unit
J14A: rotary yoke
J14B: bearing
J14C: bearing

The invention claimed is:

1. A robot hand operation device through which an operator inputs an operation instruction to move a robot hand including at least three fingers, the robot hand operation device comprising:
   a main body portion held by the operator; and
   joysticks each being corresponded with each of the fingers of the robot hand to be operated and provided in the main body portion in a number that is the same as that of the fingers,
   wherein when the operator operates each of the joysticks the operation instruction to move the finger corresponded with the each of the joysticks is inputted, and when the operator does not operate each of the joysticks the operation instruction to move the finger corresponded with the each of the joysticks is not inputted.

2. The robot hand operation device according to claim 1, wherein
   the robot hand includes a first finger that is the finger, a third finger that is the finger disposed to face the first finger, a second finger that is the finger disposed side by side with the third finger, a first finger connection portion to which the first finger is connected rotatably, a second finger connection portion to which the second finger and the third finger are connected rotatably, a hand base to which the first finger connection portion and the second finger connection portion are connected, and a finger moving portion that moves at least one of the first finger connection portion and the second finger connection portion with respect to the hand base such that a distance between the first finger and the third finger increases or decreases,
   the robot hand operation device further comprising:
   a first joystick being the joystick being corresponded with the first finger;
   a second joystick being the joystick being corresponded with the second finger;
   a third joystick being the joystick being corresponded with the third finger; and
   a finger moving portion operation part to input an operation instruction to move the finger moving portion,
   the operation instruction to rotate the first finger is inputted through the first joystick being moved,
   the operation instruction to rotate the second finger is inputted through the second joystick being moved,
   the operation instruction to rotate the third finger is inputted through the third joystick being moved, and
   the operation instruction to move the finger moving portion is inputted through the finger moving portion operation part being operated.

3. The robot hand operation device according to claim 2, wherein
   in the operation instruction to rotate the first finger inputted through the first joystick being moved, a speed of rotation of the first finger is determined to be monotonous un-decrease according to a speed of the first joystick being moved,
   in the operation instruction to rotate the second finger inputted through the second joystick being moved, a speed of rotation of the second finger is determined to be monotonous un-decrease according to a speed of the second joystick being moved, and
   in the operation instruction to rotate the third finger inputted through the third joystick being moved, a speed of rotation of the third finger is determined to be monotonous un-decrease according to a speed of the third joystick being moved.

4. A robot hand operation system comprising:
   a hand operation device being the robot hand operation device according to claim 3 to be operated by the operator to input the operation instruction to move the robot hand;
   the robot hand; and
   a control calculation device to control the robot hand based on the operation instruction.

5. The robot hand operation device according to claim 2, wherein
   either one of the first joystick, the second joystick, and the third joystick is a finger moving portion operation joystick being also the finger moving portion operation part, and
   the operator operates a moving mode change switch to switch between a distance change mode in which the finger moving portion operation joystick is the finger moving portion operation part and a finger rotation mode in which the finger moving portion operation joystick is not the finger moving portion operation part.

6. The robot hand operation device according to claim 5, wherein in the distance change mode, in the operation instruction to move the finger moving portion inputted through the finger moving portion operation joystick being moved, a speed of movement of the finger moving portion is determined to be monotonous un-decrease according to a speed of the finger moving portion operation joystick being moved.

7. A robot hand operation system comprising:
   a hand operation device being the robot hand operation device according to claim 5 to be operated by the operator to input the operation instruction to move the robot hand;
   the robot hand; and
   a control calculation device to control the robot hand based on the operation instruction.

8. The robot hand operation device according to claim 5, wherein the finger moving portion operation joystick is the first joystick.

9. A robot hand operation system comprising:
   a hand operation device being the robot hand operation device according to claim 6 to be operated by the operator to input the operation instruction to move the robot hand;
   the robot hand; and
   a control calculation device to control the robot hand based on the operation instruction.

10. The robot hand operation device according to claim 5, further comprising the moving mode change switch.

11. A robot hand operation system comprising:
   a hand operation device being the robot hand operation device according to claim 10 to be operated by the operator to input the operation instruction to move the robot hand;

the robot hand; and
a control calculation device to control the robot hand based on the operation instruction.

12. A robot hand operation system comprising:
a hand operation device being the robot hand operation device according to claim 5 to be operated by the operator to input the operation instruction to move the robot hand;
the robot hand; and
a control calculation device to control the robot hand based on the operation instruction.

13. The robot hand operation system according to claim 12, wherein the moving mode change switch is operated by a foot of the operator.

14. The robot hand operation device according to claim 2, wherein
the first joystick is provided on a first side surface that is a side surface of the main body portion along a direction in which an index finger and a middle finger of the operator extend when the operator holds the main body portion, and
the second joystick and the third joystick are provided on a second side surface that is a side surface of the main body portion that is adjacent to the first side surface and extends in a direction of an angle crossing the first side surface.

15. A robot hand operation system comprising:
a hand operation device being the robot hand operation device according to claim 14 to be operated by the operator to input the operation instruction to move the robot hand;
the robot hand; and
a control calculation device to control the robot hand based on the operation instruction.

16. The robot hand operation device according to claim 2, wherein the robot hand includes a hook portion provided on an opposite side of the fingertip of the second finger, and bent toward a side where the first finger exists, the opposite side being a side opposite to a side where the third finger is disposed, and a hook portion moving portion to move the hook portion along the second finger in a direction toward the second finger connection portion, and
the robot hand operation device further comprising a hook portion operation part to input the operation instruction to operate the hook portion moving portion.

17. The robot hand operation device according to claim 16, wherein
either one of the first joystick, the second joystick, and the third joystick is a hook portion operation joystick being also the hook portion operation part, and
the operator operates a slide mode change switch to switch between a slide mode in which the hook portion operation joystick is the hook portion operation part and a finger rotation mode in which the hook portion operation joystick is not the hook portion operation part.

18. The robot hand operation device according to claim 17, wherein in the slide mode, in the operation instruction to move the hook portion moving portion inputted through the hook portion operation joystick being moved, a speed of movement of the hook portion moving portion is determined to be monotonous un-decrease according to a speed of the hook portion operation joystick being moved.

19. The robot hand operation device according to claim 17, wherein the hook portion operation joystick is the second joystick.

20. The robot hand operation device according to claim 17, further comprising the slide mode change switch.

21. The robot hand operation device according to claim 2, further comprising a fourth joystick and a fifth joystick provided in the main body portion, wherein
the robot hand includes: a fourth finger being disposed on a side of the third finger, the side being opposite to a side where the second finger is disposed, and connected to the second finger connection portion rotatably; and a fifth finger being disposed on a side of the fourth finger, the side being opposite to a side where the third finger is disposed, and connected to the second finger connection portion rotatably,
the operation instruction to rotate the fourth finger is inputted through the fourth joystick being moved, and
the operation instruction to rotate the fifth finger is inputted through the fifth joystick being moved.

22. A robot hand operation system comprising:
a hand operation device being the robot hand operation device according to claim 2 to be operated by the operator to input the operation instruction to move the robot hand;
the robot hand; and
a control calculation device to control the robot hand based on the operation instruction.

23. The robot hand operation system according to claim 22, wherein
the robot hand includes a hook portion provided on an opposite side of the fingertip of the second finger, and bent toward a side where the first finger exists, the opposite side being a side opposite to a side where the third finger is disposed, and a hook portion moving portion to move the hook portion along the second finger in a direction toward the second finger connection portion, and
the hand operation device includes the hook portion operation part to input the operation instruction to operate the hook portion moving portion.

24. The robot hand operation system according to claim 23, wherein either one of the first joystick, the second joystick, and the third joystick is a hook portion operation joystick being also the hook portion operation part, and
the robot hand operation system further comprising a slide mode change switch to switch between a slide mode in which the hook portion operation joystick is the hook portion operation part and a finger rotation mode in which the hook portion operation joystick is not the hook portion operation part.

25. The robot hand operation system according to claim 24, wherein in the slide mode, in the operation instruction to move the hook portion moving portion inputted through the hook portion operation joystick being moved, a speed of movement of the hook portion moving portion is determined to be monotonous un-decrease according to a speed of the hook portion operation joystick being moved.

26. The robot hand operation system according to claim 24, wherein the hook portion operation joystick is the second joystick.

27. The robot hand operation system according to claim 24, wherein the slide mode change switch is operated by a foot of the operator.

28. The robot hand operation system according to claim 22, wherein
the hand operation device includes a fourth joystick and a fifth joystick provided in the main body portion,
the robot hand includes: a fourth finger being disposed on a side of the third finger, the side being opposite to a side where the second finger is disposed, and connected to the second finger connection portion rotatably; and a fifth finger being disposed on a side of the fourth finger, the side being opposite to a side where the third finger is disposed, and connected to the second finger connection portion rotatably, the operation instruction to rotate the fourth finger is inputted through the fourth joystick being moved, and the operation instruction to rotate the fifth finger is inputted through the fifth joystick being moved.

29. A robot arm operation system comprising:

a hand operation device that is the robot hand operation device according to claim 2 to be operated by the operator to input the operation instruction to move the robot hand;

a robot arm including an arm connection portion and an arm being connected to the arm connection portion rotatably and including the robot hand; and a control calculation device to control the robot arm based on the operation instruction.

30. A robot operation system comprising:

a robot including a body and two arms being connected to left and right sides of the body rotatably and including left and right robot hands respectively;

left and right hand operation devices to input the operation instruction to operate the left and right robot hands respectively, each of the left and right hand operation devices being the robot hand operation device according to claim 2, each of the left and right robot hands being the robot hand; and a control calculation device to control the left robot hand based on the operation instruction inputted through the left hand operation device, and control the right robot hand based on the operation instruction inputted through the right hand operation device.

* * * * *